United States Patent
Elson et al.

(10) Patent No.: US 12,428,173 B2
(45) Date of Patent: Sep. 30, 2025

(54) SOLAR POWERED STRATOSPHERIC GLIDER

(71) Applicant: Solaris Suborbital Inc., San Francisco, CA (US)

(72) Inventors: Andrew Charles Elson, Fowey (GB); Daniel Michael Doulton, San Francisco, CA (US)

(73) Assignee: Solaris Suborbital Inc., San Francisco, CA (US)

( * ) Notice: Subject to any disclaimer, the term of this patent is extended or adjusted under 35 U.S.C. 154(b) by 0 days.

(21) Appl. No.: 18/766,055

(22) Filed: Jul. 8, 2024

(65) Prior Publication Data
US 2025/0011013 A1   Jan. 9, 2025

Related U.S. Application Data

(60) Provisional application No. 63/525,279, filed on Jul. 6, 2023.

(51) Int. Cl.
*B64U 10/50* (2023.01)
*B64C 17/02* (2006.01)
(Continued)

(52) U.S. Cl.
CPC .............. *B64U 10/50* (2023.01); *B64C 17/02* (2013.01); *B64C 39/04* (2013.01); *B64U 10/25* (2023.01); *B64U 20/65* (2023.01); *B64U 50/31* (2023.01); *B64C 25/52* (2013.01); *B64C 31/02* (2013.01); *B64U 2101/30* (2023.01)

(58) Field of Classification Search
CPC .......... B64C 25/52; B64C 31/02; B64C 39/04; B64U 10/50; B64U 50/31
See application file for complete search history.

(56) References Cited

U.S. PATENT DOCUMENTS

| | | | | |
|---|---|---|---|---|
| 1,348,983 | A | * | 8/1920 | Covino .................. B64C 39/04 244/119 |
| 3,016,535 | A | * | 1/1962 | Hewitt, Jr. ............... H01Q 3/44 343/768 |

(Continued)

FOREIGN PATENT DOCUMENTS

| | | |
|---|---|---|
| JP | 202015396 | 1/2020 |
| WO | 2017207968 A1 | 12/2017 |

OTHER PUBLICATIONS

International Search Report and Written Opinion dated Jul. 15, 2025 issued by the US Patent Office as International Searching Authority in connection with related International Application No. PCT/US2024/037028 (19 pages).

Primary Examiner — Nicholas McFall
(74) Attorney, Agent, or Firm — NEO IP

(57) ABSTRACT

A glider system capable of sustained long-term flight includes a fixed-wing glider having a dual fuselage system. The top surface of the glider is covered with a plurality of photovoltaic cells capable of powering onboard sensors, propeller systems, and/or onboard processers. The glider includes wing spars with a composite material covering an inner foam core, with the type of foam core or use of reinforcement materials differs along the length or width of the wing spars. The glider is able to downward facing sacrificial winglets to provide a landing system without the need for bulkier landing gear.

20 Claims, 37 Drawing Sheets

(51) Int. Cl.
*B64C 31/02* (2006.01)
*B64C 39/04* (2006.01)
*B64U 10/25* (2023.01)
*B64U 20/65* (2023.01)
*B64U 50/31* (2023.01)
B64C 25/52 (2006.01)
B64U 101/30 (2023.01)

(56) References Cited

U.S. PATENT DOCUMENTS

| | | |
|---|---|---|
| 6,581,873 B2 | 6/2003 | McDermott |
| 7,789,339 B2 | 9/2010 | Sommer |
| 7,922,115 B2 | 4/2011 | Colgren et al. |
| 8,146,855 B2 | 4/2012 | Ismailov |
| 8,322,650 B2 | 12/2012 | Kelleher |
| 9,169,014 B2 | 10/2015 | Elson et al. |
| 9,957,037 B2 | 5/2018 | Cornew et al. |
| 10,214,295 B2 | 2/2019 | Pan et al. |
| 10,308,346 B2 * | 6/2019 | Parks ................. B64C 3/38 |
| 10,836,480 B2 | 11/2020 | Heinen et al. |
| 11,296,540 B2 * | 4/2022 | Kirleis ................ B64C 39/04 |
| 11,312,492 B1 | 4/2022 | von Flotow et al. |
| 11,414,191 B2 | 8/2022 | Gibboney et al. |
| 11,427,311 B1 * | 8/2022 | Ensslin ................ B64C 1/12 |
| 2015/0336661 A1 | 11/2015 | McCollough et al. |
| 2018/0346095 A1 | 12/2018 | Elson |
| 2018/0354603 A1 | 12/2018 | Elson |
| 2020/0108909 A1 | 4/2020 | Elson et al. |
| 2020/0130810 A1 | 4/2020 | Elson |
| 2020/0148327 A1 | 5/2020 | Elson et al. |
| 2021/0309353 A1 | 10/2021 | Gil |
| 2022/0212788 A1 * | 7/2022 | Fen ................. B64U 10/25 |
| 2022/0411047 A1 | 12/2022 | Mihai |
| 2023/0145112 A1 | 5/2023 | Bishop et al. |

\* cited by examiner

520

520

SOLAR POWERED STRATOSPHERIC GLIDER

CROSS REFERENCES TO RELATED APPLICATIONS

This application is related to and claims priority from the following U.S. patents and patent applications. This application claims priority to and the benefit of U.S. Application No. 63/525,279, filed Jul. 6, 2023, which is incorporated herein by reference in its entirety.

BACKGROUND OF THE INVENTION

1. Field of the Invention

The present invention relates to unmanned glider systems, and more specifically to solar-powered stratospheric gliders including sensors for scanning a surface below and sacrificial landing systems to allow for reusability.

2. Description of the Prior Art

It is generally known in the prior art to provide unmanned aerial vehicles with a variety of sensors for surface feature detection and scanning.

Prior art patent documents include the following:

U.S. Pat. No. 10,214,295 for High-efficiency, lightweight solar sheets by inventors Pan et al., filed May 8, 2017 and issued Feb. 26, 2019, discloses embodiments including a high efficiency, lightweight solar sheet. Some embodiments include a solar sheet configured for installation on a surface of a UAV or on a surface of a component of a UAV. The solar sheet includes a plurality of solar cells and a polymer layer to which the plurality of solar cells are attached. Some embodiments include a kit for supplying solar power in a battery-powered or fuel cell powered unmanned aerial vehicle (UAV) by incorporating flexible solar cells into a component of a UAV, affixing flexible solar cells to a surface of a UAV, or affixing flexible solar cells to a surface of a component of a UAV. The kit also includes a power conditioning system configured to operate the solar cells within a desired power range and configured to provide power having a voltage compatible with an electrical system of the UAV.

U.S. Pat. No. 9,957,037 for High altitude aircraft with integrated solar cells, and associated systems and methods by inventors Cornew et al., filed Jun. 20, 2014 and issued May 1, 2018, discloses a method of making a solar cell assembly including placing backsides of multiple solar cells in contact with a substrate. The solar cells are electrically connected to each other. Heat and pressure are applied to the solar cells and the substrate to simultaneously impress the solar cells into the substrate and bond the solar cells to the substrate.

U.S. Pat. No. 8,322,650 for Aircraft by inventors Kelleher et al., filed Jul. 30, 2010 and issued Dec. 4, 2012, discloses an aircraft, particularly a solar powered, high altitude, long endurance, unmanned aerial vehicle, being equipped with a combination of canted down, raked back wing tips and trailing "tip tails" carried on booms from the tip regions of the mainplane. Each tip tail is positioned to be subject to the upwash field of the respective wing tip vortex, at least in the cruise condition of the aircraft. The wing tip form can achieve a reduction in induced drag and help to relieve wing root bending moment while the tip tails can act through their connections to the mainplane to provide torsional relief to the latter, particularly under lower incidence/higher speed conditions. In the higher incidence/lower speed cruise condition, however, the presence of the tip tails in the upwash fields of the wing tip vortices means that they can generate lift with a component in the forward direction of flight and hence contribute to the thrust requirements of the aircraft.

U.S. Pat. No. 9,169,014 for Unmanned aerial vehicle and method of launching by inventors Elson et al., filed Aug. 8, 2012 and issued Oct. 27, 2015, discloses a method of launching a powered unmanned aerial vehicle at an altitude of at least 13,000 m, the method comprising lifting the vehicle by attachment to a lighter-than-air carrier from a substantially ground-level location to an elevated altitude, causing the vehicle to detach from the carrier while the velocity of the vehicle relative to the carrier is substantially zero, the vehicle thereafter decreasing in altitude as it accelerates to a velocity where it is capable of preventing any further descent and can begin independent sustained flight.

U.S. Pat. No. 7,789,339 for Modular articulated-wing aircraft by inventor Sommer, filed Jun. 27, 2006 and issued Sep. 7, 2010, discloses systems and/or methods for forming a multiple-articulated flying system (skybase) having a high aspect ratio wing platform, operable to loiter over an area of interest at a high altitude are provided. In certain exemplary embodiments, autonomous modular flyers join together in a wingtip-to-wingtip manner. Such modular flyers may derive their power from insolation. The autonomous flyers may include sensors which operate individually, or collectively after a skybase is formed. The skybase preferably may be aggregated, disaggregated, and/or re-aggregated as called for by the prevailing conditions. Thus, it may be possible to provide a "forever-on-station" aircraft.

US Patent Publication No. 2022/0411047 for Aerial vehicles with transitioning landing gear and related methods by inventor Mihai, filed May 19, 2022 and published Dec. 29, 2022, discloses aerial vehicles selectively transitioning between a fixed wing flight configuration and a vertical takeoff and landing (VTOL) configuration. In the fixed wing flight configuration, a forward propeller may rotate in a first forward plane, whereas in the VTOL configuration, the forward propeller may be tilted to rotate in a second forward plane. A forward landing arm may extend downward in the VTOL configuration and be configured to be tilted to a stowed position when the aerial vehicle is in the fixed wing flight configuration. The forward landing arm may be coupled to the forward propeller such that tilting of the forward propeller causes corresponding tilting of the forward landing arm. In some examples, a plurality of such landing arms and propellers are tilted during transitioning of the aerial vehicle, such as one or more forward propellers and landing arms and/or one or more aft propellers and landing arms.

U.S. Pat. No. 10,836,480 for Flight vehicle by inventors Heinen et al., filed Oct. 26, 2017 and issued Nov. 17, 2020, discloses a method and apparatus for a flight vehicle including a wing having a high aspect ratio and first and second rotors having a high aspect ratio, with a ratio of the rotor diameter to wing length ratio is equal to or greater than about 0.25. In embodiments, the flight vehicle can include a first and second motor, each less than about one thousand HP, to drive a respective rotor and a second motor. The flight vehicle can include a cruise mode and a VTOL mode.

U.S. Pat. No. 7,922,115 for Modular unmanned air-vehicle by inventors Colgren et al., filed Apr. 23, 2007 and issued Apr. 12, 2011, discloses an unmanned air vehicle designed for reconnaissance, surveillance, data acquisition, and general research. The air vehicle is a monoplane that consists of several pieces that can easily be assembled using a minimal amount of tools. The air vehicle consists of a forward and aft fuselage section, two identical horizontal stabilizers, and four identical wing sections. The aircraft can fly with all four wing sections, or with just two wing sections (the short wing configuration). Each of the four wing sections of the air vehicle can be interchanged with any of the other wing sections for the purpose of minimizing assembly time and spare parts.

U.S. Pat. No. 8,146,855 for Unmanned air vehicle by inventor Ismailov, filed Sep. 3, 2008 and issued Apr. 3, 2012, discloses an unmanned air vehicle for military, land security and the like operations including a fuselage provided with foldable wings having leading edge flaps and trailing edge ailerons which are operable during ascent from launch to control the flight pattern with the wings folded, the wings being deployed into an open unfolded position when appropriate. The vehicle is contained within a pod from which it is launched and a landing deck is provided to decelerate and arrest the vehicle upon its return to land.

US Patent Publication No. 2021/0309353 for Modular unmanned aerial vehicle system for adaptable parcel delivery by inventor Gil, filed Mar. 30, 2021 and published Oct. 7, 2021, discloses a modular unmanned aerial vehicle (UAV) system comprising a body module, a rotor module, and a wing module. The body module includes a flight controller and a power distribution device. The body module is releasably attachable to the rotor module or the wing module, and the body module is releasably attachable to the rotor module. The rotor module includes one or more motors and electronic speed controllers (ESCs), while the wing module includes a wing having a flap, elevator, aileron, or rudder. Various UAV configurations can be formed from the body module, the rotor module, and the wing module. Each configuration includes different advantages for flight time, distance, battery life, and payload capacity. A UAV can be configured to a particular configuration to optimize parcel delivery.

US Patent Publication No. 2023/0145112 for Aircraft by inventors Bishop et al., filed Mar. 29, 2021 and published May 11, 2023, discloses an aircraft comprising: a fuselage; and a payload module coupled to the fuselage, the payload module comprising one or more data storage devices. The payload module is configured to be decoupled from the fuselage during flight upon receipt of a de-coupling input.

U.S. Pat. No. 11,414,191 for Remotely controlled modular VTOL aircraft and re-configurable system using same by inventors Gibboney et al., filed Jul. 27, 2019 and issued Aug. 16, 2022, discloses a manned/unmanned aerial vehicle adapted for vertical takeoff and landing using the same set of engines for takeoff and landing as well as for forward flight. An aerial vehicle which is adapted to takeoff with the wings in a vertical as opposed to horizontal flight attitude which takes off in this vertical attitude and then transitions to a horizontal flight path. A tailless airplane which uses a control system that takes inputs for a traditional tailed airplane and translates those inputs to provide control utilizing non-traditional control methods.

U.S. Pat. No. 11,312,492 for Rotorcraft-assisted systems and methods for launching and retrieving a fixed-wing aircraft into and from free flight by inventors von Flotow et al., filed Oct. 4, 2018 and issued Apr. 26, 2022, discloses various systems and methods configured to: launch a fixed-wing aircraft from a moving object into free, wing-borne flight using a multicopter; retrieve the multicopter after fixed-wing aircraft launch using a retrieval winch; retrieve the fixed-wing aircraft from free, wing-borne flight back onto the moving object using the multicopter; and retrieve the multicopter after fixed-wing aircraft retrieval using the retrieval winch.

US Patent Publication No. 2020/0108909 for Aircraft longitudinal stability by inventors Elson et al., filed Jun. 20, 2018 and published Apr. 9, 2020, discloses an aircraft having at least one main wing and at least one boom fuselage. The main wing has an aerofoil section having a leading edge, a trailing edge, a chord length extending between the leading edge and the trailing edge, a centre of lift, a flexural centre and a centre of mass. The centre of lift, the flexural centre and the centre of mass are located all within a region at most 4% of the chord length.

US Patent Publication No. 2020/0130810 for Aerial vehicle tether by inventor Elson, filed Jun. 20, 2018 and published Apr. 30, 2020, discloses an aerial vehicle having a wing and a fuselage. A tether is anchored at opposing ends of the wing and/or the fuselage. The tether is arranged to prevent one or more parts of the aerial vehicle from separating from the remainder of the aerial vehicle in the event of structural failure of the aerial vehicle.

WIPO Patent Publication No. WO2017207968 for Battery arrangement by inventors Elson et al., filed May 25, 2017 and published Dec. 7, 2017, discloses a battery arrangement and a method of operating a battery arrangement for a solar powered aerial vehicle. The battery arrangement has a plurality of batteries arranged in a plurality of groups, the groups including a first battery group, a second battery group and a third battery group. Each battery group includes one or more batteries, and the method has the following steps: discharging the first battery group via an electrical heating device, the first battery group being at an operative temperature range, the operative temperature range being at or above zero degrees Celsius; warming the second battery group from a non-operative temperature range, the non-operative temperature range being below zero degrees Celsius, to the operative temperature range using heat energy from the electrical heating device. Whilst the first battery group is being discharged and the second battery group is being warmed, the third battery group remains at the non-operative temperature range.

US Patent Publication No. 2020/0148327 for Method of forming a hollow spar for an aerial vehicle by inventors Elson et al., filed Jun. 20, 2018 and published May 14, 2020, discloses a method of forming a hollow spar for an aerofoil includes forming a sandwich structure having a first structural layer, a second structural layer and a cellular core layer located in between the first structural layer and the second structural layer. At least part of the sandwich structure is removed at intervals corresponding to one or more corner locations, and the sandwich structure is folded at the one or more corner locations to define a hollow space and form the spar. A chordwise extending rib section for an aerofoil has a substantially planar web with a chordwise length; and a reinforcement strip attached to an edge of the web over substantially the majority of the chordwise length.

US Patent Publication No. 2018/0354603 for Aircraft wing structure by inventor Elson, filed Sep. 19, 2016 and published Dec. 13, 2018, discloses an aircraft having a wing providing the main lifting surface for the aircraft. The wing has a structure supporting an aerodynamic surface, and the wing has a weight, the wing structure being unable to support its own weight when the aircraft is stationary and under a load of 1 g so as to cause structural failure of the wing.

US Patent Publication No. 2018/0346095 for Foam aerofoil by inventor Elson, filed Sep. 19, 2016 and published Dec. 6, 2018, discloses an aerofoil having at least one space frame and at least one pre-stressed cover supported by the space frame. The space frame has one or more structural members, the structural members including a structural foam material; and the pre-stressed cover forms at least a part of an external aerodynamic surface of the aerofoil.

SUMMARY OF THE INVENTION

The present invention relates to unmanned glider systems, and more specifically to solar-powered stratospheric gliders including sensors for scanning a surface below and sacrificial landing systems to allow for reusability.

It is an object of this invention to provide a glider system powered by solar cells for scanning a surface below for various purposes, including agricultural monitoring, defense, fire detection, weather alerts, and/or other purposes.

In one embodiment, the present invention is directed to a glider including a sacrificial landing system as described herein.

In another embodiment, the present invention is directed to a modular glider system as described herein.

In yet another embodiment, the present invention is directed to a solar-powered stratospheric glider as described herein.

These and other aspects of the present invention will become apparent to those skilled in the art after a reading of the following description of the preferred embodiment when considered with the drawings, as they support the claimed invention.

DETAILED DESCRIPTION

Figure 1:
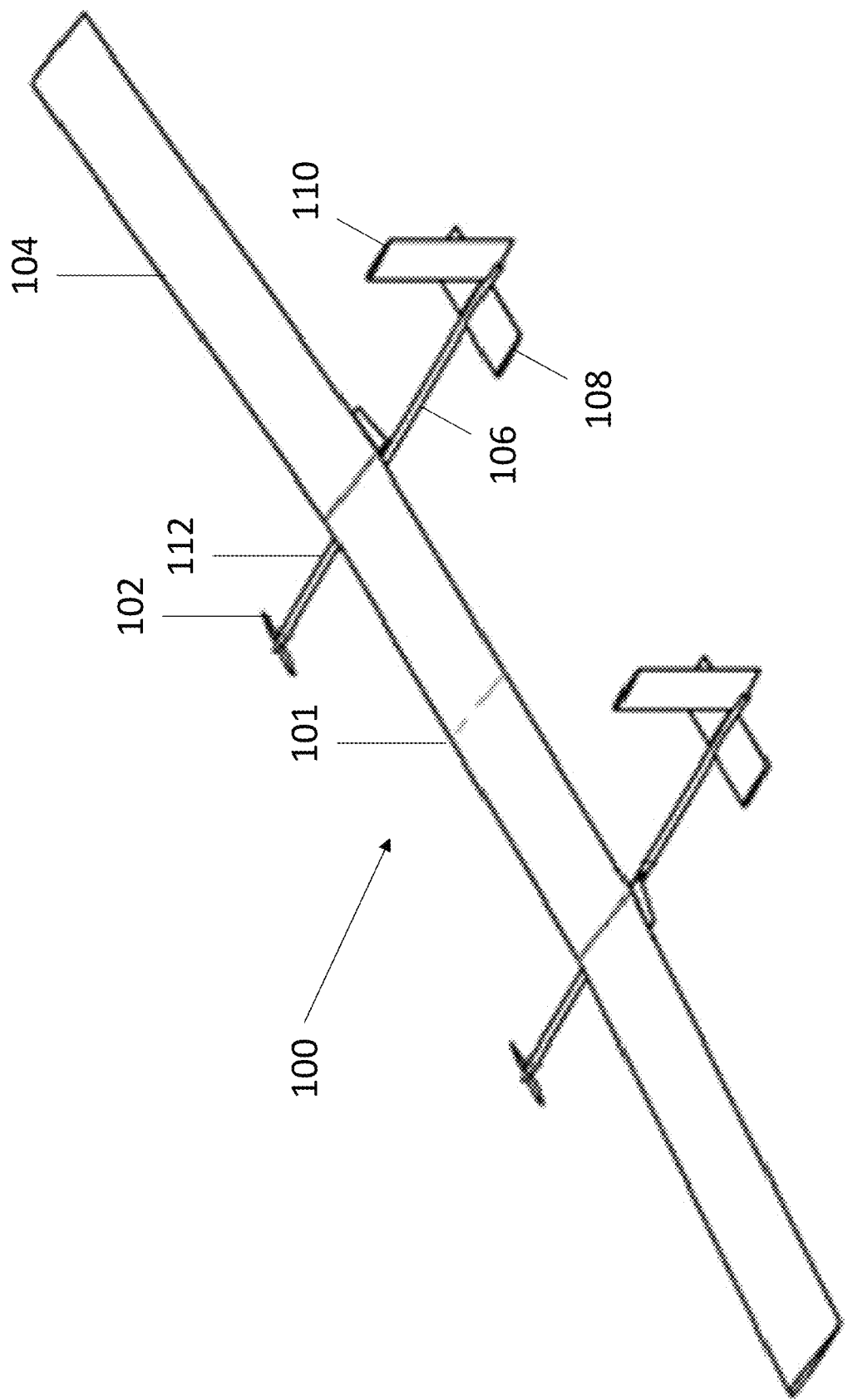
FIG. 1 illustrates a perspective view of a glider according to one embodiment of the present invention.

The present invention is generally directed to unmanned glider systems, and more specifically to solar-powered stratospheric gliders including sensors for scanning a surface below and sacrificial landing systems to allow for reusability.

In one embodiment, the present invention is directed to a glider including a sacrificial landing system as described herein.

In another embodiment, the present invention is directed to a modular glider system as described herein.

In yet another embodiment, the present invention is directed to a solar-powered stratospheric glider as described herein.

The term "glider" is used to describe the system herein. One of ordinary skill in the art will understand that although the word glider is used, some embodiments of the present invention include mechanisms such as propellers able to actively generate lift for the system and sustain prolonged flight, therefore allowing for flight mechanisms than just gliding.

Stratospheric gliders, especially those intended to operate for long periods of time, face a number of challenges. First, long duration stratospheric flights need to have a mechanism to maintain flight with minimal energy expenditure. This requires the glider to be lightweight, especially if the glider needs to carry payloads (e.g., imaging systems, weather testing devices, etc.) of a reasonable size. However, providing a sufficiently lightweight glider for use in multiple purposes with different payload sizes, has proven to be difficult.

Many intended applications for a glider, however, require features of the glider, however, that complicate the requirement for the glider to be lightweight. For example, in order to image a wide swath of territory, the glider often needs to be of a substantial size to allow for greater spacing between the sensors. Furthermore, gliders require substantial durability in order to launch and achieve intended altitude, with the strength and stiffness required for such a launch often being challenging for lightweight materials.

One solution for overcoming the challenges that gliders face is the use of photovoltaic cells to provide energy, as photovoltaic cells decrease the requirement for larger battery storage and therefore reduce the overall required weight of the system. Several attempts at creating solar gliders, have been made, including the National Aeronautics and Space Administration (NASA)'s Pathfinder device (part of NASA's Environmental Research Aircraft and Sensor Technology (ERAST) project), introduced in 1993, provided a propeller-driven glider with a curved wing design and with photovoltaic cells lining substantially the entirety of the top surface of the wings and body of the glider. The Pathfinder glider, and its successor, the Pathfinder Plus from 1998, each include between six and eight fuselages each with a propeller attached and include permanent landing gear extending downwardly from the wings of the gliders. The Pathfinder and Pathfinder Plus both utilized traditional runway takeoff methods, requiring the propellers of the systems to achieve lift and reach a target altitude, which extended between approximately 50,000-80,000 ft for Pathfinder Plus. As NASA continued to iterate on the Pathfinder design with the subsequent Centurion and Helios missions, the size of the glider continued to grow, as it also became heavier, with the Helios having a wingspan of 75 m, larger than many conventional transport aircraft. However, the target up-time for these missions was often on the order of 30 minutes to an hour, with the gliders being unsuitable for more sustained flight. One Helios glider failed in 2003 due largely to poor mass distribution and high sensitivity to environmental conditions, and the ERAST Program ceased in the same year.

Since the completion of the ERAST Program, other companies have also introduced solar glider programs, including the Airbus Zephyr, first developed in 2005 in association with the United Kingdom Ministry of Defence and intended to serve as a high-altitude platform station (HAPS). The Ordnance Survey of the UK has also introduced the Astigan A3 solar plane for use in cartography and other aerial imaging applications. Other research institutions, such as the Korea Aerospace Research Institute (KARI) have also attempted to compete with Airbus's system by introducing sustained flight solar planes.

Other companies have attempted, though ultimately failed, to introduce solar gliders, including the Google-acquired Titan Aerospace Solara, which only managed to fly for four minutes in 2015 before ultimately failing, with Google scrapping the project entirely years later without a fully functioning system. Facebook similarly developed the Aquila drone beginning in 2016, which utilized a V-shaped design and ultimately achieved flights on the order of a couple of hours before the project was scrapped and Facebook shifted its attention to working with Airbus. All of the above projects were complex and costly to build and repair, but generally had very limited reusability.

Therefore, what is needed is a solar-powered glider capable of sustained, long-term flight and adaptable for a number of purposes, including reconnaissance, remote monitoring, security, meteorology, and/or other purposes.

Referring now to the drawings in general, the illustrations are for the purpose of describing one or more preferred embodiments of the invention and are not intended to limit the invention thereto.

FIGS. 1-3B illustrate a glider according to one embodiment of the present invention. In one embodiment, a glider 100 includes a central section 101 spanning two fuselages 112. In one embodiment, the front of each fuselage 112 is attached to a propeller 102. The main wings 104 of the glider 100 are connected to the central section 101 at a point approximately above each fuselage 112. In one embodiment, a front section of each fuselage 112 extends frontally relative to the central section 101, such that there is a physical gap between the propellers 102 and the central section 101. In one embodiment, a section 106 of the fuselage 112 extends beyond the rear of the central section 101 to form two tail sections of the glider 100. In one embodiment, each tail section includes at least one horizontal stabilizer 108 and at least one vertical stabilizer 110.

In one embodiment, each propeller 102 is driven by a separate motor. This allows the system to have selectively to power only one propeller 102 at a given time or to variably power the propellers 102 as a means of providing additional flight control. For example, differential power to the propeller motors allows the glider 100 to execute a flat turn, with no bank or pitch required, allowing the system to circle a given area for long periods of time or to adjust position of the glider 100 without many wing components. In one embodiment, the flat turn is assisted by adjustment of the control surfaces 120 as discussed below, while, in another embodiment, the control surfaces 120 are not used. The ability to execute flat turns is particularly advantageous in the pursuit of data gathering, as it reduces the need for mechanical steering of sensor lenses, with the controllable timing for precise flight patterns allowing for planned multi-instrument or wide aperture data gathering.

In one embodiment, one or more photovoltaic cells are included on an upper surface of the wings 104 and/or the central section 101 of the glider 100. In one embodiment, one or more photovoltaic cells are included on an upper surface of the at least one horizontal stabilizer 108 of the tail section and/or on at least one surface of the at least one vertical stabilizer 110 of the tail section.

Triangular Cross-Section Fuselage

Figure 4A:
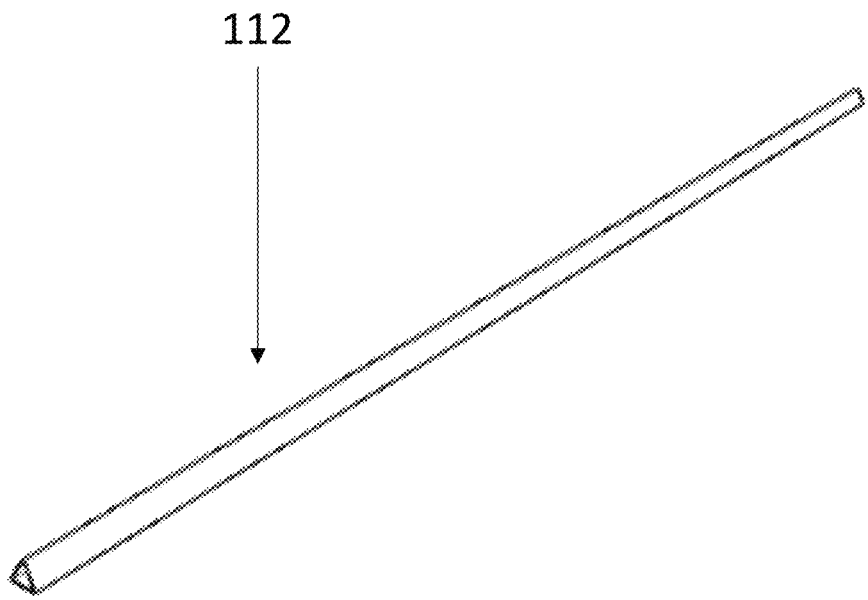
FIG. 4A illustrates a perspective view of a triangular-cross section fuselage for a glider according to one embodiment of the present invention.
Figure 4B:
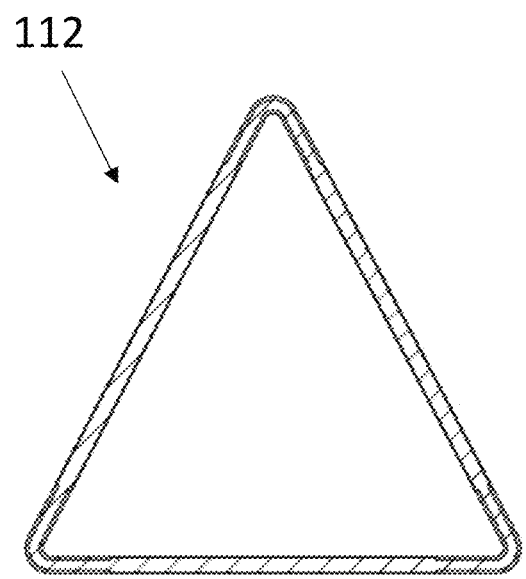
FIG. 4B illustrates a cross-sectional view of the triangular fuselage of FIG. 4A.

In one embodiment, the fuselages 112 have a substantially triangular cross-section, as shown in FIGS. 4A and 4B, with a point of the triangle directed upwards. In this embodiment, a base of the triangular cross section is thus parallel to (though not necessarily co-planar with) the central section 101 of the glider 100. In one embodiment, each fuselage 112 is formed from carbon fiber struts covered in a stretched polymer film. In one embodiment, the triangular cross-section is an equilateral triangle or an isosceles triangle wherein the two upward facing faces of the triangle are of substantially equal length. Forming the fuselage 112 with a triangular cross-section is particularly advantageous as it allows for the inclusion of photovoltaic cells on the fuselage 112 that are oriented at different angles than ones on the wings 104 or the central section 101, allowing for better maximization of solar energy. In one embodiment, the upward facing faces of each fuselage 112 are lined with one or more photovoltaic cells. In one embodiment, at least one wire runs through an interior of the fuselage, bringing power produced by the photovoltaic cells to the propellers 102 or an internal battery or processing system of the glider 100.

Figure 4C:
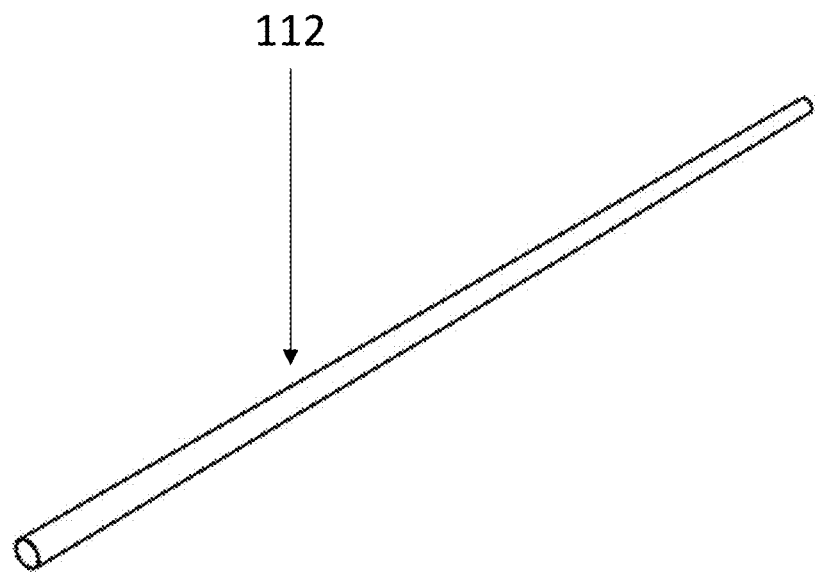
FIG. 4C illustrates a perspective view of a circular-cross section fuselage for a glider according to one embodiment of the present invention.
Figure 4D:
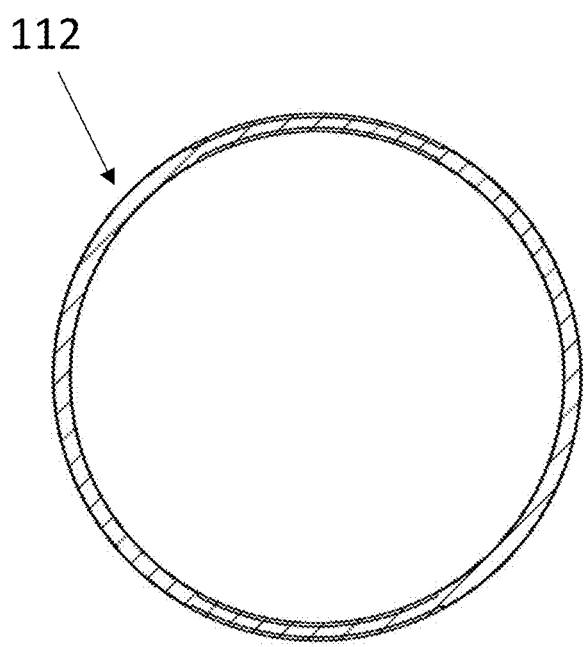
FIG. 4D illustrates a cross-sectional view of the triangular fuselage of FIG. 4C.

However, one of ordinary skill in the art will understand that cylindrical cross-section fuselages are also contemplated according to the present invention, as shown in FIGS. 4C and 4D.

Carbon Fiber Spar

The wings and wing spars of the glider are designed to be as light as possible while still maintaining sufficient torsional and longitudinal stiffnesses to maintain stability and structural integrity during normal flight conditions. In one embodiment, the spars of the wings 104 are tubular elements, having circular or elliptical cross-sections. In one embodiment, the inner surfaces and the outer surfaces of the spars are formed from a composite material (e.g., carbon fiber). In one embodiment, a structural foam core is used between the inner and outer composite material surfaces. In one embodiment, the structural foam core includes or consists of polymethacrylimide (PMI) (e.g., ROHACELL). The combination of the foam core with the composite surfaces provides a system that is both more rigid, stronger and lighter than a solid carbon fiber tube or a carbon fiber tube with a square cross section.

In one embodiment, different sections of the wing spar are formed from different foam materials or foam materials having different properties, allowing for distinct mechanical properties on different parts of the wing 104. By way of example and not limitation, in one embodiment, higher density foam (or increased carbon fiber quantities) is able to be used in areas where additional strength is necessary (e.g., a leading edge of the wing 104), while lower density foam is able to be used in areas where strength is less important (e.g., between the leading and trailing edges of the wing 104). Therefore, the wing spar is able to be varied to have non-uniform properties suiting particular flight characteristics needed for particular operations. The spar of the present invention is also operable to include a fuselage spar.

Very Fine Flight Control

Figure 3A:
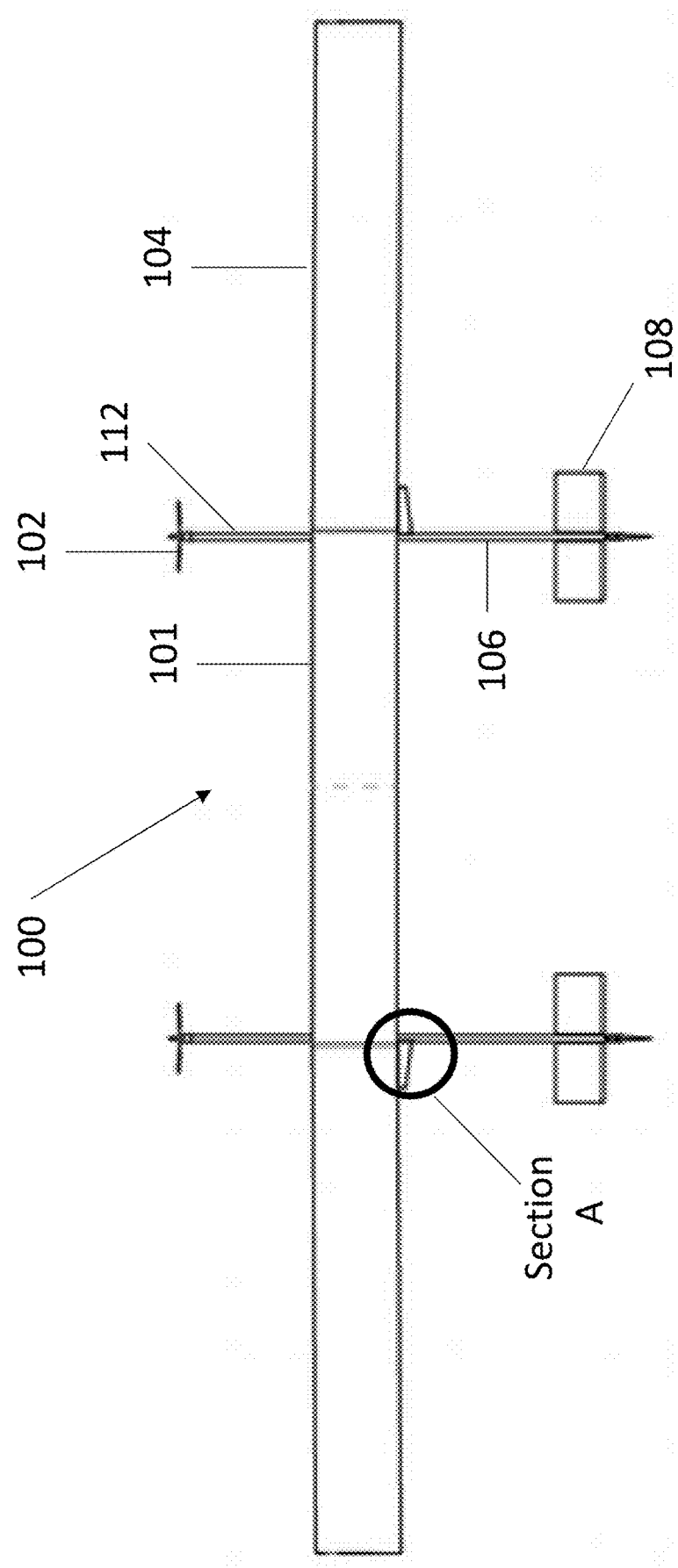
FIG. 3A illustrates a top orthogonal view of a glider according to one embodiment of the present invention.
Figure 3B:
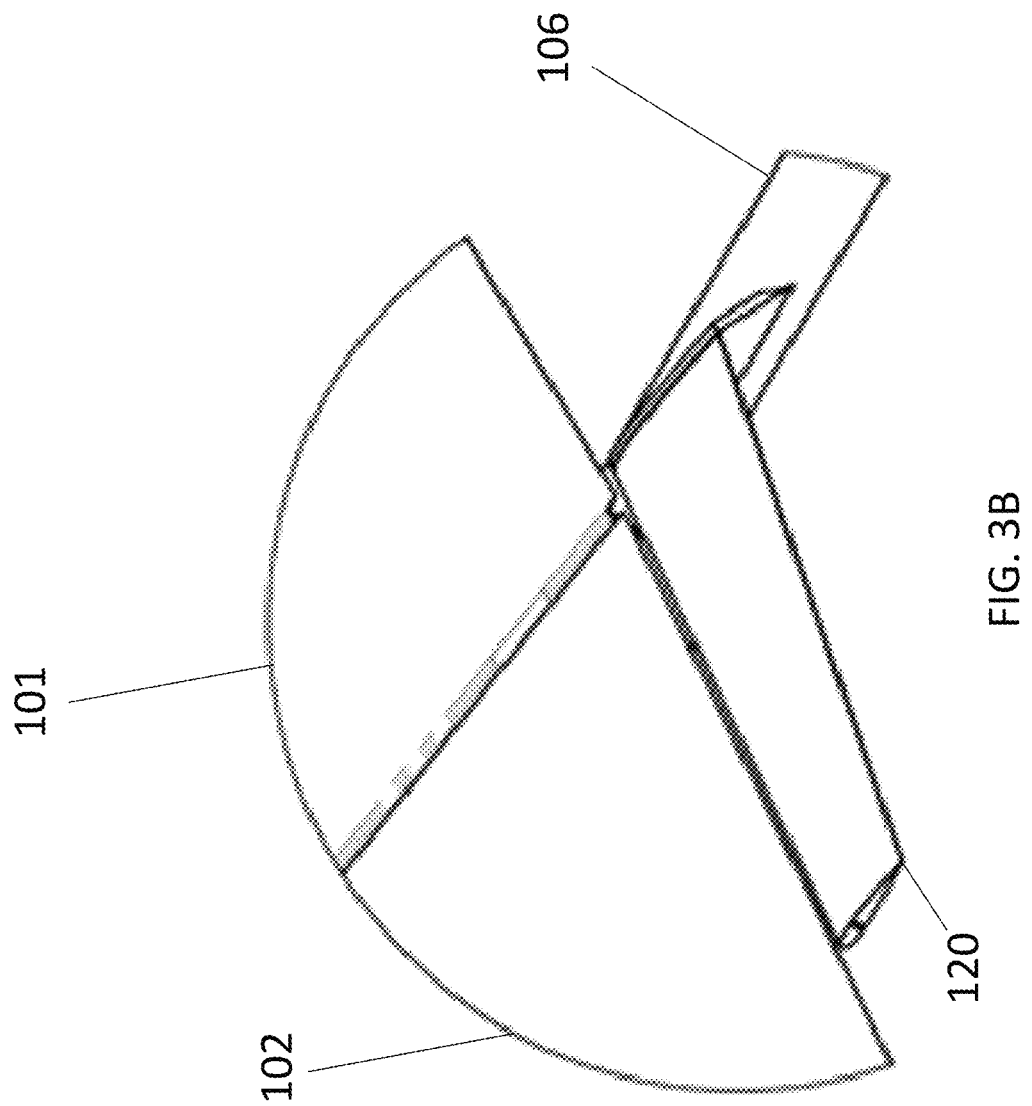
FIG. 3B illustrates an enlarged view of Section A of FIG. 3A.

As shown in FIG. 3B, in one embodiment, each fuselage 112 includes at least one control surface 120. In one embodiment, the at least one control surface 120 includes at least one trim aileron. In one embodiment, the at least one control surface 120 extends outwardly (i.e., toward a tip of the nearest wing 104). In one embodiment, the at least one control surface 120 is positioned beneath or immediately behind a rear portion of the wings 104. In one embodiment, the control surfaces 120 are movable such that the distance between a top surface of the control surface 120 and the bottom of the wing 104 is adjustable and/or an angle at which the at least one control surface 120 extends relative to the wing 104 is adjustable. In one embodiment, each control surface 120 is separately controllable. Movability of the control surfaces 120 allows for finer tuning of flight control of the glider 100, as adjusting the gap between the control surface 120 and the nearest wing 104 affects the amount of air able to move between the control surface 120 and the wing 104. This allows for the adjustment of lift during flight for stabilizing the flight of the glider 100. In one embodiment, the control surface 120 is connected to at least one motor or other actuator able to adjust the position of the control surface 120. In one embodiment, the at least one motor is connected to at least one power supply (e.g., one or more batteries, one or more solar cells, etc.) and/or at least one control system (e.g., including a processor and a memory) within the glider 100. In one embodiment, the at least one control system includes at least one antenna facilitating connection between the control system and at least one user device (e.g., at least one phone, at least one computer, at least one ground-based control device, etc.).

In one embodiment, no control surfaces (e.g., no flaps) extend from the wings 104 themselves. In one embodiment, the control surfaces 120 attached to the fuselages 112 are the only control surfaces 120 on the glider 100.

In one embodiment, the control surfaces 120 are attached to the tail section of the glider 100, theoretically providing high leverage and effectiveness of the control surfaces 120 due to the relative distance from the center of lift. This is disadvantageously however offset by the extra mass added to the tail, the increased wiring distances needed to connect to the control surfaces 120 (also, in turn, increasing the weight), and due to natural damping effects caused by flexure of the fuselages 112. Therefore, in a preferred embodiment, the control surfaces 120 are located behind and below the wings 104. Inclusion of the control surfaces 120 below the wing instead of, by way of example and not limitation, the tail section of the glider 100 allows for the mass of the control surfaces to be kept as close to the center of gravity as possible, providing greater stability. Furthermore, locating them below the wing produces secondary aerodynamic effects that provide enhanced functionality and reduce the amount of movement required in order to affect the flight control and stability of the glider 100.

Advantageously, in one embodiment, the main wings 104 of the glider system 100 include no moving parts, simplifying the design and reducing the cost and time for manufacturing. Furthermore, this provides for improved stiffness and lift characteristics of the wings, allowing loads (e.g., batteries, avionics, payloads, etc.) to be spread widely across the wings 104 and improving flight stability.

Figure 2:
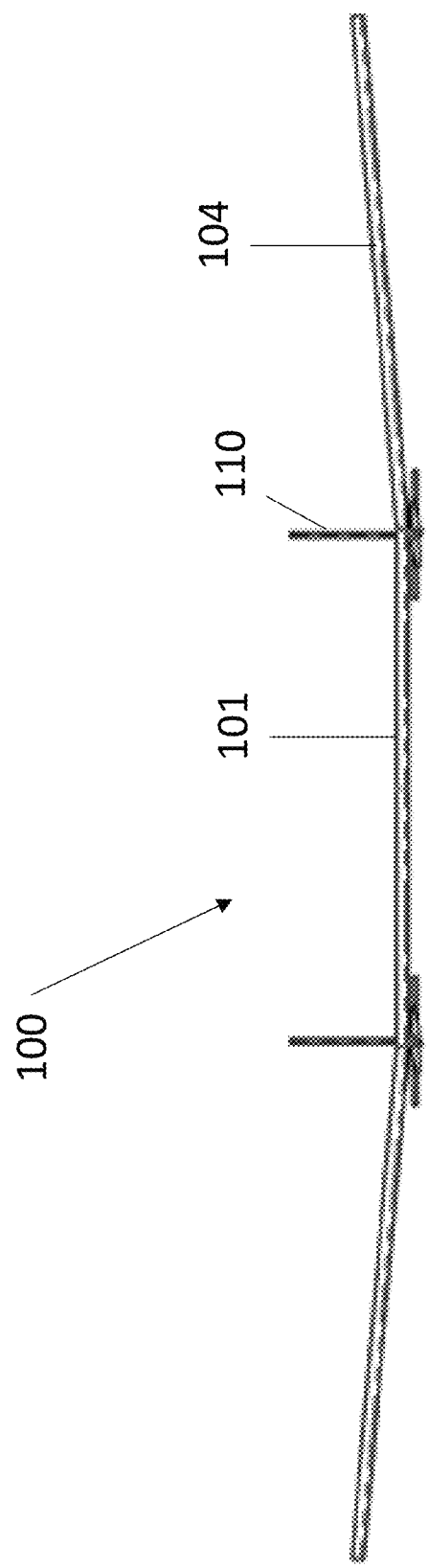
FIG. 2 illustrates a front orthogonal view of a glider according to one embodiment of the present invention.

In a preferred embodiment, the wingspan (i.e., total length between the tip of each wing 102) is approximately 38 m. In another embodiment, the wingspan is approximately 28 m. In yet another embodiment, the wingspan is approximately 8 m. In one embodiment, the wingspan is between approximately 35 m and 40 m. In another embodiment, the wingspan is between approximately 30 m and approximately 50 m. In still another embodiment, the wingspan is between approximately 32 m and approximately 34 m. In one embodiment, the wingspan is less than 38 m. In one embodiment, the length of the glider 100 is less than or equal to approximately 3 m. In one embodiment, the cord length of the wing is approximately 2.5 m. In one embodiment, the wings have a surface area to weight ratio of between approximately 0.5 to 2.0 m$^2$/kg, and more preferable between 1.0 to 2.0 m$^2$/kg. In one embodiment, as illustrated in FIG. 2, the central section 101 of the glider is substantially flat, while the wings 104 are angled slightly upwardly. In one embodiment, the angle between the central section 101 and the wings 104 is approximately 5°. However, one of ordinary skill in the art will understand that the precise angle of the wings 104 is able to vary according to the present invention. In one embodiment, a 28 m embodiment of the glider weights between approximately 30 kg and approximately 100 kg, not including any payload. In this system, in one embodiment, the payload is able to weight between approximately 15 kg and approximately 100 kg.

In the embodiment having a 32 m to 34 m wingspan, the payload capacity is approximately 12 kg, which corresponds closely to a wide payload inventory of commercial off-the-shelf instruments and CubeSat payload dimensions, but not so large as to require a heavy airframe.

Modular Construction

Figure 5:
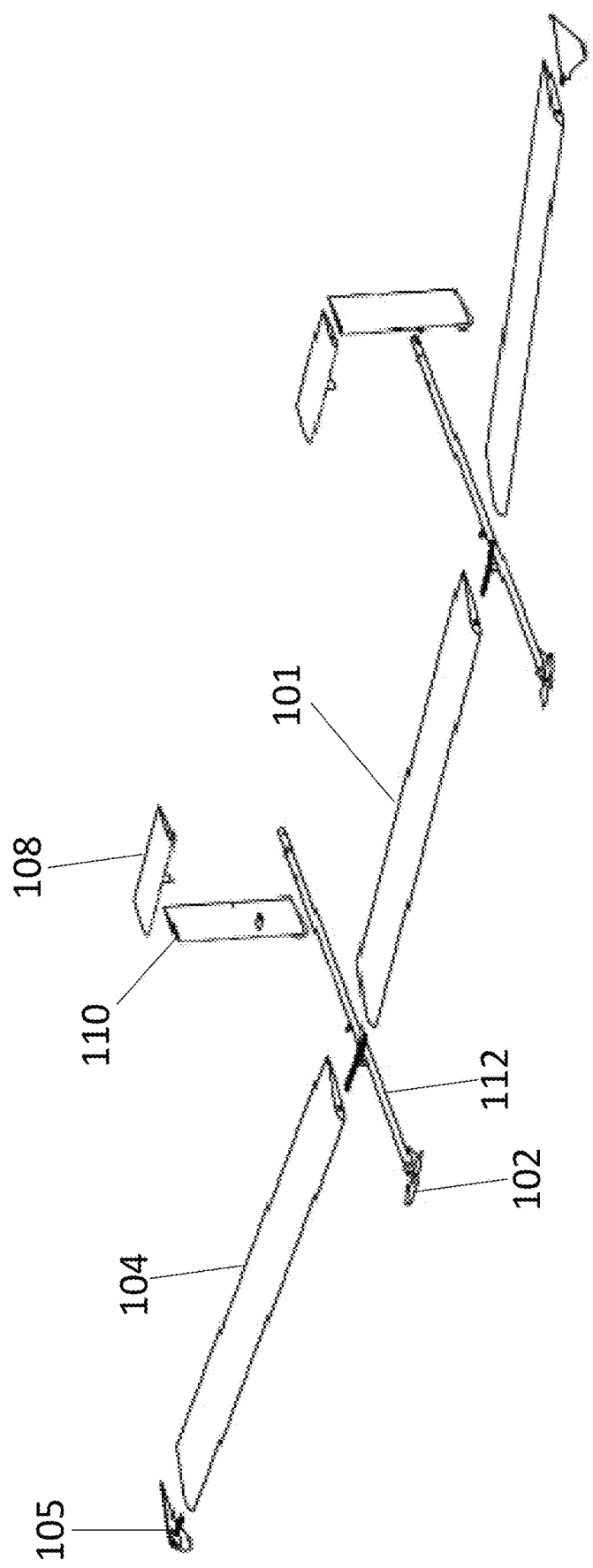
FIG. 5 illustrates a perspective view of a glider including modular components according to one embodiment of the present invention.

In a preferred embodiment, the glider 100 is designed to be highly modular, as shown in FIG. 5, in order to minimize servicing time and allow the glider 100 to be used for a variety of purposes. In one embodiment, different components are chosen to be added or removed from the glider 100 based on the specific application or mission type (e.g., weather monitoring, earth observation and imaging, border security, maritime patrol, anti-piracy, disaster response, agricultural observation, etc.) in order to have the required endurance characteristics and/or be able to carry a sufficient large payload. With conventional unmanned aerial vehicles (UAVs), time taken to inspect, and then repair, worn out or damaged sections of the UAV is time consuming and expensive, and limits the ability to maintain the UAVs in the air for the maximum amount of time possible. This is especially an issue for use of the glider 100 as a high-altitude platform station (HAPS), where up time is particularly important.

Components able to be modularly added, removed, or replaced in the glider 100 at any point during servicing include the central section 101, the wings 104, downward facing winglets 105, the fuselages 112 (or booms), the horizontal stabilizers 108, the vertical stabilizers 110, propellers 102, and/or other components. For example, components are able to be changed and adapted such that the glider has a different span or taper ratio or material type. By way of example and not limitation, each wing section is operable to be attached to and detached from the fuselage, each winglet is operable to be attached to and detached from the wing section, each vertical stabilizer is operable to be attached to and detached from the fuselage, and each horizontal stabilizer is operable to be attached to and detached from the fuselage. In addition to replacing damaged components with equivalent, un-damaged versions, this is also useful for, by way of example and not limitation, providing wings of different areas (e.g., increased wing area to increase overall lift for heavier payloads, decreased wing area for improved maneuverability, etc.), fuselages of different lengths (e.g., to change mass distribution) or widths, different payloads, and/or other parameters. In one embodiment, each wing 104 includes multiple modular sections able to be fit together to alter total wing area and wingspan of the glider 100. These modular sections are able to be oriented along a lateral axis (i.e., the axis running from wingtip to wingtip) and/or along a longitudinal axis (i.e., the axis from the front of the glider 100 to the back of the glider 100). In one embodiment, the modular components are connected by a universal joint system, which is also easily replaced. These joints are able to be designed as failure points such that stresses on the glider 100 do not cause critical components to break. Examples of joints able to be used for the present invention include tongue and groove joints, mortise and tenon joints, half-lap joints, biscuit joints, pocket-hole joints, dovetail joints, rabbet joints, spigots, sliding tubes, and/or any other type of joint known in the art. In one embodiment, the joints include a quick release mechanism. In one embodiment, each modular component is connected to other components via one or more tethers such that, even if the airframe fails, the elements stick together and fall together, reducing the risk of heavy items detaching and causing damage to people or property on the ground. Furthermore, these connected components are able to be made to allow the glider to descend with a slow descent mechanism similar to a sycamore leaf, with the parts held together.

This reduces the risk of heavy items (e.g., batteries or the payload) detaching and risking serious damage to someone on the ground. In general, the kinetic energy risk is mitigated due to the distribution of mass across the widest section of the wings of the glider without weight aggregated at a particular point.

Because weight is of critical concern in the design of the glider system, landing gear poses a particular problem, as landing gear or wheels tend to add considerable weight to the system, despite only being needed for a few minutes during take-off or landing. One alternative used in one embodiment of the present invention is a sacrificial landing system, where the sacrificial landing system is configured to take the brunt of the impact as the glider lands, allowing the glider to safely land without additional landing gear.

Downward Winglet that Acts as Landing Skid

Figure 6A:
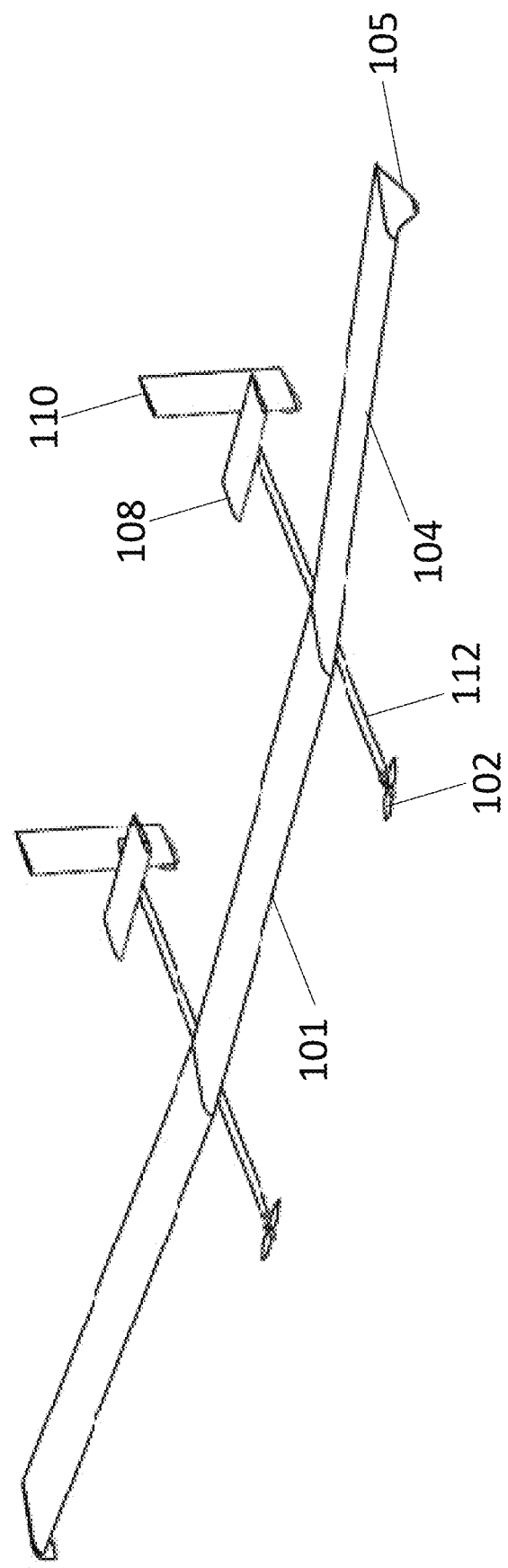
FIG. 6A illustrates a perspective view of a glider including downwardly facing winglets according to one embodiment of the present invention.
Figure 6B:
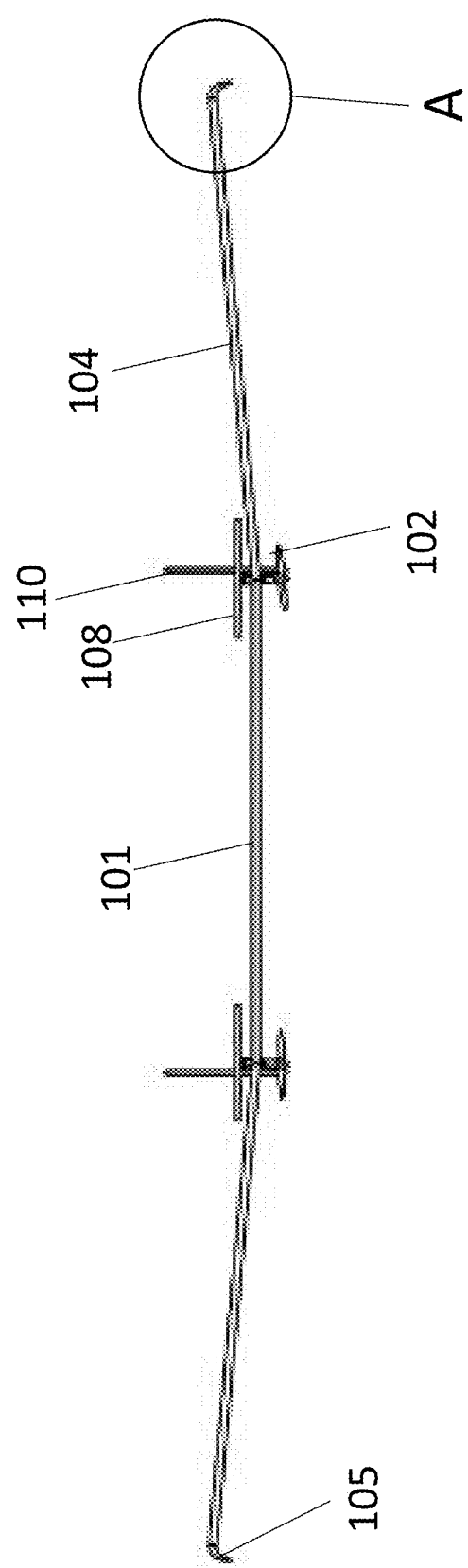
FIG. 6B illustrates a front orthogonal view of the glider depicted in FIG. 6A.
Figure 6C:
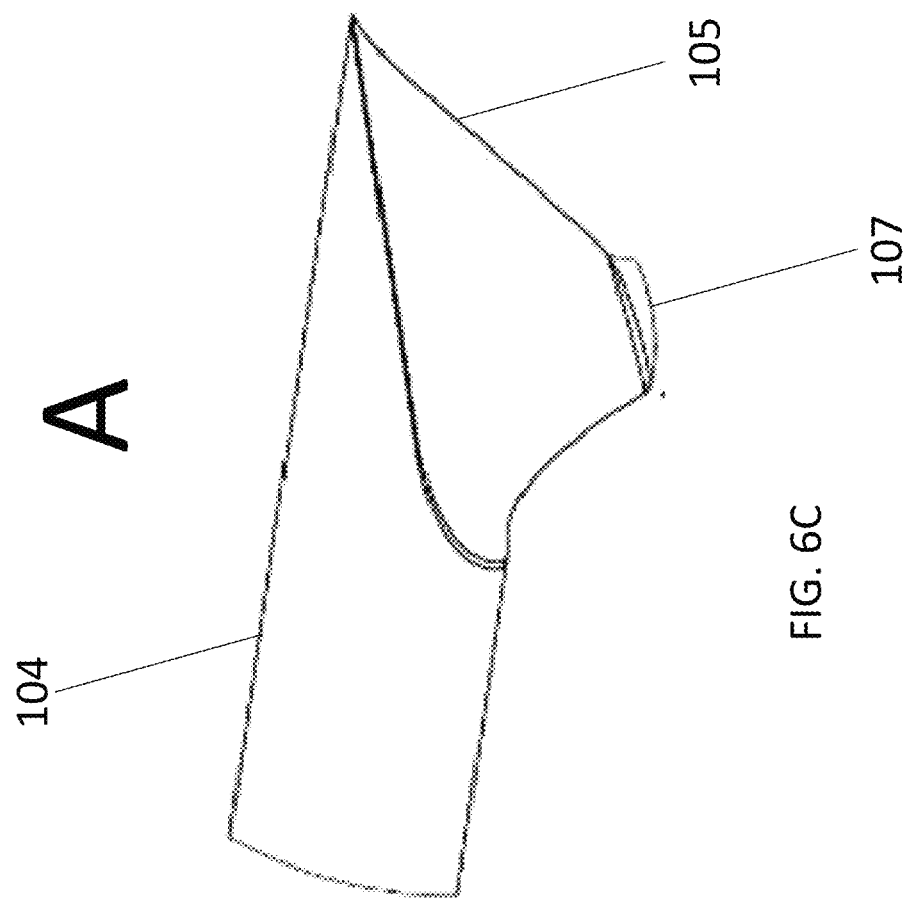
FIG. 6C illustrates an enlarged view section A of FIG. 6B.

In one embodiment, as shown in FIGS. 6A-6C, the sacrificial landing system includes winglets 105 extending downwardly from the tips of the wings 104 of the glider, allowing the winglets to serve as landing skids which protect the remainder of the glider from ground damage when the glider is landed. In one embodiment, the bottom tip or section 107 of the winglet 105 includes a sacrificial layer configured to contact the ground during landing. In one embodiment, the sacrificial layer includes or consists of light extruded polystyrene (XPS) foam, which is easily able to be replaced for future launches.

Figure 7:
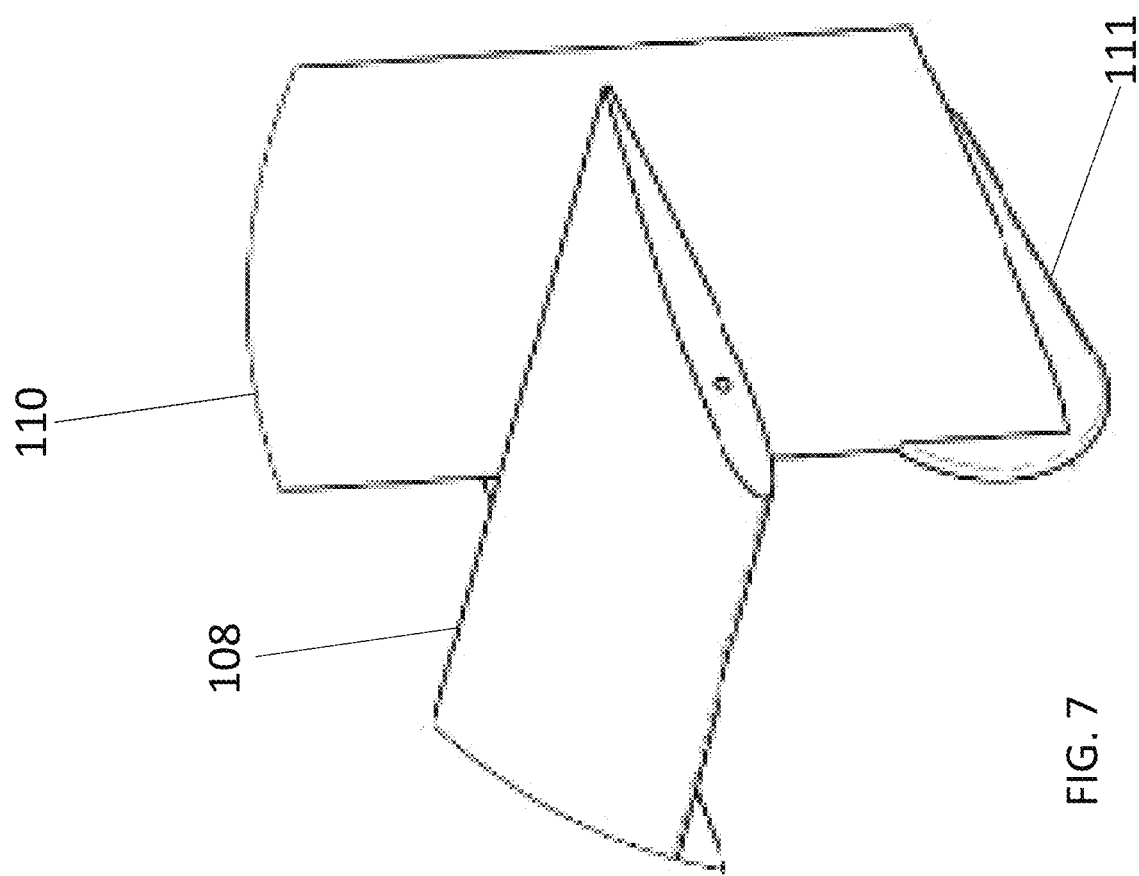
FIG. 7 illustrates an enlarged view of a tail section of a glider including a sacrificial base according to one embodiment of the present invention.

In one embodiment, the vertical stabilizers 110 on the tail sections of the fuselages 112 include a section extending downwardly from the fuselages 112. In one embodiment, as shown in FIG. 7, the bottom edge 111 of the downwardly extending portion of the vertical stabilizers include a sacrificial layer (e.g., formed from light extruded polystyrene (XPS) foam) such that the vertical stabilizers 110 are also able to serve as landing skids. Landing skids are operable to be any size to be compatible with the associated glider. By providing an additional strike point, the vertical stabilizers 110 therefore work in tandem with and assist the downwardly directed winglets.

Hinged Tail with Landing Skid

Figure 8A:
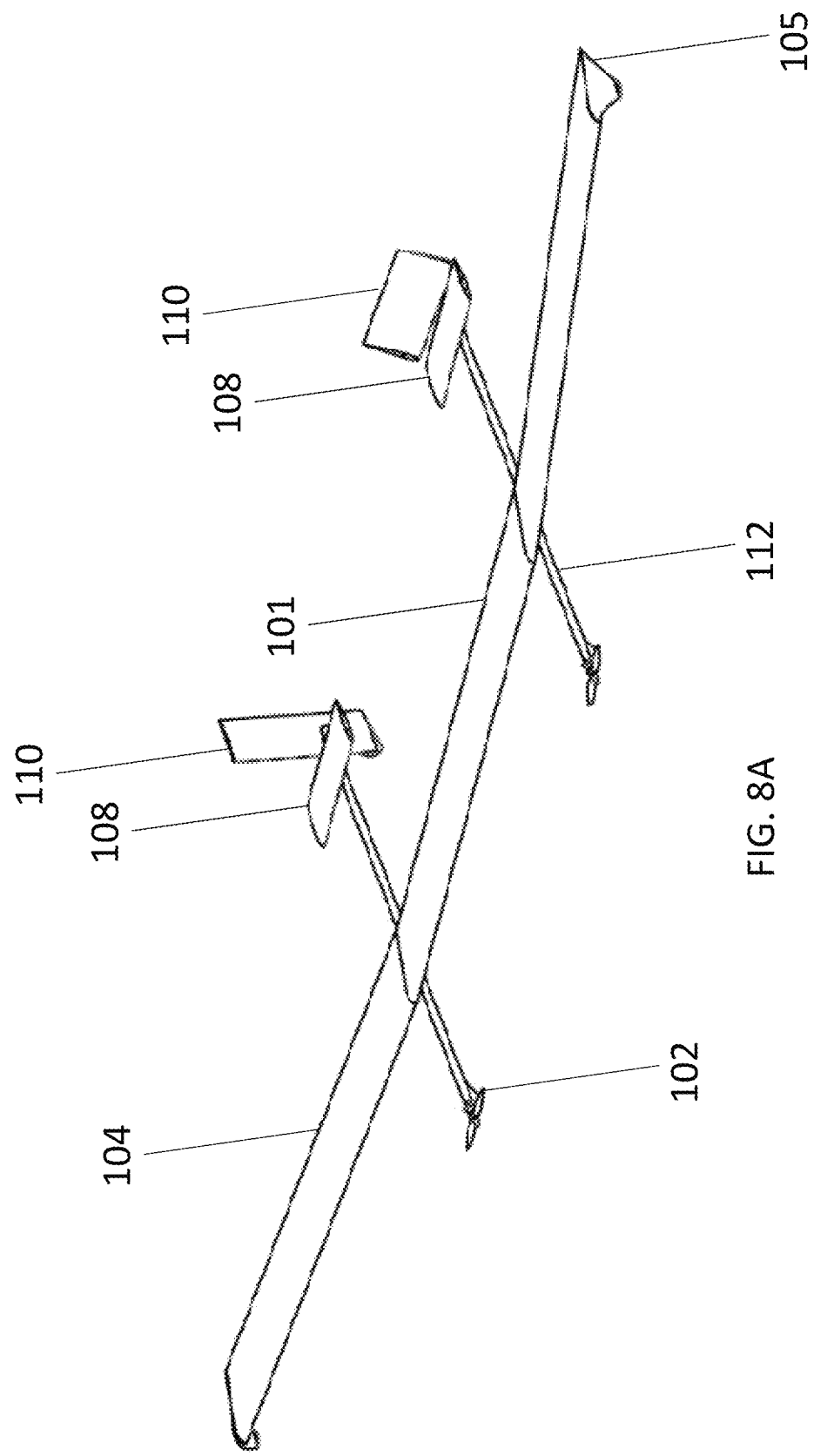
FIG. 8A illustrates a perspective view of a glider including a pivoting tail section according to one embodiment of the present invention.
Figure 8B:
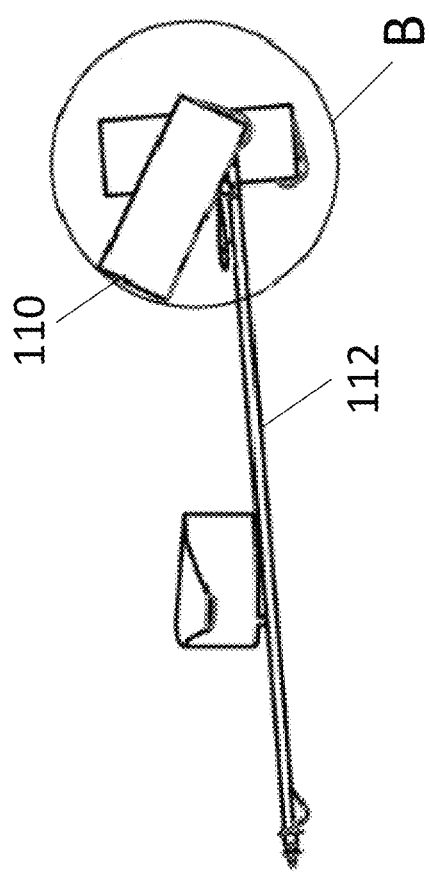
FIG. 8B illustrates an enlarged side orthogonal view of the pivoting tail section depicted in FIG. 8A.
Figure 8C:
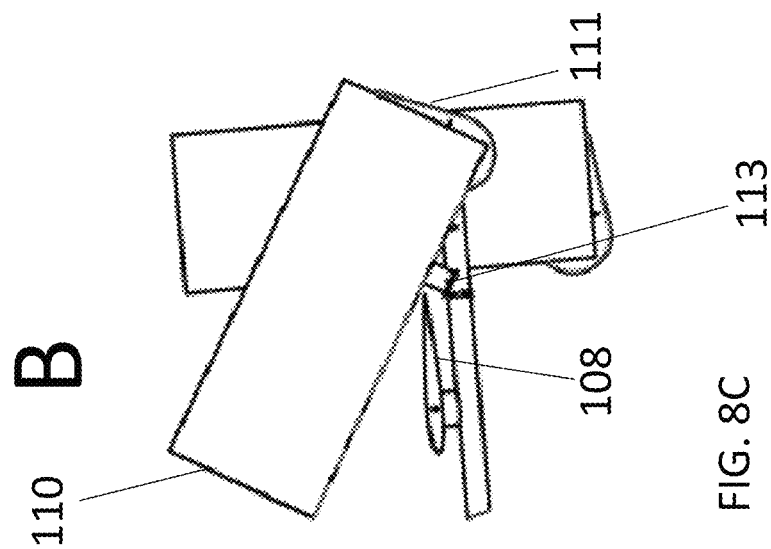
FIG. 8C illustrates a further enlarged view of section B of FIG. 8B.

In one embodiment, as shown in FIGS. 8A-8C, the downwardly directed vertical stabilizers 110 of the glider are hingedly attached to the fuselages 112 such that, when the stabilizers contact the ground or as the glider is descending, the top of the vertical stabilizer pivots forward about pivot points 113 connected to the fuselages 112. This allows the glider to avoid high bending moments being generated in the fuselages 112. In one embodiment, during flight, the vertical stabilizer 110 is prevented from hinging by at least one frangible pin and/or at least one lashing strap. In one embodiment, the downward facing vertical stabilizers 110 are configured to protect the underside of the fuselages 112 or the rear horizontal stabilizers by absorbing ground force when landing. In this way, like the winglets, the vertical stabilizers are able to include sacrificial material configured to contact the ground.

Battery Re-Positioning for Optimal Balancing

Figure 9A:
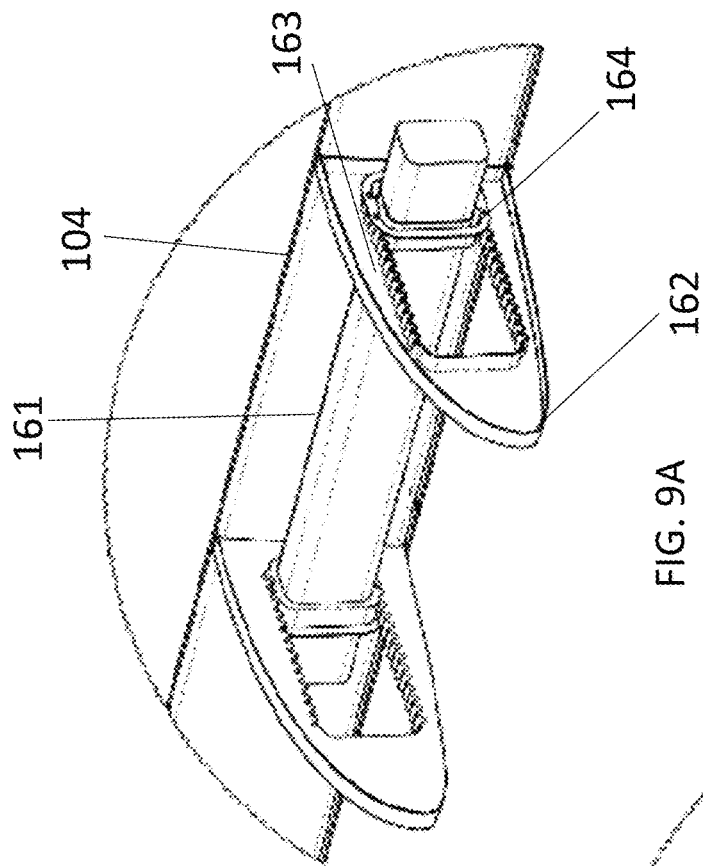
FIG. 9A illustrates a battery attached to a glider in a first position according to one embodiment of the present invention.
Figure 9B:
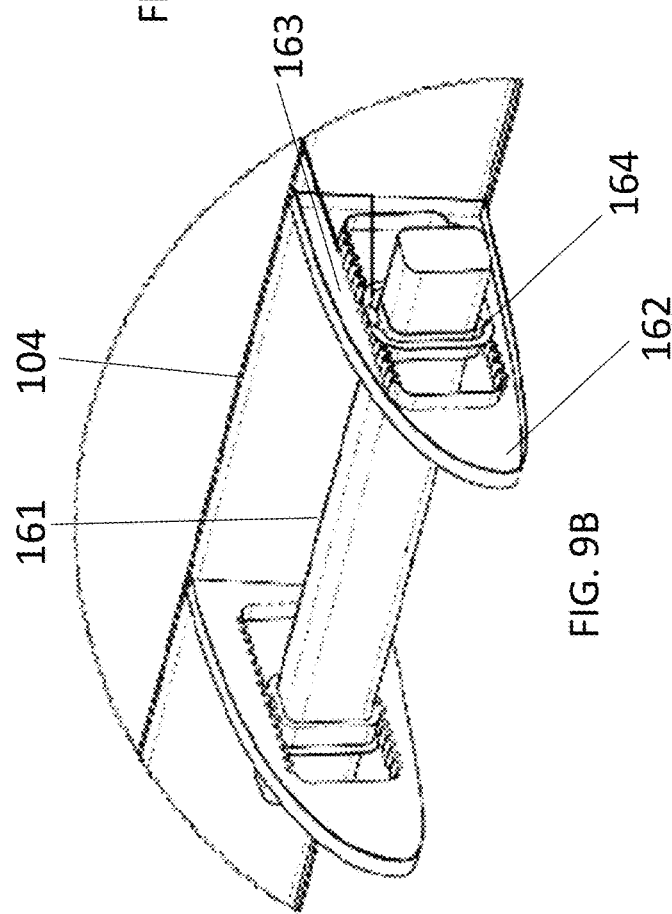
FIG. 9B illustrates a battery attached to a glider in a second position according to one embodiment of the present invention.

FIGS. 9A and 9B illustrate a battery attached according to one embodiment of the present invention. In one embodiment, one or more battery packs 161 are connected to the wings 104 by at least one frame (or rib) 162. The one or more battery packs 161 are operable to be rechargeable lithium-ion batteries and are operable to be positioned in the forward part of the wing. In one embodiment, the lithium-ion batteries are distributed along the length of the wings (e.g., central wing, main dihedral wings, etc.) of the glider, meaning perpendicular to the long axis of the plane. In one embodiment, one or more lock collars 164 surround one or more sections of the one or more battery packs 161. The mechanical adjustments via the lock collars provide for fore and aft adjustments of the battery packs 161. In one embodiment, the at least one frame 162 include an opening extending through the frame 162. In one embodiment, the at least one frame 162 includes a plurality of teeth 163 extending into the opening. In one embodiment, the one or more lock collars 164 are configured to engage with the plurality of teeth 163 of the frame 162, with the one or more lock collars 164 maintaining a consistent position of the battery pack 161 during flight (or a consistent position absent a command to move the battery pack 161 during flight). However, when the glider is not in flight, the battery pack 161 is able to be adjusted in order to rebalance the weight distribution of the glider.

Each wing is able to include multiple battery packs 161, each housed in a foam-covered leading edge of the wing, wherein the foam covering is detachable from the wing ribs, exposing the batteries and enabling quick battery replacement and swapping. The foam covering also provides thermal insulation and therefore enhanced regulation for the batteries.

In one embodiment, the battery position adjustment system is attached to or forms part of a wing rib. In another embodiment, the battery adjustment system is located in a leading edge of the wing. In one embodiment, the battery adjustment system is located behind a removable part in a leading edge of the wing, such that the battery or battery pack is able to be inserted or removed and the position adjusted once the removable part is removed. By placing the heavy batteries in the main wings, fluctuations that would otherwise stress the wing spar are able to be reduced or dampened. Furthermore, by distributing the mass of these non-airframe items across the dihedral main wings, as opposed to placing the mass in the fuselage, the loading on the joints between the main wings and the fuselage is reduced. This principle is able to also apply to other non-airframe items, such as payload sensors, avionics, communications equipment, and other items, enabling quicker replacement and swapping. For some types of items, such as stereoscopic imaging systems, there are further benefits from placing these sensors closer to the wingtips as well. Foam covering for thermal insulation and similarly able to be used for each of these item types.

Battery B systems also present a concern, in terms of total weight and weight distribution, for glider systems including electronic components. Because no liquid fuel needs to be burnt for the glider system, the mass distribution of the glider system remains generally constant during use. This means that, despite the relatively heavy weight of the batteries used in the glider, the positions of the batteries typically do not need to be adjusted during flight. However, it is often advantageous to adjust the positions of the batteries before flight to improve load balancing, depending on the mass and location of payloads carried by the glider.

In one embodiment, the batteries in the glider are distributed across the length of the wings and central section of the glider. In one embodiment, the batteries are located in the front half of the wings and/or the central section of the glider. In one embodiment, the batteries are mounted on a lightweight frame, with the position of the batteries on the frame able to be manually altered between flights. In one embodiment, the position of the batteries with respect to the front or rear of the glider is able to be altered in addition to the lateral position (e.g., toward port or starboard) of the batteries. In one embodiment, the vertical position of the batteries is also able to be adjusted. In one embodiment, adjustments of the frontal, lateral, or vertical position of the batteries are able to be independently made.

In one embodiment, the glider includes one or more lithium-ion batteries. However, one of ordinary skill in the art will understand that the present invention is not limited to lithium-ion batteries and other forms of batteries or fuel cells are also able to be used in addition to or in lieu of the lithium-ion batteries.

Figure 10:
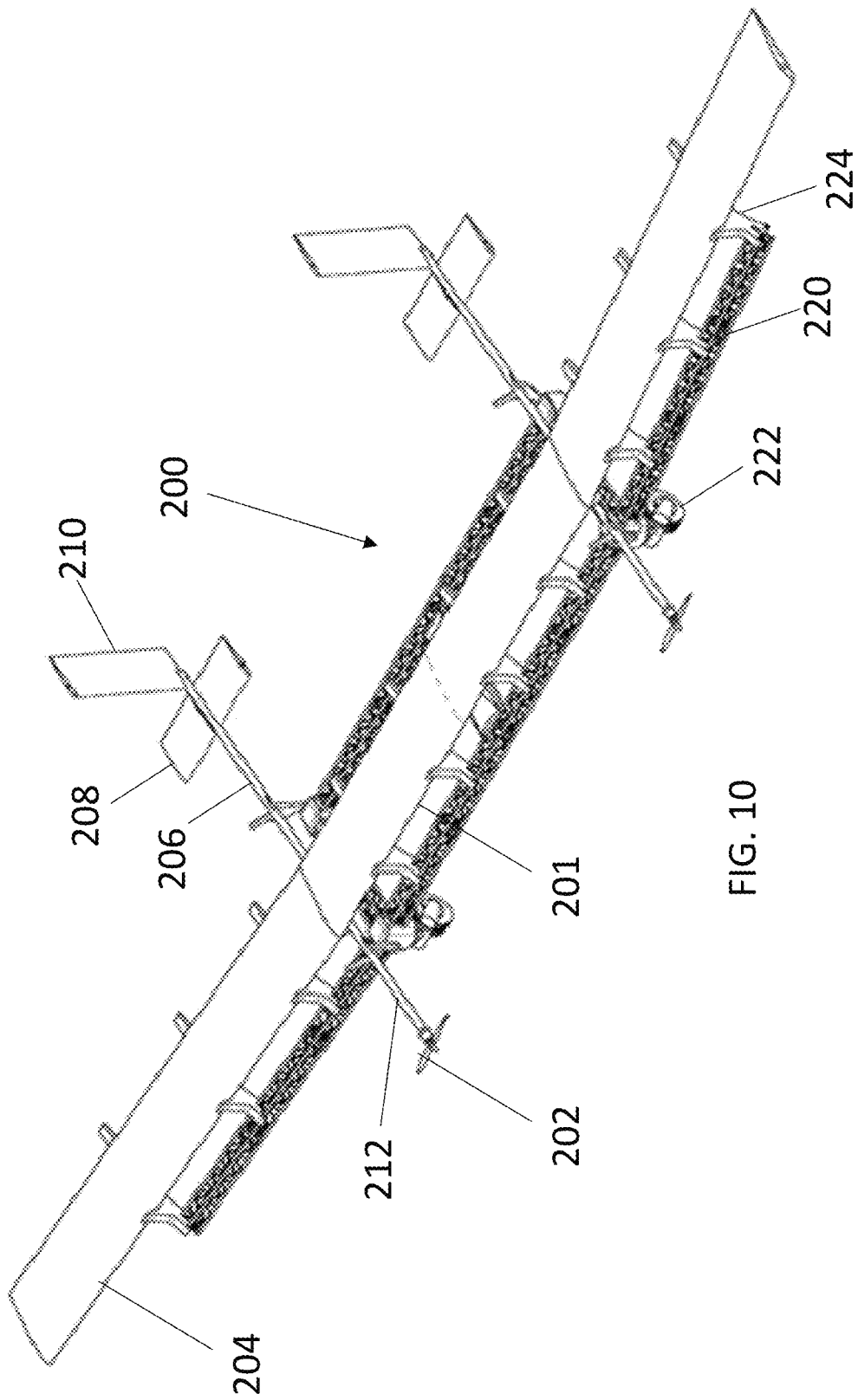
FIG. 10 illustrates a perspective view of a glider atop a landing system according to one embodiment of the present invention.
Figure 11:
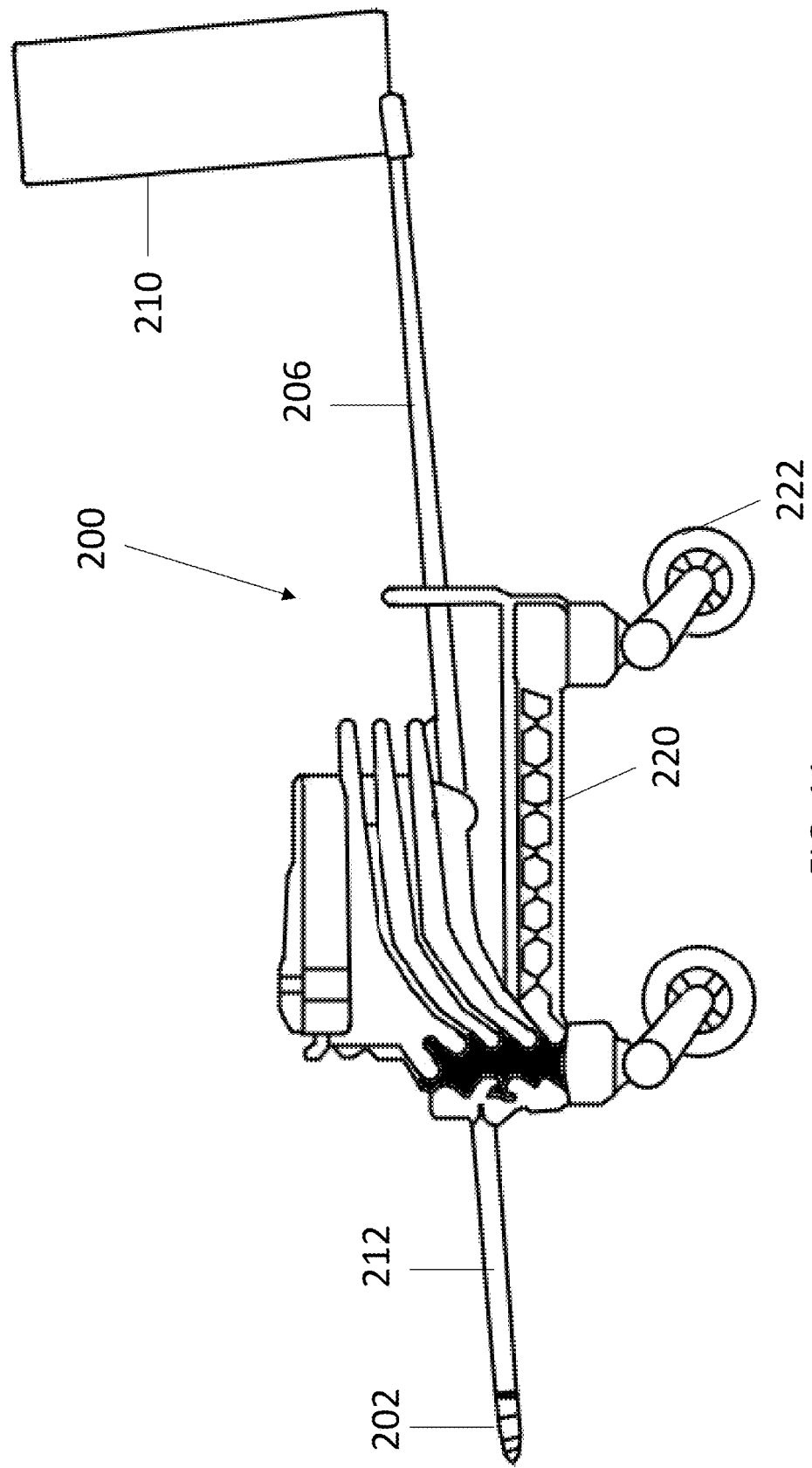
FIG. 11 illustrates a side orthogonal view of a glider atop a landing system according to one embodiment of the present invention.

Glider Lands on an Autonomous Vehicle that Receives Data from an Imaging System on the Glider FIGS. 10 and 11 illustrate a glider atop a landing system according to one embodiment of the present invention. Similar to FIGS. 1-3, the glider 200 shown in FIGS. 10 and 11 includes a central section 201 spanning twin fuselages 212, wherein each fuselage is attached to a propeller 202 at a front end and a section 206 extending behind the central section 201. Wings 204 are attached to the central section 202 proximate to the location of the fuselages 212. The back section 206 of the twin fuselages includes a tail section includes at least one horizontal stabilizer 208 and at least one vertical stabilizer 210.

In one embodiment, as the glider 200 comes down, it is able to be caught by a ground-based landing system 220. In one embodiment, the ground-based landing system 220 includes a plurality of wheels 222. In one embodiment, the plurality of wheels are connected to motors or other actuators and are able to be remotely operated via wireless or wired connection to at least one user device (e.g., a phone, a computer, etc.). The plurality of wheels are operable to be battery powered and are operable to swivel and to drive in any direction. In one embodiment, the ground-based landing system 220 includes a processor and a memory such that landing system 220 is capable of autonomous movement. In one embodiment, the ground-based landing system 220 includes one or more sensors (e.g., optical sensors, magnetic sensors, etc.) operable to detect a position of the glider 200 and automatically move to a position beneath the glider 200 so as to catch it without requiring remote operation. By way of example and not limitation, in one embodiment, at least one optical sensor (e.g., infrared sensors, LiDAR sensors, etc.) is directed at and detects the glider 200 at an initial position and the ground-based landing system 220 is able to detect an instantaneous direction of movement, velocity vector, and/or acceleration vector for the glider 200 based on this reading. The ground-based landing system 220 then moves to a second position based on the direction of movement, velocity vector, and/or acceleration vector for the glider 200 and takes a second reading, allowing the ground-based landing system 220 to continuously follow the glider 200. In another example, the ground-based landing system 220 includes an antenna operable to receive geolocation data from a geolocation sensor attached to the glider 200. The ground-based landing system 220 is then able to reposition to the geolocation of the glider 200 in order to catch it. In one embodiment, the ground-based landing system 220 is configured to match the approximate velocity of the glider 200 so as to minimize any impact between the glider 200 and the ground-based landing system 220 and to therefore protect the glider 200. The landing system is operable to aid in transportation, maintenance, or any other task necessary or useful for the glider.

Ground Handling Vehicle that can Move in any Direction

In one embodiment, the wheels 222 of the ground-based landing system 220 is pivotably connected to a base of the ground-based landing system 220 such that the wheels 222 are able to rotate and roll in any direction, allowing the ground-based landing system to adjust to move in a perpendicular direction quickly. This is useful in allowing the ground-based landing system 220 to move not only forward and backward, but also laterally in order to catch the glider 200. Furthermore, once the ground-based landing system 220 has caught the glider 200, this helps in allowing the ground-based landing system 220 to move the glider 200 such that a wingtip of the glider 200 enters a storage hanger first. In one embodiment, each wheel 222 includes a rotatable support allowing it to move in different directions. However, in another embodiment, the plurality of wheels 22 include at least one omnidirectional wheel. Omnidirectional wheels able to be used in the present invention include any omnidirectional wheel known in the art, including, but not limited to, those described in U.S. Pat. Nos. 10,071,596, 10,675,912, and/or 9,434,208, each of which is incorporated herein by reference in its entirety. In one embodiment, the wheels 222 are capable of swiveling or otherwise changing a direction of motion while the ground-based landing system 220 is in motion or at rest.

In one embodiment, the ground-based landing system 220 includes a plurality of supports 224 extending upwardly from a top surface of the ground-based landing system 220. In one embodiment, the plurality of supports 224 are the components configured to directly contact the glider 200 as it lands on the ground-based landing system 220. In one embodiment, the plurality of supports 224 each include a horizontal extension and a front vertical extension. The horizontal extension is the part of the supports 224 that the glider 200 rests atop after landing (specifically the central section 201 and wings 204 of the glider 200), while the vertical extension is able to stop vertical forward motion of the glider 200 to secure the landing. In one embodiment, the plurality of supports 224 are distributed at regular intervals horizontally across the top of the ground-based landing system 220. However, one of ordinary skill in the art will understand that the relative spacing, number, and distribution of supports 224 on the ground-based landing system are able to be varied according to the present invention.

In one embodiment, a top surface of the ground-based landing system 220 is formed from a soft, impact absorbent material so as to facilitate the softest landing possible for the glider 200. However, ideally, the glider 200 begins landing at a shallow angle, reducing the amount of force placed on the glider 200 at impact.

In one embodiment, the ground-based landing system 220 is approximately 20 m wide and approximately 3 m long. However, one of ordinary skill in the art will understand that the dimensions are able to vary depending on the application and the size of the glider 200.

Figure 12:
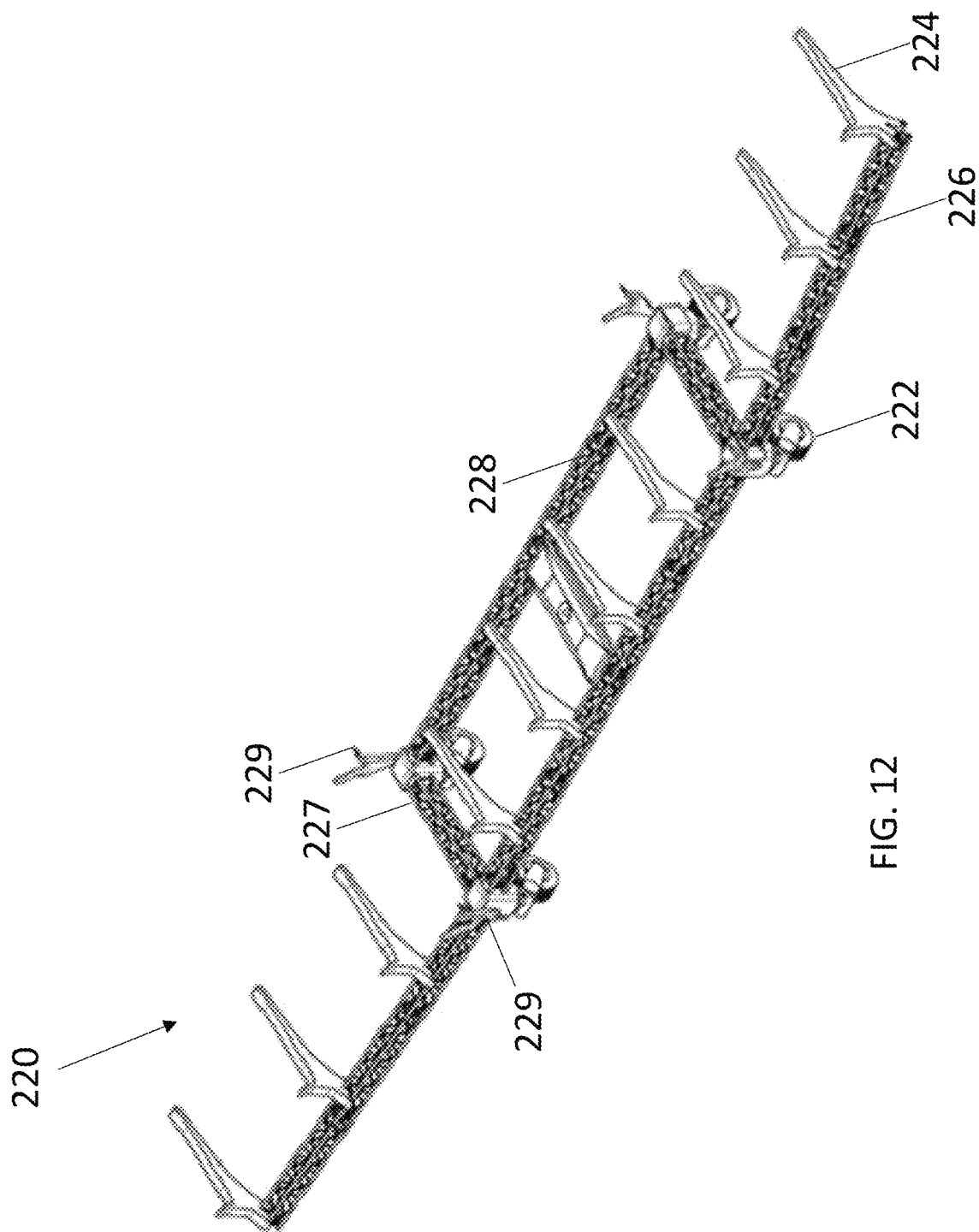
FIG. 12 illustrates a perspective view of a landing system for a glider according to one embodiment of the present invention.
Figure 13:
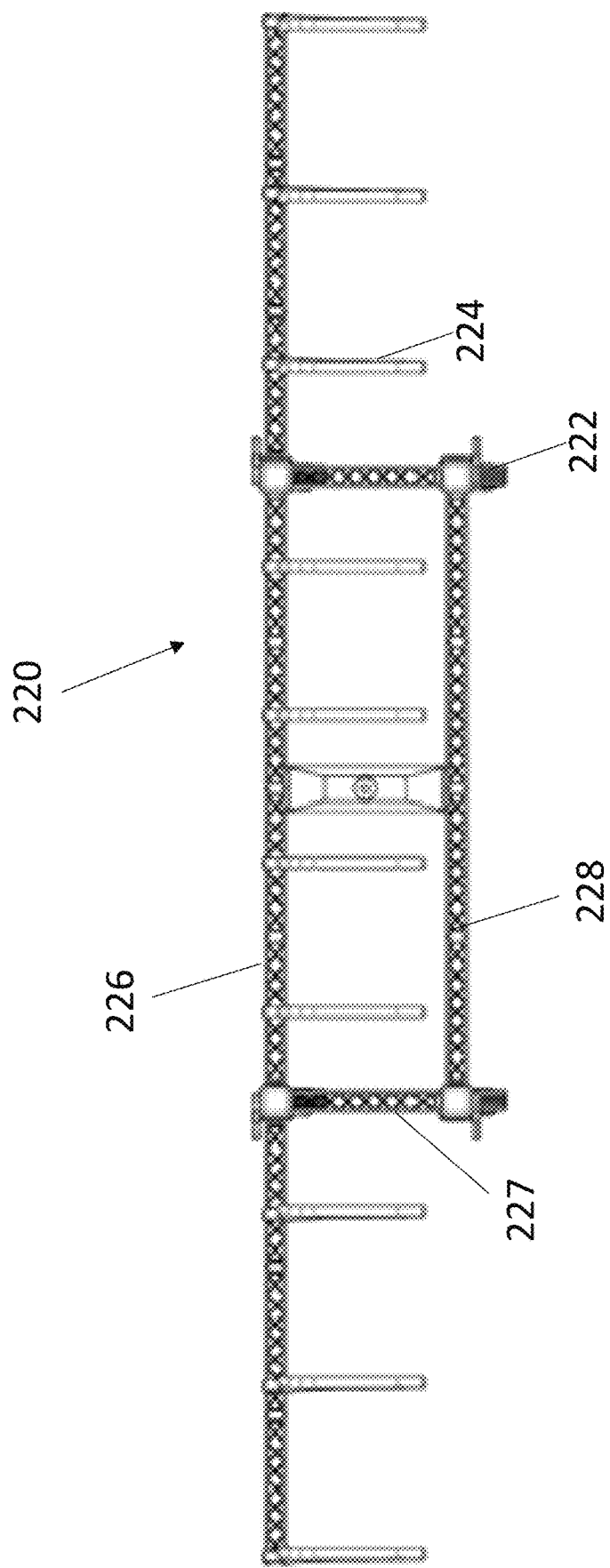
FIG. 13 illustrates a top orthogonal view of a landing system for a glider according to one embodiment of the present invention.
Figure 14:
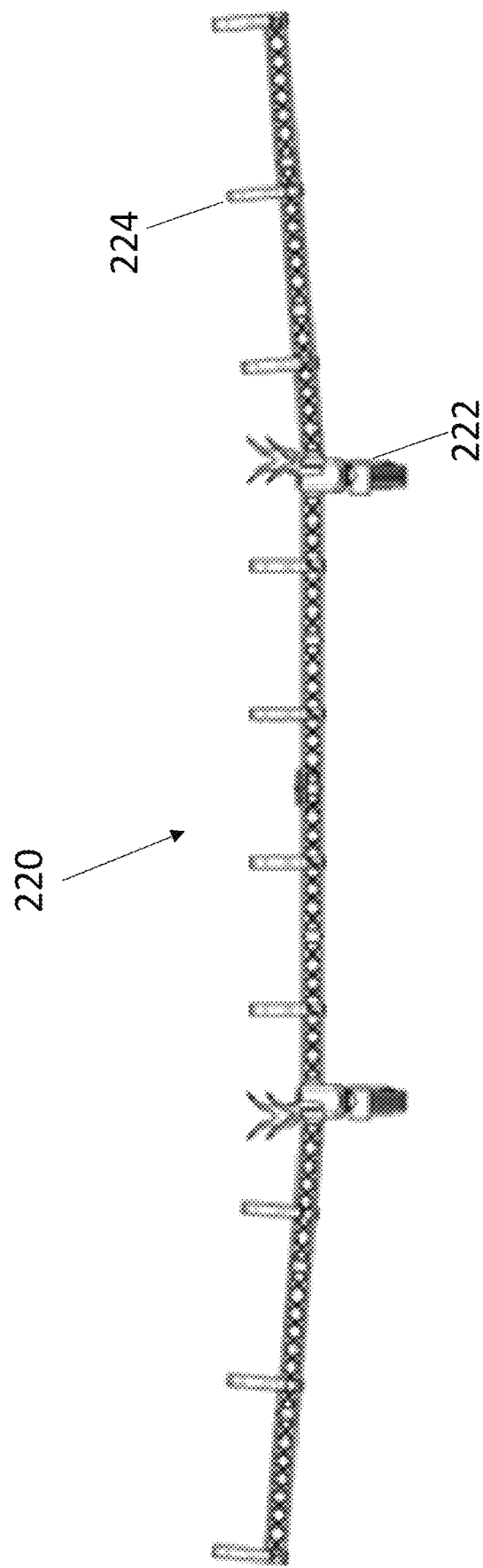
FIG. 14 illustrates a front orthogonal view of a landing system for a glider according to one embodiment of the present invention.

FIGS. 12-14 illustrate a landing system for a glider according to one embodiment of the present invention. The size and shape of the ground-based landing system 220 are able to be varied so as to suit the design the glider 200. In one embodiment, as shown in FIGS. 6-8, the ground-based landing system 220 includes a front horizontal section 226 and a rear horizontal section 228 wherein the front horizontal section 226 and the rear horizontal section 228 are substantially parallel and coplanar. The front horizontal section 226 and the rear horizontal section 228 are connected by at least one bridging section 227. In one embodiment, the at least one bridging section 227 is substantially orthogonal to the front horizontal section 226 and/or the rear horizontal section 228. In one embodiment, the ground-based landing system 220 includes at least two bridging sections 227, each of which is connected to a different end of the rear horizontal section 228. In one embodiment, the wheels 222 of the ground-based landing system 220 extend downwardly from the front horizontal section 226 and the rear horizontal section 228 proximate to where the at least one bridging section 227 connects with the rear horizontal section 228 and/or the front horizontal section 226. In one embodiment, each of the wheels 222 of the ground-based landing system 220 are approximately the same size. In one embodiment, as shown in FIG. 14, a central section of the ground-based landing system 200 is substantially flat, while side sections of the ground-based landing system 200 are angled upwardly to match the wing angle of the glider 200.

In one embodiment, at least one fuselage stand 229 or fuselage holder extends upwardly from the ground-based landing system 220. The at least one fuselage stand 229 includes at least two prongs separated by a divot in which the fuselage 212 of the glider 200 is configured to rest when atop the ground-based landing system 220. In one embodiment, the at least one fuselage stand 229 extends upwardly from the ground-based landing system 220 at locations where the at least one bridging section 227 connects with the front horizontal section 226 and/or the rear horizontal section 228. Therefore, in one embodiment, the ground-based landing system 220 includes at least two fuselage stands 229 for each fuselage 212 of the glider 200, with one fuselage stand 229 support a section of the fuselage 212 in front of the central section 201 of the glider and a second fuselage stand 229 supporting the rear section 206 of the fuselage 212. However, one of ordinary skill in the art will understand that the relative locations of the at least one fuselage stand 229 are able to be varied in accordance with the design of the glider 200 and the positioning of the fuselages 212 within the glider 200.

In one embodiment, in addition to being used to facilitate landing, the ground-based landing system 200 is able to be used for launching the glider, providing a moving head start to allow the glider to build momentum and/or lift.

Glider with Detachable Propulsion Pod

In one embodiment, the glider does not use onboard power supplies in order to reach gliding altitude. This is advantageous as takeoff systems often require large amounts of power and the limited weight requirements of the glider mean that the battery is likely to be substantially drained by the time the glider reaches altitude if the takeoff system saps most of the energy. This is especially an issue if it is not a particularly sunny day and the photovoltaic cells on the glider are unable to make up for the lost energy. Furthermore, the glider design of the present invention is optimized for high altitude flight, not for takeoff, meaning that, in order to utilize a traditional takeoff, the glider potentially needs to be changed in order to reoptimize.

Instead of a traditional takeoff system, the glider is attached to at least one separate, detachable pod including fuel and a propulsion system and/or a motor and batteries. In one embodiment, the at least one separate, detachable pod includes an internal battery with full charge at takeoff, with the pod obtaining electric power for its motor during the ascent from the internal battery and/or from photovoltaic cells on the glider. In one embodiment, internal batteries of the pod are able to recharge any battery onboard the glider that falls below a predetermined charge level. In one embodiment, the separate, detachable pod includes at least one takeoff propeller. In one embodiment, the separate, detachable pod is capable of allowing the glider to reach a high altitude (e.g., approximately 15,000 ft, approximately 30,000 ft, etc.) such that high altitude flight is able to begin. Furthermore, because the system is separate and does not rely on the internal power system of the glider, the glider energy supply is not drained and it is capable of longer uptime. In one embodiment, once the glider has reached gliding altitude, the separate, detachable pod automatically detaches. In one embodiment, the detachable pod is operable to recharge batteries of the glider as the time the detachable pod is scheduled to detach from the glider approaches, such that the batteries of the glider are fully charged by the time the pod detaches from the glider. In one embodiment, the separate detachable pod includes a parachute system (or another slow flight system such as a paraglider, parafoil, or glider wings) that automatically deploys after detaching, allowing the pod to gently reach the ground, reducing risk of damage or harm below and potentially allowing the pod to be reused in the future. In one embodiment, the separate, detachable pod and/or the glider include at least one sensor system operable to sense an altitude of the glider and the pod automatically detaches upon determining that the altitude is greater than a predetermined minimum value. In another embodiment, the separate, detachable pod detaches when its fuel (e.g., for an internal combustion engine (ICE) or electrical energy source) or battery is fully drained, meaning that the fuel or battery system is able to be optimally design to only allow the glider to reach a desired height.

Tail-First Vertical Lift and then Nose-Down Release

When launching the glider from a vehicle or a relatively confined space, it is often desirable to have a nearly vertical launch to prevent collisions and to maintain line-of-sight with the glider as it ascends. Therefore, in one embodiment, the system includes a vertical takeoff system. In one embodiment, one or more balloons are attached to a tail section of the glider, allowing the glider to ascend with the fuselages directed vertically downwards, substantially orthogonally to the ground. Therefore, as it ascends the nose of the glider points toward the ground. When the system exceeds a minimum altitude (e.g., between approximately 18,000 m and approximately 30,000 m), the balloons are automatically released, allowing the glider to dive downwards and swiftly assume substantially level flight. Importantly, in this system, the glider should be dropped from an altitude slightly higher than the desired gliding altitude, as the height of the glider will momentarily drop after the release of the balloons. However, this initial drop is often quite small (e.g., 10 m for a 28 m wide glider at sea level), but the distance required to reach level flight will depend on the altitude and the size of the glider. In one embodiment, the one or more balloons are each filled with approximately 500 $m^3$ of Helium gas. 500 $m^3$ of Helium is capable of lifting approximately 50 kg at an altitude of 26,000 m. This means that the number of balloons is able to be selected depending on the weight of the glider and payload. By way of example and not limitation, a total system weight of 200 kg requires at least four 500 $m^3$ balloons to lift. In one embodiment, the climbing rate of the vertical takeoff system is between approximately 1 m/s and approximately 10 m/s.

In one embodiment, the vertical takeoff system and/or the glider include at least one sensor system operable to sense an altitude of the glider and the one or more balloons automatically detach upon determining that the altitude is greater than a predetermined minimum value. In another embodiment, the vertical takeoff system detaches after a predetermined amount of time, configured to approximately correspond with the desired altitude.

Using the vertical flight system, the glider does not need to be designed to withstand takeoff and turbulent flight conditions that impose high dynamic wind loads before reaching the calmer, lower density air of the stratosphere where the glider ultimately glides. Furthermore, the propellers on the glider do not need to be overdesigned for takeoff or for turbulent conditions, allowing the propellers to be scaled down, thereby reducing cost and weight of the glider and improving efficiency and allowing for heavier payloads to be included.

Over-Sized Foam Core Used in Carbon Fiber Propeller Blade

Figure 15A:
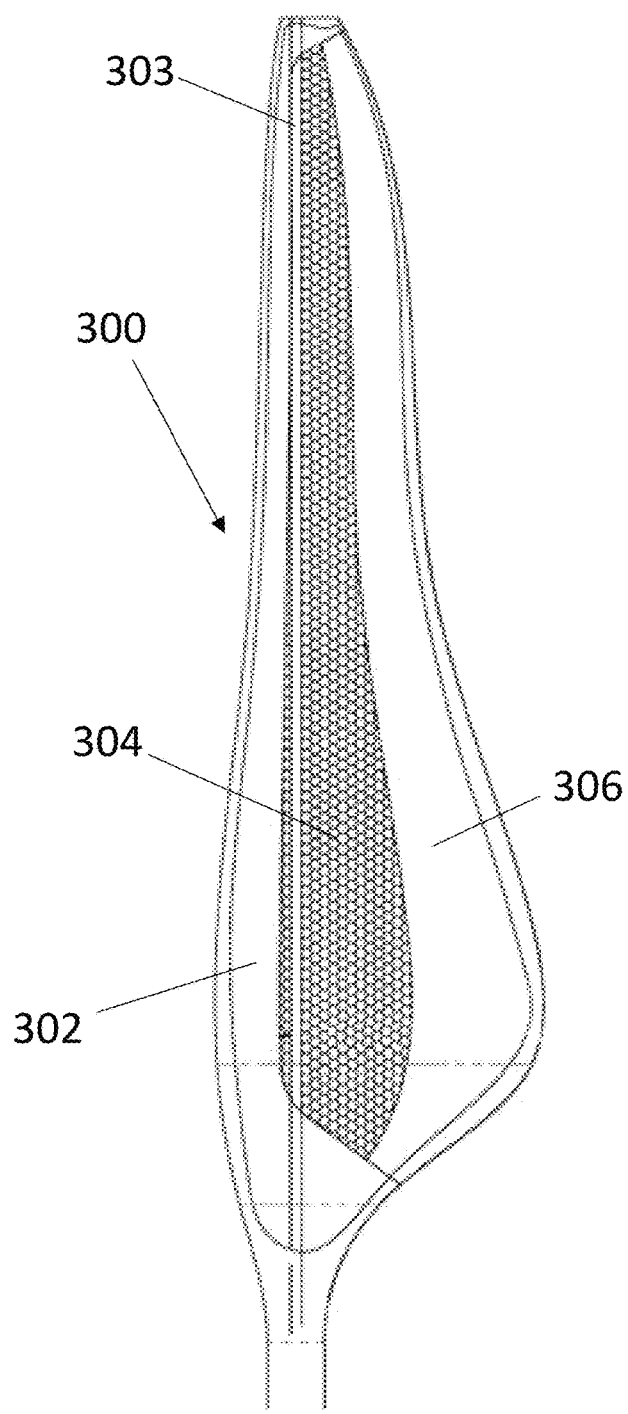
FIG. 15A illustrates a top orthogonal view of an airfoil structure for use with a glider according to one embodiment of the present invention.
Figure 15B:
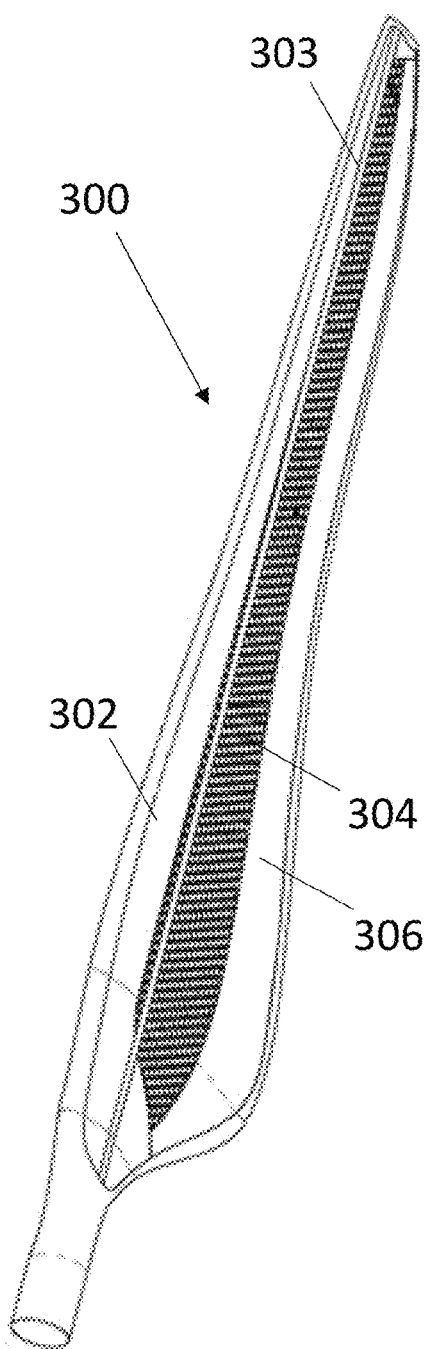
FIG. 15B illustrates a perspective view of the airfoil structure depicted in FIG. 15A.
Figure 15C:
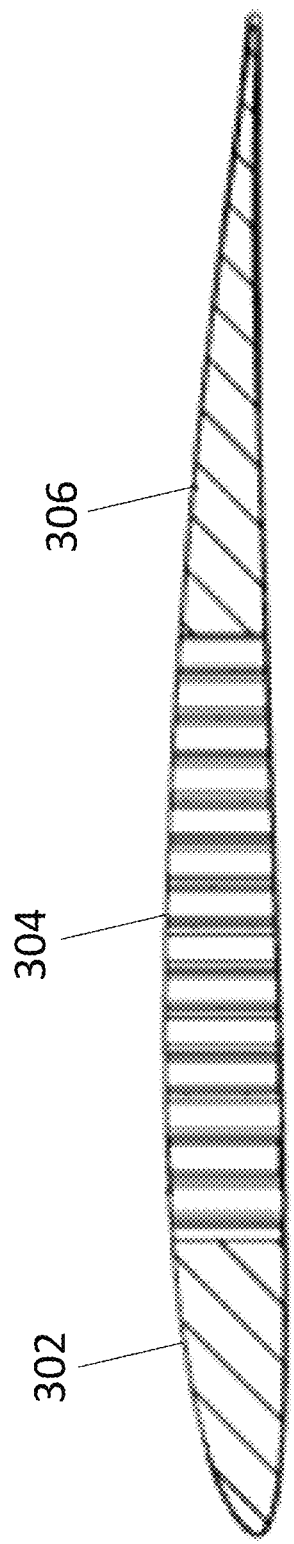
FIG. 15C illustrates a cross-sectional view of the airfoil structure depicted in FIG. 15A.

FIGS. 15A-15C illustrate an airfoil structure for use with a glider according to one embodiment of the present invention. In one embodiment, the propellers used for the glider utilize propeller blades 300 optimized for high performance with minimal mass. In one embodiment, the propeller blades include a foam core and composite outer shell. In one embodiment, the composite outer shell includes carbon fiber.

In one embodiment, the propellers include two, three, four, five, or any number of propeller blades 300. Propeller blades of the gliders are operable to be selected based on several different parameters, including but not limited to weight, efficiency, or operating conditions of the glider. As it is advantageous to be able to keep the glider in the air as long as possible, the propellers need to have notably loss mass. In one embodiment, different regions of the propeller blade include different types of materials or different structures that are suited to different flow or force regimes to allow for minimization of mass and for variation of stiffness across the blade.

Carbon Fiber Propeller Blade with Inhomogeneous Internal Structural Foam Core

In one embodiment, the propeller blades 300 include a honeycomb 304 core, with the honeycomb pattern serving to reduce the total mass of the blade 300. In one embodiment, the honeycomb 304 section of the blade is an interior part of the blade (i.e., not along the trailing or leading edge), as strength of the interior section of the blade is less important and therefore this section serves as a good place for mass reduction. In one embodiment, the propeller blades 300 include foam cores and a center section of the foam core is carved out with a light-weight honeycomb structure inserted to replace the removed material. Alternatively, in one embodiment, the entirety of the propeller blades 300 are made with a honeycomb core structure 304, but with some sections (e.g., the leading edge) stiffened with additional elements to add strength or rigidity.

In one embodiment, the propeller blade 300 includes a high-density foam 302 adjacent to the leading edge of the blade 300 and adjacent to the stem of the blade 300. In another embodiment, the leading edge of the blade 300 is constructed of high-density foam. In one embodiment, the propeller blade 300 includes a low-density foam 306 adjacent to the trailing edge of the blade 300. The honeycomb structure 304 then separates the high-density foam 302 section from the low-density foam 306 section. In one embodiment, the high-density foam 302 is designed to handle a different regime of forces and potential failure modes typically faced by the leading edge of an airfoil, while the low-density foam 306 is designed to handle forces and failure modes typically faced by the trailing edge of an airfoil. In one embodiment, instead of including higher density foam along the leading edge of the blade 300, other materials are included (e.g., extra carbon fiber, aramid fibers, pre-formed composite stiffeners, etc.) are included to provide differential structural performance for the leading edge of the blade 300. Similarly, material other than low-density foam is able to be added to the trailing edge in order to handle different forces or failure modes. In one embodiment, an external contour of the blades includes additional reinforcement 303.

Although the airfoil structure 300 depicted in FIG. 15A is frequently referred to herein as a propeller blade 300, the same design is also able to be used for a strut or spar element within the glider in order to reduce weight and therefore improve performance.

Figure 16A:
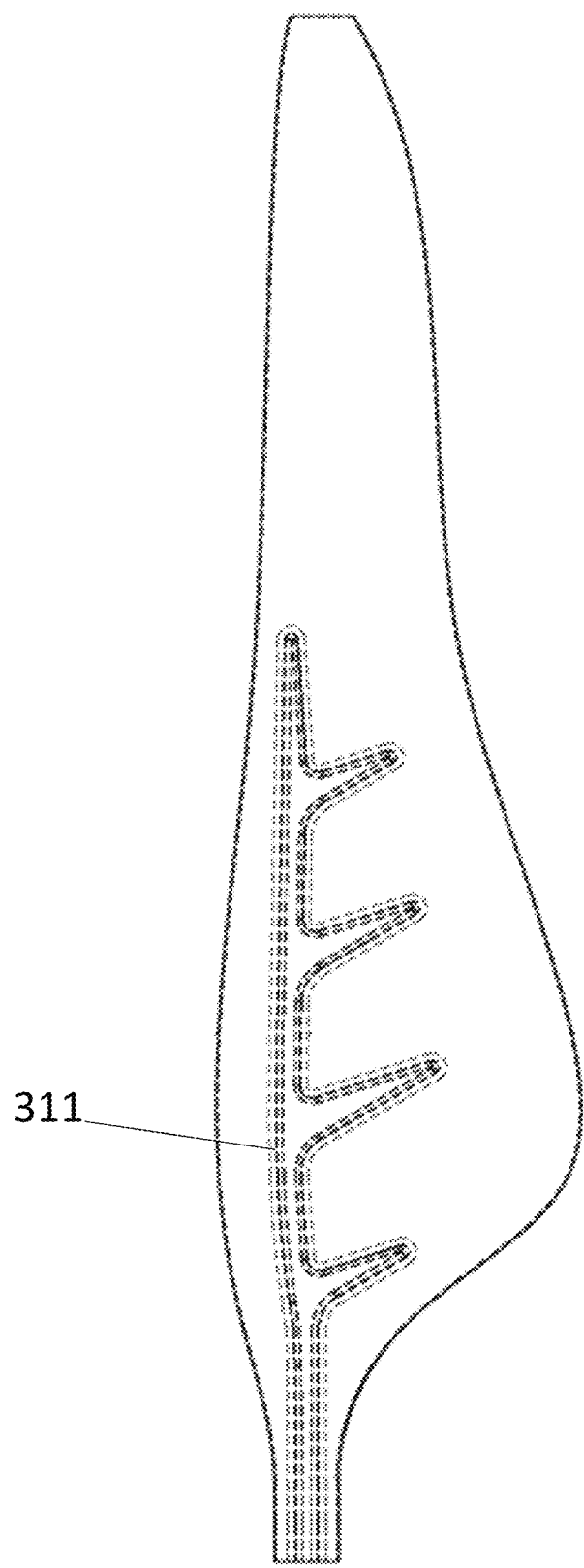
FIG. 16A illustrates a top orthogonal view of an airfoil structure for use with a glider according to another embodiment of the present invention.
Figure 16B:
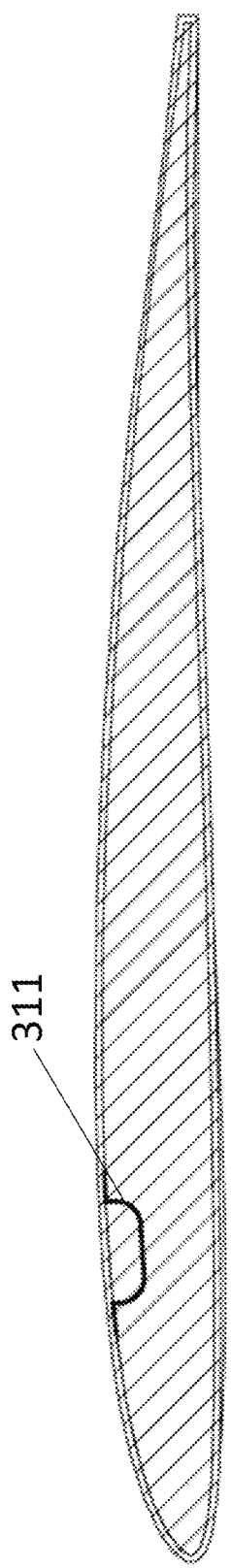
FIG. 16B illustrates a side cross-sectional view of the airfoil structure depicted in FIG. 16A.
Figure 16C:
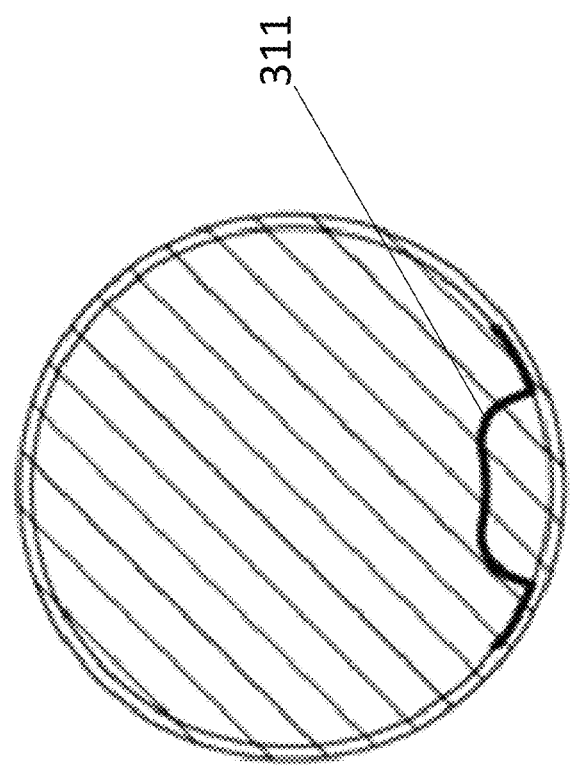
FIG. 16C illustrates a front cross-sectional view of the airfoil structure depicted in FIG. 16A.

FIGS. 16A-16C illustrate an airfoil structure for use with a glider according to another embodiment of the present invention. In the embodiment shown in FIGS. 16A-16C, the propeller blade includes one or more pockets or cavities 311 design to fine tune the structural properties of the blade. In one embodiment, the pockets or cavities 311 include embedded materials, including but not limited to, carbon fiber tubers, additional laminate, high density foam, and/or other materials. This provides for additional structural support helps to distribute the load more effectively across the length or width of the propeller blade, especially in regions of the blade experiencing higher stresses or where increased strength or rigidity is desirable. The inserts with the foam core create a composite structure selected based on desired performance characteristics. In one embodiment, the root of the blade, in particular includes an insert for added stiffness, including but not limited to, additional carbon fiber, synthetic fiber (e.g., KEVLAR fiber), or pre-formed composite stiffeners. This is particularly advantageous for the root of the blade, as the root needs to be robust to transfer high torque effectively.

Figure 17A:
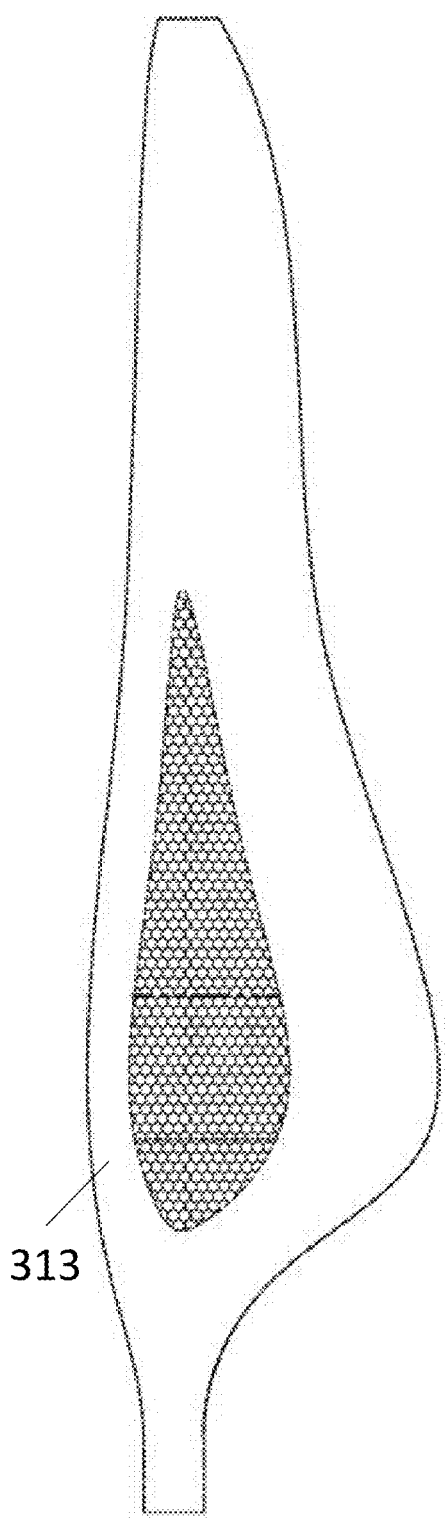
FIG. 17A illustrates a top orthogonal view of an airfoil structure for use with a glider according to yet another embodiment of the present invention.
Figure 17B:
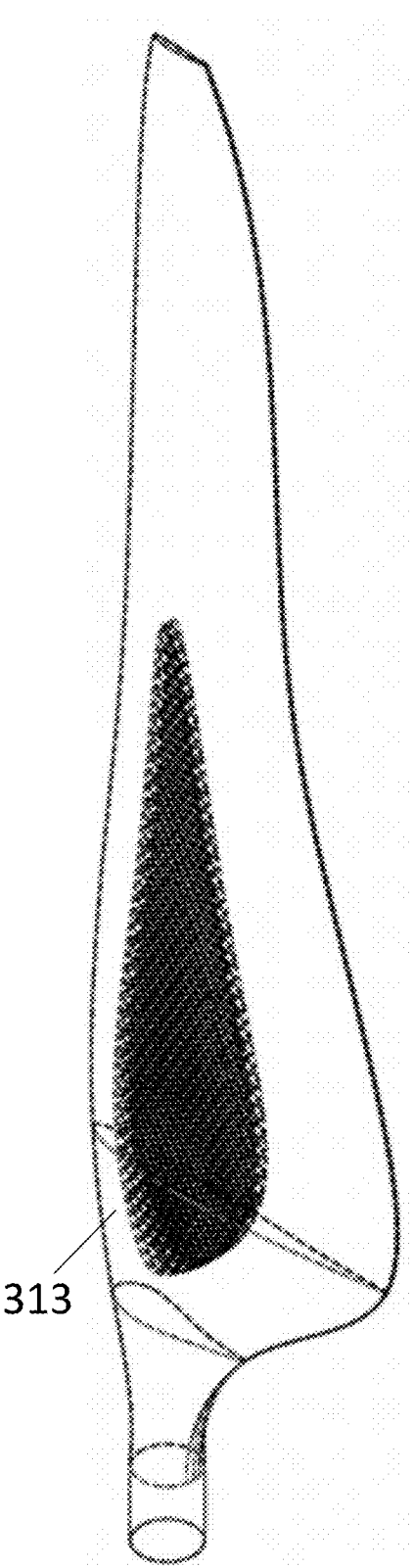
FIG. 17B illustrates a perspective view of the airfoil structure depicted in FIG. 17A.

FIGS. 17A-17B illustrate an airfoil structure for use with a glider according to yet another embodiment of the present invention. For example, propeller blades are able to be designed to have different internal structures including one or more pockets or cavities. The one or more pockets are cavities are configured to receive inserts formed from materials such as carbon fiber tubes, extra laminate, or denser foam than the surrounding structure, providing for additional structural support and allowing the load to be distributed more effectively, especially where the pockets are in regions experiencing higher stresses or where increased strength or rigidity are needed. For example, the root of the blade is operable to include an insert to provide extra stiffness through use of materials such as carbon fiber, synthetic fiber such as KEVLAR, and/or pre-formed composite stiffeners. By creating a robust blade root, torque is transferred effectively.

In one embodiment, the propeller blade is formed from a compression molding process with highly polished top and bottom cavity molds of the propeller fitted to heated platens of the press. The pre-cut, pre-impregnated layup of carbon fiber sheets for one side of the blade is laid into the lower half of the mold followed by a pre-machined over-sized foam core. This core has a surface that is approximately 0.5 mm higher than is used in conventional compression molding techniques. Because the carbon fiber sheets are typically not greater than 0.2 mm in thickness and the total thickness of the blade is typically no more than 10 mm, the thickness of the foam core is significant. The oversized foam core is then covered with a second carbon fiber sheet and the press is closed with the platens maintained at an appropriate process temperature until the carbon fiber sheets have set. The item is then released from the mold, having been compressed by approximately 0.5 mm, providing a smooth, higher-quality finish than if an oversized foam core were not used. In one embodiment, the oversized foam core is compressed by at least 0.2 mm during the molding process, while in another embodiment, the oversized foam core is compressed by approximately 0.5 mm during the molding process.

Propeller Blades Align with the Wing Direction Prior to Landing

During landing, one potential issue is the propeller, which has the potential to contact the ground and potentially become damaged as the glider lands. In one embodiment, the glider begins a descent for landing, the propeller blades are not powered. In one embodiment, the propeller blades are pivotably attached to the front end of the fuselage. In one embodiment, during landing, a processor within the glider transmits a command for one or more actuators (e.g., motors) to pivot the propeller blades such that the plane of rotation of the propeller blades is substantially parallel with the central section of the glider. In another embodiment, an actuator (e.g., a motor) connected to the propeller blades includes or is otherwise in communication with at least one sensor operable to determine an altitude and/or a change in altitude of the glider. Based on the sensor readings, the actuator automatically pivots the propeller blades when the glider drops below a preset altitude, and/or when the sensor detects a rate of decline in altitude above a preset threshold. In one embodiment, the actuator includes a stepper motor. In another alternative, a sensor is operable to determine that the propeller blades are in-line with the wings and sends an instruction to immediately short-circuit the motor to cause the blades to stop at the in-line position. By providing for the propeller blades to be in-line with the wings, the glider of the present invention is operable to land on an autonomous ground platform (AGP) or landing system without the blades of the glider colliding with the AGP. In one embodiment, a sensor in the glider and/or a sensor in the AGP is operable to provide for communication between the glider and the AGP and enable the glider to land on the AGP. Data from the sensor in the AGP is also operable to be used to stop the propeller blades based on the determination that the glider is within a predetermined altitude above the AGP, such as two (2) meters above the AGP. The rate of descent of the glider is also operable to be calculated based on the sensor in the glider, and a command is sent to the propeller motors to cease operation based on a projected time of contact between the glider and the AGP. In another embodiment, a landing time of the glider on the AGP is estimated based on the position of the glider with respect to the AGP (e.g., the glider is projected to land on the AGP in 5 seconds), and a command is sent to cause the propeller motors to cease operation.

In a preferred embodiment, the AGP includes short-range LiDAR units and/or other kinds of imaging units. In one embodiment, the landing process is as follows: the AGP is positioned on the runway near the runway threshold. The plane is given the location of the AGP as a waypoint. Once within range of the LiDAR sensors, the AGP drives to match the velocity of the plane, positioning itself to match the plane's trajectory. The AGP or sensors on the plane instruct the plane to descend the last couple of meters onto the AGP. An alternative is for the AGP to simply detect the height, speed, position and trajectory (and their rates of change) of the plane and not send any instructions at all to the plane; the AGP can include a camera-based imaging unit that is designed to detect a number of markers on the plane, that enable the AGP to lock on to and match the speed, position and trajectory of the plane as it comes in to land safely on the AGP. In this variant, the plane has no need of a LIDAR system or the equipment needed to receive data from the AGP.

In one embodiment, once the plane has landed on the AGP, the AGP slows to a stop to allow a visual check by an operator and if necessary, repositioning of the plane on the AGP, before the AGP is commanded or driven by radio control to return to the hangar. A map of the airfield and safe routes are preferably pre-programed into the AGP to avoid it colliding with any airport furniture or structures.

In the present system, the AGP is preferably in excess of 20 m wide and when the plane is on it then the plane's wingspan becomes the effective width at approximately 34 m, although in the front to back dimension is less than 3 m. More generally, the AGP is dimensioned to support a range of HAPS craft sizes, particularly the landing bed/cradle which is able to be adjusted or swapped out from the underlying vehicle to support different HAPS.

In one embodiment, the AGP is able to drive in any orientation, from crabbing sideways to get into alignment with the plane as its coming into land then switching smoothly to straight ahead when the plane is landing on it; it then needs to return to the hangar passing wing tip first through gateways and doorways.

The AGP vehicle is able to move in any direction as all 4 of its battery powered wheels are able to swivel whilst in motion. The platform can be used for assisted take-off as well as a moving platform the Solaris plane lands on, and is capable of traveling at any speed from zero to faster than the maximum flight speed of the plane. Its swiveling wheels allow it to carry the HAPS sideways (wing-tip first) through narrow hangar doors and runway access gateways, as well as along taxi ways.

For landing, the AGP positions itself at the runway threshold and is able, by being fed real time flight data from the HAPS and/or by using the AGP's own sensors, to determine the HAPS' exact location, trajectory and speed as it comes in to land. The AGP recovery frame matches the HAPS position in terms of location, speed and trajectory and the HAPS flies to land on, and be safely caught by, the AGP, which is able to then transport the HAPS to a hangar.

Phased Array Antenna Sputter Coated Directly onto the MYLAR Film Forming the Underside of a Wing In one embodiment, the glider carries a phased array antenna system. In one embodiment, the phased array antenna system is attached to one or more fuselages, one or more wings, or the central section of the glider. In one embodiment, the phased array antenna system is distributed across the length of the wings so as to more evenly distribute the weight of the payload. In one embodiment, the phased array antenna system covers a wide area of the glider (e.g., an area of approximately 28 m or approximately 38 m in length). In one embodiment, the phased array antenna system is sputter coated onto a film covering of a portion of the glider (e.g., the fuselage, the wings, the underside of the wings, etc.). In embodiment, the phased array antenna system is a linear system while, in another embodiment, the phased array antenna system is conformal to the surface of the glider (e.g., over a curved section of the glider such as the tail section or a curved wing surface). In one embodiment, the phased array antenna system is an active antenna system, while in another embodiment the phased array antenna system is a passive antenna system. In one embodiment, the phased array antenna system provides a synthetic aperture radar (SAR) system. Furthermore, a constellation of gliders according to the present invention are able to fly together to create a synthetic aperture radar of even greater effective array size. In another embodiment, the phased array antenna system is used for communication with at least one other glider and/or with at least one ground-based communication system. In one embodiment, the spacing of the antenna elements is provided based on the intended frequency range to be used by the antenna elements. For example, in one embodiment, the spacing is equal to approximately one half of the average intended wavelength of the signals.

In one embodiment, the antenna elements include a film substrate base that is integrally formed with a film cover layer on one or more components of the glider. In one embodiment, the film substrate base is non-heat shrinkable. However, in one embodiment, the film substrate base is attached at edges to at least one heat shrinkable polyethylene film to ensure that the integral formation of the antenna elements with the film cover layer still forms a tight, tensioned surface layer for the glider. In one embodiment, the film substrate bases of adjacent antenna elements are fused together. In one embodiment, the film substrate base of the antenna elements includes or consist of polyethylene.

Other types of sensors, apart from only phased array antennas, are also able to be formed directly onto the stretched wing skin (e.g., via a thin film technique). This is especially relevant for sensors that require large flat areas for interaction with the environment. The sensors are able to be positioned on the lower wing surfaces for earth observation and on the upper wing surfaces when facing away from the earth (e.g., stratospheric analysis, space observation, space debris re-entry observation, satellite monitoring, etc.).

In one embodiment, the wings of the glider are manufactured in sections up to approximately 8 m in length with a 2.5 m cord length. A thin plastic (e.g., polyester film, MYLAR film, etc.) is used to create the wing skin, with the skin often being very wide and long, but only a few microns thick, making the skin difficult to handle and apply evenly without wrinkling. Once applied, the wing skin is heat shrunk to a consistent tension. While this is difficult, the use of a lightweight but stiff frame on which the skin is able to be unreeled with clips to grab the edges of the skin provides for easier adjustment of the skin tension to remove wrinkles, at which point the frame is able to be accurately positioned relative to a pre-glued wing structure before the skin is brought into contact and the adhesive bond is made, wrinkle-free. In one embodiment, dots of non-permanent ink are applied to the skin as it is unrolled from a reel onto the frame, with real-time video images of the skin taken during tensioning and shrinking. The distances between these dots are able to be used to ensure distances remain uniform. In one embodiment, this distance comparison is performed via computer vision and artificial intelligence-based analysis.

Parallel Processing of Wing Mounted Imaging Sensors

In one embodiment, at least one onboard processor for the glider is able to process images received from multiple different sensors (of the same type or of different types) and process these images while compensating for wing flex, distance from the center of the glider, and/or other geometrical parameters affecting the relative difference in position of the sensors. In one embodiment, a plurality of sensors are mounted to the same location (e.g., to the central section of the glider) and angled differently in order to capture a greater swath width. In this embodiment, the processor takes into account the relative angle of each sensor. The processor is able to perform sensor fusion in to form a single image or single data set incorporating data from a plurality of sensors. Ideally, this single image has a large swath width due to the variety of differently positioned sensors used to produce the data. In one embodiment, the processing from sensor is performed locally onboard the glider with at least one graphics processing unit (GPU) onboard the glider. In another embodiment, data from a plurality of sensors is processed and image fusion is performed by at least one ground-based processor (or any otherwise located processor separate from the glider) after sensor data is sent from each sensor to the at least one ground-based processor. Exemplary methods of image fusion include, but are not limited to, those described in U.S. Pat. Nos. 11,425,316 and 10,297,034, each of which is incorporated herein by reference in its entirety.

Ground Station Connectivity

In one embodiment, the glider is configured to circle around a single ground receiving station and/or execute a flight path around multiple ground receiving stations. The glider transmits data to and receives data from the one or more ground receiving stations. In one embodiment, connection between the glider and the one or more ground receiving stations includes a line-of-sight optical link capable of very fast (e.g., approximately 100 Gbps) transmission with high security data transfer. The high security results from the fact that, from a distance of 20 km, the optical beam is less than 1 m in diameter, which is very hard to intercept undetected, making the system particularly useful for quantum key distribution. Advantageously, optical transceivers are also light and power efficient. In one embodiment, data transmission is preferably done at night, with surveying performed during the daytime due to the presence of visible light. In one embodiment, the one or more ground receiving stations are mobile (e.g., integrated with at least one car, motorcycle, cart, boat, scooter, bicycle, and/or any other form of ground or water-based vehicle). In one embodiment, some of the ground receiving stations are fixed, while others are mobile.

Data Payloads are Sent Glider-to-Glider

In another embodiment, data transmission is performed between multiple gliders or between a glider and another aerial vehicle. In one embodiment, the aerial data transmission utilizes optical transmission with one or more of the gliders or other aerial vehicles communicated directly with a ground receiving station. For use cases with a plurality of gliders or where a glider is out of line-of-sight, this system allows for minimization of the number of gliders that must be visible to the ground receiving station and provides more reliable data transfer. This also prevents the system from requiring that there be ground receiving stations visible to an entire constellation of gliders flying a mission to survey or scan large swaths of territory. In another embodiment, one or more gliders are capable of satellite transmission. In one embodiment, one or more gliders serves as a repeater for satellite systems or other long-distance communications systems where the glider is within range of the signal but a ground-based station is not. The glider is then able to serve as the "last mile" (or properly the last approximately 10-30 miles) to boost the signal to the ground-based station. Furthermore, the glider is able to serve to bridge the gap between multiple non-overlapping signal coverage areas. This is able to be used to expand mobile phone coverage or provide coverage for other signals. For Automatic Identification System (AIS) or Very High Frequency (VHF) Data Exchange System (VDES)-based services, the glider is able to act as a repeater or transponder that extends the reach of the system across, for example, seas or oceans for continuous coverage, relaying ocean vessel data via one or more gliders to all other ocean vessels or back to ports, cost guards, or other naval authorities. In another embodiment, the glider is able to relay traffic, navigation, or safety information between one or more manned or autonomous crafts and vehicles.

Dark Vessel Monitoring

The glider system of the present invention is able to used in a number of different use cases. In one embodiment, the glider includes one or more sensors (e.g., LIDAR sensors, synthetic aperture radar, optical sensors, ultrasonic sensors, etc.) able to detect and tracking water-based vehicles. In one embodiment, the glider automatically records and generates image data corresponding to the water-based vehicles. In one embodiment, the glider includes an AIS or VDES system able to receive signals from water-based vehicles and determine whether imaged vehicles are actively transmitting signals and permitted to be within a given area, or if the imaged vehicles are not transmitting signals and are therefore potential dark vessels. In one embodiment, upon determining that a likely dark vessel is present, the glider transmits an alert signal and/or a request for confirmation to at least one other glider. In one embodiment, the first glider is then able to receive a confirmation message from the at least one other glider, confirming that a vessel is detected and that the vessel is not transmitting the appropriate signals. In one embodiment, the gliders are then operable to communicate back to a ground-based communication hub or satellite and provide an alert of the presence of a likely dark vessel. In another embodiment, the glider does not make a determination whether a likely dark vessel is present but instead transmits signal data and/or image data to the ground-based communication hub where at least one processor or on-the-ground coordinator determines whether a dark vessel is likely present based on the data. Thus, one or more gliders provide a method to provide persistent imaging of areas where dark vessels have previously been present or where they are predicted to enter.

Urban Eyes

In one embodiment, the glider is positioned over an urban area and is able to provide 24-hour surveillance over all urban spaces within a range utilizing onboard cameras, infrared sensors, synthetic aperture radar, and/or other imaging systems. This allows the system to identify the location or movement of vehicles, individuals, plants, vegetation, animals, or other assets within the area and to monitor critical events, such as fires, floods, earthquakes, migrations, infestations, and/or other events, including but not limited to, incidents such as accidents, incursions, breaches, conflicts, and/or system failures. In one embodiment, information about these events and images of these events, such as photographs and videos including live video streams, are operable to be provided in real time or near real time. The present invention is also operable to predict critical events based on data obtained from sensors, cameras, and other imaging systems using predictive analytics as described herein. In one embodiment, the imaging data from the glider is transmitted to at least one remote location (e.g., a ground-based hub) and is used to generate a terrestrial map of the area. This data is able to be used by municipalities or other stakeholders to better provide services and/or to optimize the flow of urban spaces and infrastructure. Importantly, this provides a method of surveillance and imaging that does not require connected devices reporting location to a central server, as the imaging system is able to detect individuals and objects regardless of whether they are associated with connected devices or not. In one embodiment, this is used to generate a digital twin of the area and/or one or more individuals or objects within the area.

Parking

In one embodiment, urban surveillance system is able to be used as a parking management system, wherein the imaging by the glider is able to be used to identify open or occupied parking spots in real time. In one embodiment, for a covered deck where individual parking spots are not visible to the glider, based on visual data generated for vehicles entering and leaving the parking deck and a known capacity of the parking deck, a processor (onboard the glider or remote from the glider) is able to determine the real-time occupancy of the parking deck. In one embodiment, this information is used to populate a "find a park" software application, wherein the software application provides a list of nearest open parking spaces relative to the geolocation of a user device. In one embodiment, the "find a park" software application is able to suggest an optimized route to reach a selected parking spot. In one embodiment, the selected optimized route is based on traffic imaging analysis performed by the glider. Therefore, the imaging is able to provide decreased stress and more effective routing to drivers seeking to park in a densely populated area.

Traffic/Movements

In one embodiment, the glider is used to image traffic patterns on one or more streets, helpfully able to include streets other than main thoroughfares or highways, which often do not have actual traffic patterns well recorded. In one embodiment, this information is able to be incorporated into at least one map software application in order to determine to optimize route planning and/or to provide more accurate time estimates for travel. In one embodiment, the data is incorporated into at least one live traffic management system and is able to be used to recalibrate traffic light timing and/or other road parameters to assist in selectively alleviating traffic congestion. In one embodiment, data generated based on the glider-generated image data includes, but is not limited to, a volume of traffic, speed of traffic (overall average and for each individual vehicle), the presence of real-time incidents (e.g., jams, crashes, potholes, pipe bursts, fires, power outages, etc.), and/or security events (e.g., escaping vehicle). By providing an eyes-in-the-sky system, the need for a manned helicopter to follow or chase is reduced, as the glider system is able to provide sufficient oversight. Furthermore, the ability to provide near-constant surveillance also assists in resolving disputes regarding the origin or cause of conflicts or incidents. For example, the system is able to detect illegal dumping or trash-creation events. It is further able to determine relative flow rates and volume into and out of indoor or outdoor areas, providing information to both property owners, security management firms, and emergency services (e.g., firefighters and other first responders).

The present invention is also able to provide for position, navigation, and timing (PNT) services, which have a side range of application for autonomous vehicles, including drones, farm equipment, remote sensing equipment, highway vehicles, ships, and other vehicles.

Detection of Natural Disasters

In one embodiment, during a disaster event, the glider is able to serve both to provide visuals for fire responders and also to transmit data for actionable suggestions for the first responders, including navigation, mission-relevant information, and/or other information. By way of example and not limitation, the gliders are able to be used to detect fires over wide areas and subsequently guide drones (e.g., the RAIN drone) and/or other autonomous or manned vehicles to deliver fire suppressants to the fire region. Image data from the glider system is then able to determine whether the fire suppressants were effective or if additional supplies are needed. Furthermore, the gliders are able to be used to detects missing vessels or person and direct locations for lifeboats or other rescue supplies as needed.

In one embodiment, the glider includes a plurality of sensor systems, wherein data from each sensor system is able to be combined via one or more sensor fusion techniques in order to obtain a more complete view of terrain below, especially for use in response to natural disasters. Data is operable to be transmitted over a network or using peer-to-peer communication among gliders and/or between a glider and a sensor not incorporated in a glider to provide input from multiple sensors to obtain a more complete view of a terrain or situation. In one embodiment, the imaging systems include those able to provide real-time three-dimensional (3-D) data, such as SAR and/or LiDAR, which are able to further be combined with additional imaging systems, such as thermal imaging systems, hyperspectral imaging systems, and/or wideband imaging systems. These additional imaging systems are therefore able to enhance and improve the SAR and/or LiDAR systems to provide a more accurate view of the terrain. Thermal imaging systems, for example, are able to detect differences in the thermal signature of various objects, which is particularly useful in the application of fire detection. In one embodiment, information from a thermal imaging system is operable to be used to provide temperature mapping of an area. Hyperspectral systems are able to determine the chemistry type or material type of objects being observed (e.g., vegetation type, soil, water, etc.).

SAR and/or inSAR is useful in capturing high resolution 3D images for mapping, disaster monitoring, or environmental survey purposes. SAR works by transmitting radar signals and analyzing backscattered signals in real time or near real time. SAR system parameters, such as operating frequency, antenna size, and/or other parameters are able to be tuned for stratospheric measurements depending on the particular intended application. Three-dimensional imaging such as SAR provides 3D data about objects to a very high degree of accuracy, which is an issue with optical systems and other imaging systems. SAR is further useful in that it is able to see through clouds, smoke, and/or other atmospheric clutter in a way that visual systems have difficulty doing. In one embodiment, the resolution of the SAR is able to be adjusted in real time (e.g., 1-2 m resolution for wide area scans, and 1-2 cm resolution for viewing small areas) based on signals received from remote sources. In one embodiment, the SAR system is used to detect vegetation canopies, identify vegetation types, and/or to assess vegetation moisture content and/or other hydrological properties. The glider is configured to transmit an alarm when measurements of a vegetation canopy or a vegetation type fall above or below a threshold. For example, a certain type of invasive vegetation exceeding a threshold indicates a need to act to contain or remove the invasive vegetation. In another embodiment, moisture levels or hydrological properties falling above or below a certain threshold causes the glider to trigger an alarm. For example, moisture levels falling below a certain threshold in an area indicates an increased fire hazard in that area.

In one embodiment, both a 3D visual system (e.g., SAR or LiDAR) and a secondary system (e.g., thermal imaging, hyperspectral imaging, etc.) are on board the same glider. One limitation if thermal imagers is that these imagers only render in 2D, namely providing magnitude and one or two other aspects. A similar issue exists for other energy based passive sensors such as hyperspectral and wideband imaging. A 2D thermal imaging (or any other type of wide-band imaging (e.g. hyper spectral)) subsystem is operable to be combined with SAR or LiDAR subsystems or any other 3D imaging subsystems to provide 3D data in real time for a wide number of natural disaster or event monitoring, such as fire detection. In another embodiment, specific gliders individually carry 3D visual systems or secondary systems, with multiple gliders working together in a constellation to integrate data from their own systems. By flying in a constellation, larger apertures and accuracy over wider areas can be obtained by the gliders of the present invention. The SAR subsystem is operable to determine separation down to sub-millimeter levels (or even micron levels) and geo-location to sub-millimeter levels (or even micron levels).

The 3D visual system is operable to provide a real-time view of an event in an area of interest and is operable to be provided as a live 3D render of the event. In one embodiment, data created by the 3D visual system is operable to be supplemented, modified, or further processed using other technology, such as 2D thermal imaging or hyperspectral scanning sensors. This improves classification of objects and events detected by 3D visual systems and other technology or sensors included in the glider or other components in communication with a glider of the present invention. Advantageously, the 3D imaging system and the 2D imaging unit include parameters which are tunable or adjustable during flight by a remote operator or automatically in real time or near real time to vary the resolution capabilities of these systems.

In one example, mapping a fire requires overlaying thermal dots on a terrain map, with both measurements needing to align (e.g., GIS, ortho-rectification and other methods used to estimate location). These methods are prone to errors which are compounded when combining data. The terrain map traditionally used for mapping a fire is also not always current. For example, the density of vegetation is often different, and objects, people, and/or assets are often in different locations than represented on the terrain map. By combining the 3D imaging data with 2D thermal data, the present invention provides for creation of a 3D thermal image of an area that is on fire and the area immediately around this area, with details including the shape and/or volume of the object, the rate of change of the fire, and other pertinent information. Thus, the combination of 2D thermal data with 3D imaging data of the present invention provides for an improvement in obtaining real-time or near real-time data about fires and other events, and identifying one or more actions to address the fire and other events. The present invention therefore solves the long-felt, unmet need of providing highly accurate, real-time or near real-time information about a natural disaster such as a fire. In combination with the predictive analytics of the present invention, the present invention provides for actions to be taken in real time or near real time to address natural disasters or mitigate the effects of natural disasters. Data taken from the imaging systems of the present invention is operable to be used to train the predictive analytics models of the present invention to improve the accuracy and value of the predictive analytics models. Other data from other sensors is operable to be integrated with the 2D thermal and 3D imaging data, and is operable to be used to train the predictive analytics models of the present invention.

The combined 2D thermal imaging data and 3D imaging data, alone or in combination with data from other sensors, provides increased situational awareness for ground and aerial operations and reduces the number of vehicles or other devices needed to gather data, which may increase costs or even interfere with operations to address the fire. The 2D thermal imaging data and 3D imaging data is operable to be displayed on a display as images or videos in real time or near real time. In contrast, prior art systems must assemble small bits of data from different systems which are not provided in real time or near real time and are not time sequenced, triggering false positives or providing false information. The highly accurate, real-time or near real-time data provided by the present invention is useful for planning mitigation of natural disasters, such as planning approach vectors for dropping fire retardant given ground conditions, flames, wind, rate of progress, location of important objects, people, assets, and nature. The 3D and 2D imaging provided by the present invention is also operable to be used to measure or estimate a volume of fuel stock for a fire, a fuel stock that has been burned by a fire, and/or a rate of change at which fuel for a fire is being burned. In another embodiment, the predictive analytics of the present invention are operable to use this data to predict a rate of fuel consumption, a time at which a fire will be in a certain location based on fuel consumption, movement of fire based on available fuel, and other actionable items to address or mitigate a fire.

The present invention also provides for monitoring and measuring the effectiveness of mitigation of natural disasters. For example, upon a fire retardant being applied at a particular location, the 2D thermal and 3D imaging data provided by the present invention provides for measuring changes in the location where the fire retardant has been applied, such as changes in temperature. For example, a temperature measurement indicating that the temperature of an area is at ambient temperature or close to ambient temperature indicates that fire in that area has been extinguished. This data provides feedback to operators regarding the effectiveness of mitigation or treatment techniques. For example, if thermal data indicates that a fire re-starts after smoldering for a period of time, this provides feedback that more fire retardant or a different approach is required to extinguish a fire of a certain temperature or intensity in a certain location or type of location. In another example, a fire appears to be extinguished but burns underground and emerges a certain distance away from the original location. The 2D thermal imaging data and 3D imaging data of the present invention provides for detecting the fire which has emerged in the new location and for determining one or more probable locations from which the fire which emerged in the new location was previously located. In another example, weather data from ground sensors is provided and the present invention uses data from the ground sensors to create or update predictive models regarding movement of fires or other behavior of fires based on weather data measured in combination with 2D thermal imaging data and 3D imaging data. In contrast, prior art models typically use old satellite data or field reports from a small number of events. The present invention advantageously provides for real-time or near real-time data from multiple data sources to be combined in real time or near real time and used to provide situational awareness for operators in real time or near real time and to update predictive analytics models in real time or near real time. Data is also operable to be input into a machine learning module or artificial intelligence module to classify objects or events based on a type of natural disaster or man-made disaster. This provides for greater accuracy of data and better results for a given scenario as well as similar scenarios which are concurrently being addressed or which will be addressed in the future.

The gliders of the present invention are operable to communicate with people, devices (autonomous and manned), and systems during a natural disaster response by providing navigation, mission, and other data during the response stages. In one embodiment, communication occurs upon the outputs from sensors or imagers from the glider or other devices, such as the output of the 3D imaging system and 2D thermal imaging system being fed into a workflow automation system of the present invention. In one embodiment, the workflow automation system is triggered upon a certain type of data being detected, such as a temperature measured by the glider being above a threshold temperature in a certain area which is indicative of a fire. The gliders of the present invention are operable to carry equipment to aid with a particular disaster, and are operable to include navigation services such as inertial navigation systems (INS) and global navigation satellite systems (GNSS) to ensure highly precise operations and improving accuracy, reliability, and safety, and providing cost reductions.

In a firefighting scenario, the gliders of the present invention are operable to detect fires over a wide area and guide other devices such as drones, unmanned aerial vehicles, other robots, or manned vehicles to a location of a fire to take an action, such as delivering fire-suppressants. In one embodiment, the firefighting drone is a Rain drone (https://www.rain.aero). The present invention is operable to provide for monitoring of the location to determine an effectiveness of the action and instruct the drones, unmanned aerial vehicles, other robots, or manned vehicles, or other drones, unmanned aerial vehicles, robots, or manned vehicles to take a subsequent action based on the monitoring of the location and the effectiveness of the action. The present invention therefore provides for coordination of multiple devices, systems, or people in real time and real-time or near real-time measurement of the effectiveness of actions. Although the present invention has been described primarily with respect to firefighting, the present invention is also operable to be utilized to address any natural or man-made disaster, including but not limited to, flooding, collapse risk, sinkhole risk, or any other dangerous or detrimental event. For example, the present invention is operable to obtain and analyze images generated from the 3D and 2D system to identify a sudden ground depression indicative of a collapse.

In another example, the glider of the present invention is operable to detect a vehicle such as a vessel or person in need of rescue or assistance, such as a person stranded at sea, in a ravine, on a mountain top, in the desert, and/or shipwrecked on an island. The glider is operable to send an emergency message to an agency or a person on behalf of the vehicle or person in need of rescue, and is operable to instruct a drone or autonomous vehicle to the location of the person or vehicle. In one embodiment, the glider is operable to instruct the drone or autonomous vehicle to provide a certain provision to the person or vehicle based on measurements taken by the glider or by another device in communication with the glider. For example, the glider is operable to detect that the temperature in the location of a person is 100 degrees fahrenheit, and the glider instructs a drone to bring water to the person. In another example, the glider determines that the temperature in the location of the person is 20 degrees fahrenheit, and the glider instructs a drone to bring a coat or a blanket to the person.

Insurers, Finance, Service Providers

In one embodiment, image data produced by the glider for one or more properties is able to be used for assessing risk for the property (e.g., for use with insurance), assessing the use and/or quality of the property or other assets (e.g., for investment purposes), and/or for providing suggestions on when to engage services to improve a property (e.g., roof repair, painting, gardening, pest extermination, etc.).

Non-GPS Location System

In one embodiment, the glider does not include a Global Positioning System (GPS)-based tracking system. In one embodiment, the glider includes a stellar navigation system, such as, but not limited to, the one described in WIPO Patent Pub No. 2017/158326, which is incorporated herein by reference in its entirety. This navigation system is able to be used to determine the geolocation of the glider to centimeter or sub-centimeter accuracy. In one embodiment, the glider includes an atomic clock and/or a system able to receive and utilize time signals derived from an atomic clock. One or more gliders are then able to transmit this position data and/or time signal data to at least one other node (e.g., a ground-based system, an aerial vehicle, etc.). This data is then able to be used by an individual at a remote location to determine a position of the glider in a similar manner to GPS or other Global Navigation Satellite Systems (GNSS), but without specifically needing to use any existing GNSS system.

Buildings

In one embodiment, the glider is able to be used to continuously monitor one or more building properties. In one embodiment, based on initial sensor readings of the building, the glider is able to develop a benchmark or baseline readings of the building on which to base analysis of future readings of the building. In one embodiment, the glider includes an infrared, or thermal, imaging system and is operable to retrieve thermal signature data for the building. This thermal signature data is able to be used to determine where energy is lost in the building and to develop energy ratings for each building, for the benefit of an owner or operator of the property. Furthermore, such thermal signature data is able to be used to determine where improvements are most usefully able to be made and to therefore assist in generating an optimal plan of action. In particular, this thermal imaging data is useful in detecting issues arising in an aging property, especially areas where insulation is becoming weaker. In one embodiment, changes from baseline energy usage detected by an imaging system of the glider are used to automatically generate one or more tradable carbon credits and/or is automatically transmitted to at least one environmental authority for regulatory or tax incentive purposes. Outside of a building or other indoor structure, the glider imaging system is also able to provide updates regarding vegetation growth for yard and garden management allowing for automated or manual optimization of lawn or garden care maintenance services. The glider imaging system is also able to be used to provide regular alerts regarding when specific services need to be performed (e.g., mowing, pruning, weeding, etc.).

The glider is further able to benefit property owners by providing security monitoring for buildings, noting the presence of visitors or deliveries, or monitoring for potential thieves or others attempting to break into the property. Not only is this able to provide for saved video archiving of those who visited the property, but it also allows for real-time monitoring and permissions for people to enter the property. For example, in one embodiment, video feed generated by an imaging system on the glider is directly transmitted to at least one user device of a property owner, allowing the property owner to remotely grant or deny access to an individual waiting at an entrance based on the video feed.

Furthermore, the glider-based imaging is able to be used for analysis of flow into and out of buildings, allowing for statistics such as the times of day with the highest flow volume, which entrances have the greatest or least flow volume, or the impact of specific events on the flow volume (e.g., whether the presence of food trucks tends to clog specific entrances). Flow analysis allows for more efficient design of properties, allows for more targeted improvements, and provides for improved event planning.

In one embodiment, the glider imaging system is used for disaster management and monitoring of a building property. For example, in one embodiment, the glider is used for detecting fires in real time. In one embodiment, the glider automatically determines whether a fire is present and automatically transmits an alert (e.g., a push notification, an automated phone call) to at least one emergency service contact method (e.g., an email, a phone number, etc.). The glider is further able to transmit this information to a user device of a property manager to provide live updates of an extent of damage and how much damage has occurred. One of ordinary skill in the art will understand that the disaster-related applications of the glider are not limited to fires and include, but are not limited to, floods, earthquakes, tsunamis, other storms, pest infestations, tornadoes, and/or other disaster-related events.

Spy Balloon Capture

In one embodiment, the glider is able to be used for offensive, anti-surveillance purposes. By way of example and not limitation, the glider is particularly useful in the takedown of surveillance balloons and/or other similar unmanned reconnaissance vehicles. The glider is particularly well adapted for these purposes, as it is capable of traveling at slow speeds, often as low or lower than 50 knots without risking stalling, unlike other aircraft. This is important, as surveillance balloons often only travel at approximately the speed of the local wind, which is frequently less than 70 knots. Therefore, the glider of the present invention is uniquely situated to intercept or position itself above a hostile surveillance balloon.

In one embodiment, the glider includes at least one net and/or at least one tether stored in at least one compartment attached to the wings, the central section, or the fuselages of the glider. In one embodiment, an imaging system of the glider is operable to detect when the glider is directly above, below, or beside a target surveillance balloon and automatically release or propel the tether such that it attaches to the surveillance balloon. In another embodiment, the glider is operable to release or propel the tether upon receiving input from a remote user device. In one embodiment, the at least one tether is connected to at least one tension release mechanism operable to pull in the at least one tether after its release or propulsion, or to loosen the tether. In one embodiment, after attaching the at least one tether to the surveillance balloon, the at least one tension release mechanism automatically tightens (i.e., pulls in) the at least one tether to ensure that the at least one tether successfully connected to the surveillance balloon and that the connection is sufficiently stable. Connection to the at least one tether helps to ensure that the surveillance balloon does not fall and damage property or injure persons below after being disabled.

In one embodiment, the glider further includes at least one releasable hot wire mesh and/or batteries. After tethering to the balloon or flying directly above, below or beside it, the glider releases the hot wire mesh and/or the batteries onto the balloon. In one embodiment, the hot wire mesh and/or or the batteries are fully released and remotely activatable, such that, for example, the hot wire mesh is able to receive a command from a remote user device or from the glider and begin resistive heating. In one embodiment, the hot wire mesh and/or the batteries remain connected by a cable to the glider and the glider is able to transmit commands and/or supply power to activate the resistive heating. In one embodiment, the batteries and the hot wire mesh are connected such that the power supplied by the batteries to the hot wire mesh allows for the resistive heating. In one embodiment, the heated wire mesh is positioned on the surface of the balloon and the heat causes the fabric of the balloon to melt, allowing for deflation. In another embodiment, the heated wire mesh is in contact with a cable, tether, or other mechanism connecting the balloon to a payload and is operable to burn through the cable, tether, or other mechanism, causing the payload to disconnect and separate from the balloon, and subsequently fall. In one embodiment, the hot wire mesh and/or the batteries connected to the hot wire mesh are attached to at least one parachute mechanism, allowing the hot wire mesh and/or the batteries to have a controlled descent after successfully taking down the balloon or the balloon's payload.

In one embodiment, a Y-shaped capture prong extends from a front of the glider (e.g., from the central section, from the wings, from the fuselages, etc.). In one embodiment, the Y-shaped capture prong is configured to fly into a flight train or cables attaching the balloon to a payload, allowing the glider to attach to the flight train or the cables. In one embodiment, the attachment of the capture prong to the balloon assists in the release of the hot wire mesh. In another embodiment, the mere weight of the glider being coupled to the balloon is sufficient in causing the balloon to slowly descend to where it is able to be retrieved. In one embodiment, after attaching, the glider activates its propellers to actively guide the balloon toward the ground while, in another embodiment, the glider acts merely as passive weight for the system. However, in instances where the particular landing spot of the balloon is important or certain areas must be avoided (e.g., within a military base, in the water, in a residential area, etc.), the use of the propellers for actively guiding the balloon to a particular location is often advantageous.

Weather/Wind Data Capture Process

The glider further provides uses in radiosonde techniques for weather data capture or in determining wind speed and/or direction. In one embodiment, the glider holds at least one drop device. In one embodiment, the at least one drop device includes a container and a ballast. Helpfully, the at least one drop device is able to include a mechanism using common household tools. In one embodiment, the container includes a paper cup. For example, in one embodiment, the ballast of the at least one drop device includes sand (e.g., between approximately 100 g to 300 g of sand) and/or at least one sensor device (e.g., a tracker sonde). When the glider reaches a specific location (e.g., longitude and latitude) and/or a specific altitude, the at least one drop device releases and begins slowly descending. In one embodiment, the at least one drop device is attached to at least one parachute and/or at least one other descent slowing mechanism. In one embodiment, the at least one parachute is formed from and/or connected to the container by cotton, paper, or any other form of biodegradable polymer. In one embodiment, the parachute is not formed from any non-biodegradable synthetic fibers. In one embodiment, the parachute is not connected to the container by any non-biodegradable synthetic fibers. In this manner, especially in one embodiment including a paper cup container, the system is substantially biodegradable, reducing potential environmental impact caused by a lost or stray drop device. This is particularly useful in jurisdictions such as Australia, where the release of toy balloons and other synthetic materials has been banned or significantly restricted.

In one embodiment, one or more trackers or sensors within the at least one drop device itself (e.g., a GPS sensor, a sonde device, etc.) is configured to generate geolocation data for the at least one drop device in real time. In another embodiment, at least one external imaging system (e.g., attached to the glider, attached to a ground-based system, etc.) images the at least one drop device as it falls and automatically generates position data for the at least one drop device. In one embodiment, an external surface of the at least one drop device is coated with at least one visual indicator (e.g., infrared paint, colored paint, etc.) for ease in allowing the at least one external imaging system to detect and monitor the at least one drop device. The descent of the at least one drop device is able to be used to determine wind speed and/or direction with any method of conventional radiosonde analysis as understood by one of ordinary skill in the art.

The glider system provides an advantage over systems utilizing balloons or even drones in performing radiosonde techniques in that the glider is capable of achieving altitude while traveling upwind, allowing the at least one drop device to travel back to the location where the glider was launched, providing for easier tracking and greater control over landing location of the at least one drop device.

Glider Includes Sensors for Geophysical Surveys

In one embodiment, the glider includes at least one magnetometer and/or at least one gravimeter operable to measure the magnetic field and/or gravitational field of the Earth. In one embodiment, data from the at least one magnetometer and/or the at least one gravimeter is used to generate map data for land and/or ocean environments. In one embodiment, the measured maps are able to provide geophysical surveys and therefore insight into changes in the Earth's mantle, indications of tectonic activity and/or areas at risk of tectonic activity, and/or for guidance of sensitive subsurface missions (e.g., military submarine guidance). Magnetometers such as fly magnetometers and gravimeters are compact and make use of quantum sensing technologies, and are operable to be integrated into the glider of the present invention.

Figure 18:
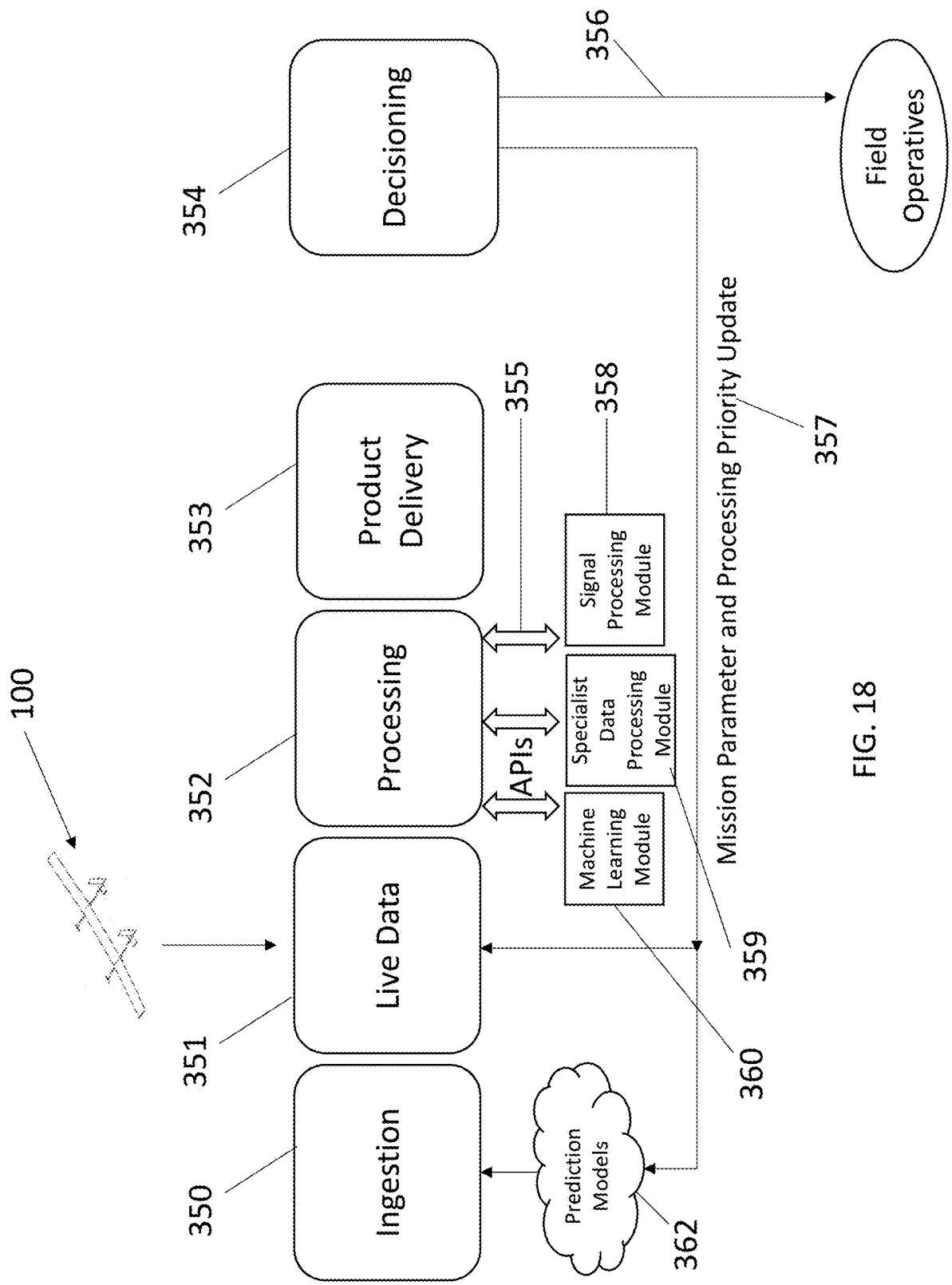
FIG. 18 illustrates a schematic diagram showing data flow within one embodiment of the present invention.

FIG. 18 illustrates a schematic diagram showing data flow within one embodiment of the present invention. In one embodiment, live data from the glider 100 is taken in and processed by the system of the present invention and processed either on the glider 100 itself, or on a separate, remote processor. In one embodiment, the processing involves one or more application programming interface (API), including, but not limited to, at least one machine learning module, at least one specialist data processing module (i.e., specific data processing tools adapted for specific tasks), and/or signal processing modules. In one embodiment, the system is able to receive selection of at least one external API to use by at least one user device, such that customers are able to select their own software models for specific data processing tasks.

In one embodiment, live data from the glider 100 is taken in and processed by the system of the present invention and processed either on the glider 100 itself, or on a separate, remote processor. The workflow starts at the data ingestion stage 350, involving mission planning, including generating pre-tagged meta-data (e.g. such as known areas of high interest), seeing long range weather data that will impact the direction of a disaster and our mission, ground layer/drone layer data providing high resolution samples of the larger target area and GIS referencing, so as to reliably resolve the location of data coming from different sources using the GIS geolocation standard, and likewise produce our processed data to the same standards for onward compatibility.

Live data is received at stage 351 from the planes and this data in stage 351 is subject to anonymization and also augmentation with other data sources—e.g. adding a layer of known risks, objects, features that improve the detection and classification of scene features and adaptation—e.g. ortho-rectification, filtering, enhancing, transposing data as required for improving the context of what is being observed (that potentially affect further processing) and enhancing the capability of further stages.

The data then is sent to processing stage 352, which includes AI/ML based processing (object identification, event detection, signal processing), generating derived data sets. Processing stage 352 is connected, via APIs, 355 to various specialist processing modules, such as machine learning module 360, specialist data processing module 359, and signal processing module 358. The derived data sets are in product delivery stage 353 processed for object/event selection, formatting and GIS referencing. Data is output to decisioning stage 354, with the data in various formats, such as raw, point cloud data, or web-based data for immediate viewing, or event data for injection into a process or workflow. Decisioning stage 354 is typically human assisted. For example, in the disaster response scenario, instructions are sent 356 to various field operatives (e.g. search teams, helicopters, drones etc.). Decisioning stage 354 is able to include sending mission parameter and processing priority updates 357 as a feedback loop to any and all of the earlier stages.

One especially important aspect of the feedback loop is the ability to update the prediction models 362 that model and predict how real-world events will unfold and how different interventions (driven by the decisioning stage 354) affect that unfolding. For example, the system is able to include monitoring a wildfire, with the prediction model 362 able to model how fires spread based on various factors, such as meteorology, topology, vegetation, soil moisture, hydrology, man-made structures, and how that spread can be controlled by fire-breaks, backfiring, water and foam. The planes are able to provide real-time, continuous and persistent (lasting days or weeks) data tracking fires (e.g. using infra-red video feeds and SAR data) and automatically identifying firebreaks and the location of fire crew and their equipment, enabling the prediction model to be provided with the richest and most up to date data; that in turn enables not only the prediction model itself to generate the most accurate intervention recommendations, but for the prediction model itself to be altered, adjusted and improved in the light of the feedback data. Data sets of actual events in high spatial-temporal resolution are used to adapt and train predictive models to higher levels of accuracy and reliability, which closes critical observation gaps for reliable modelling for predictive sciences.

Figure 19A:
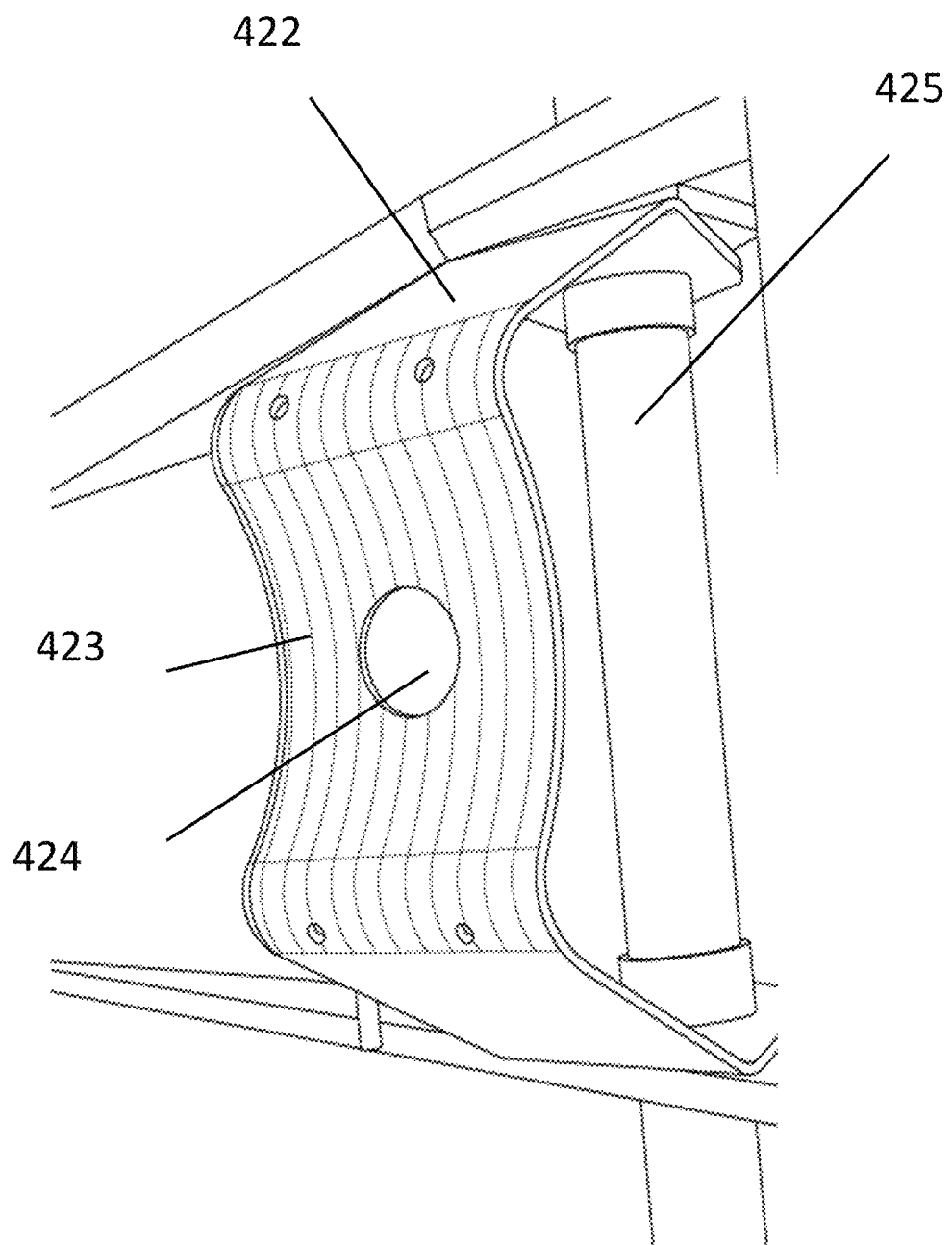
FIG. 19A illustrates a lightweight, but rigid bracket joining spars of a glider according to one embodiment of the present invention.

FIGS. 19A-19M illustrate joint systems for attaching main structural sections of a glider according to one embodiment of the present invention. FIG. 19A, for example, shows a lightweight but rigid bracket 422 affixed to one section (e.g., a post 425 for a vertical stabilizer) of the glider. The bracket 422 is sized and shaped to receive and abut a second section (e.g., a fuselage) of the glider. In one embodiment, the bracket 422 includes a curved face 423 for receiving the second section. Additionally, the bracket 422 includes a circular aperture 424 for receiving a boss or stud of a spar to be attached. The approach to affixation shown in FIGS. 19A-19M provides a low cost approach to fabricating the glider, allowing the components to be rapidly attached and detached without the need for a high degree of skill.

Figure 19B:
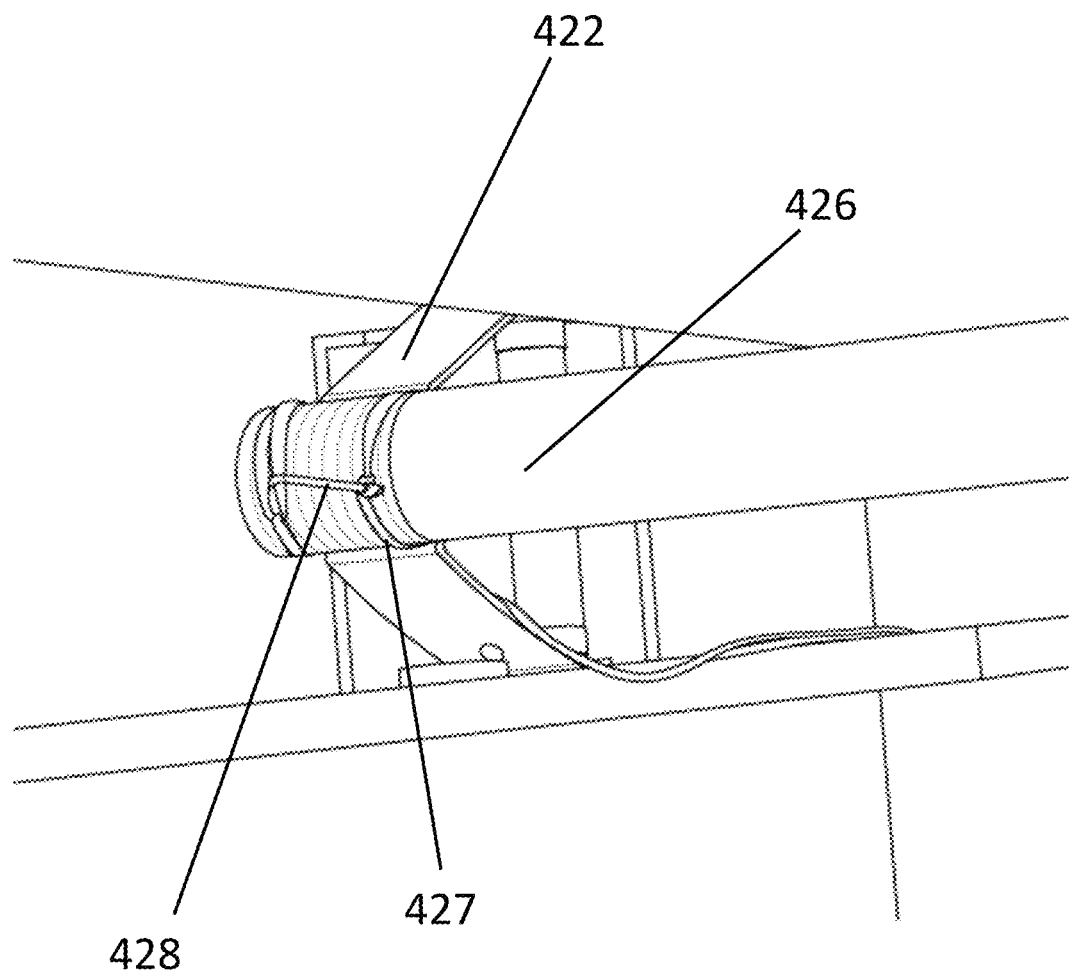
FIG. 19B illustrates a spar joined to the bracket shown in FIG. 19A according to one embodiment of the present invention.

FIG. 19B illustrates a spar joined to the bracket shown in FIG. 19A according to one embodiment of the present invention. As shown in FIG. 19B, a second section 426 (e.g., a fuselage) of the glider is able to attached to the bracket 422. The second section 426 is able to be secured within tape or a loop of fabric 427 that is tightened using a tourniquet pin 428.

Figure 19C:
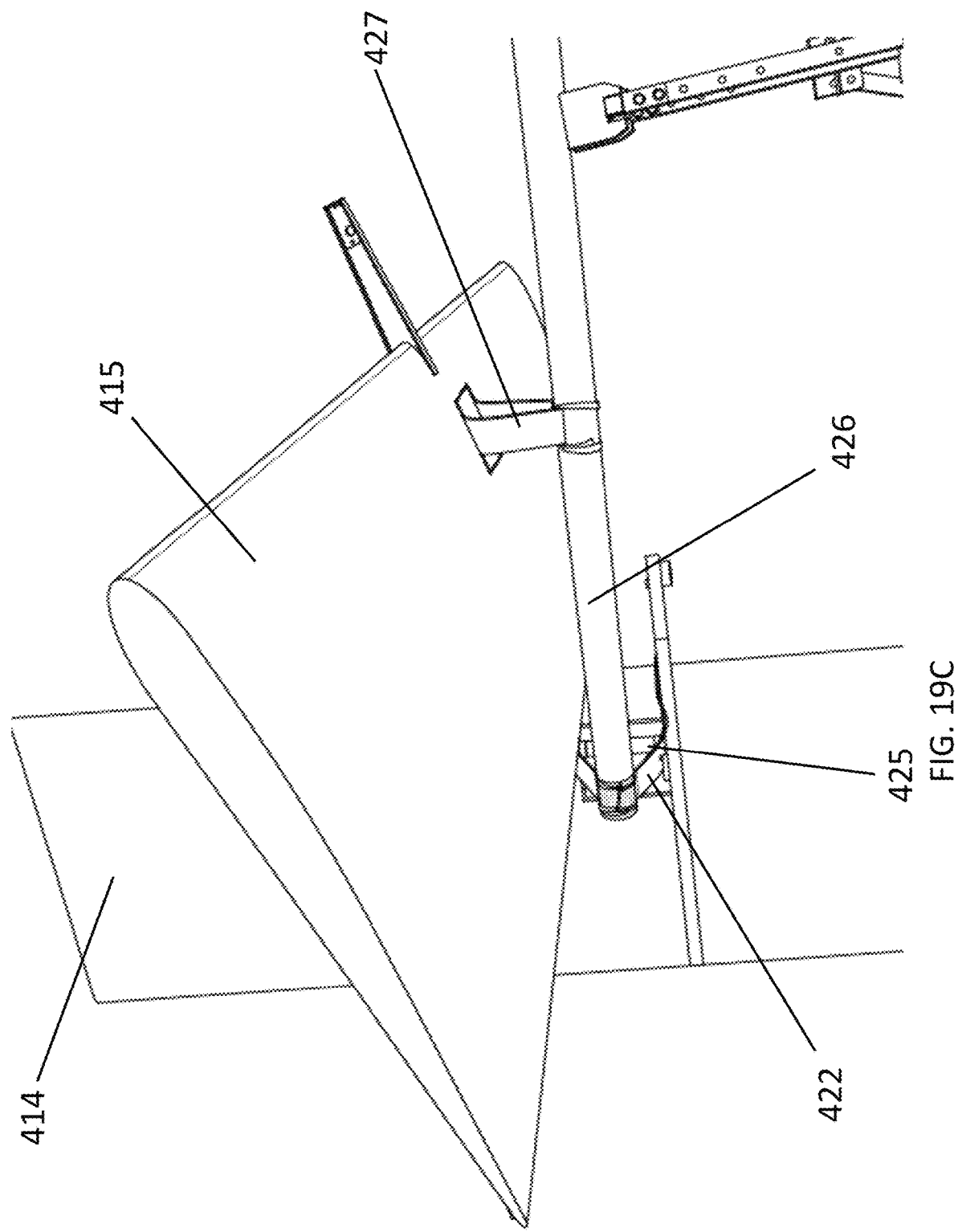
FIG. 19C illustrates an attachment system for a vertical stabilizer to a fuselage according to one embodiment of the present invention.

FIG. 19C illustrates an attachment system for a vertical stabilizer to a fuselage according to one embodiment of the present invention. FIG. 19C illustrates a larger contextual image showing the system shown in FIG. 19B in place attaching the vertical stabilizer 414 to the fuselage 426 of a glider. Additionally, a similar bracket system or a loop 427 is able to used to attach the same fuselage 426 to a horizontal stabilizer 415.

Figure 19D:
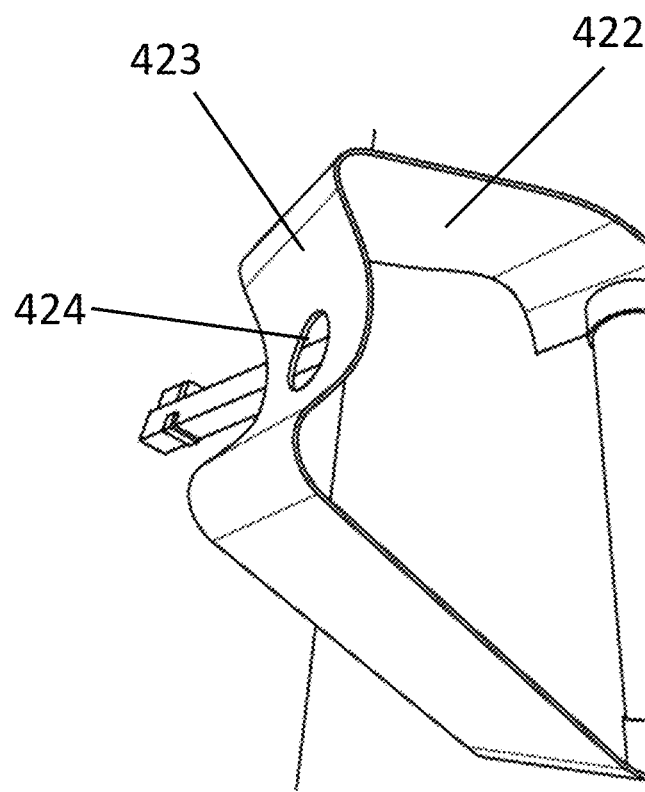
FIG. 19D illustrates a bracket with a circular aperture and a curved mounting surface for connection of sections of a glider according to one embodiment of the present invention.
Figure 19E:
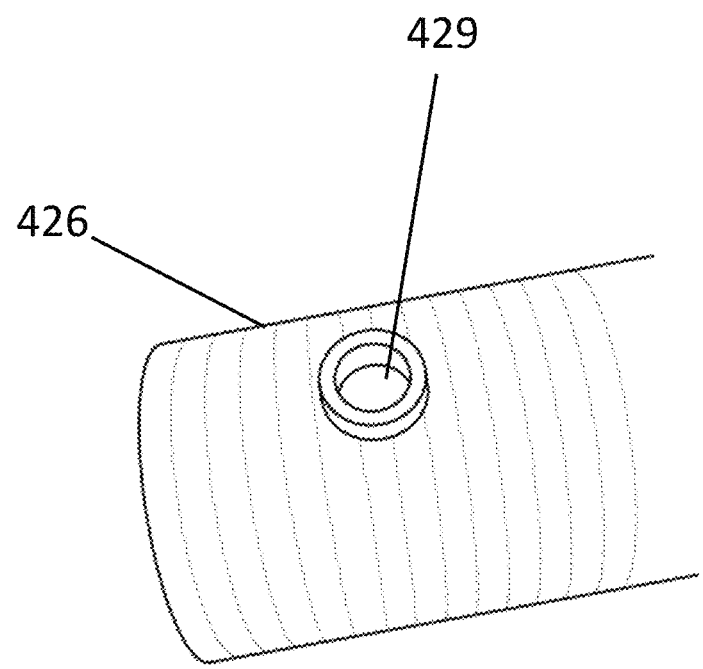
FIG. 19E illustrates a section of a spar of a glider with a cylindrical boss for connection to a bracket according to one embodiment of the present invention.

FIGS. 19D-19E illustrate corresponding parts of the bracket and second section of the glider able to be used to tightly connect the two components. For example, the circular aperture 424 defined through the curved face 423 of the bracket 422 is sized and shaped to receive a cylindrical boss or stub 429 on the second section 426, which also assists in aligning the two components. While frictional engagement between the stub 429 and the circular aperture 424 is one way to provide a loose fit according to the present invention, the tape or circular loop 427 shown in FIG. 19F provides means for a tighter connection that will hold during flight.

Figure 19F:
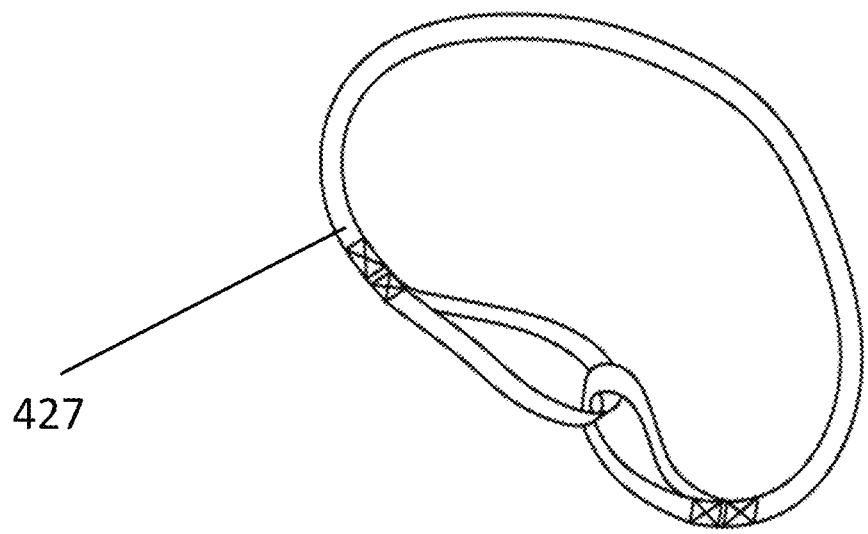
FIG. 19F illustrates a tape or fabric loop used to connect spars of a glider according to one embodiment of the present invention.
Figure 19G:
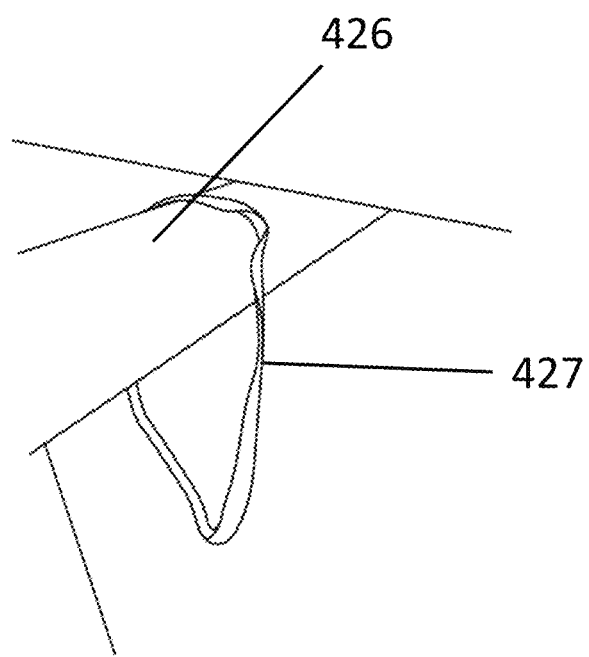
FIG. 19G illustrates a tape or fabric loop in position on a fuselage of a glider according to one embodiment of the present invention.
Figure 19H:
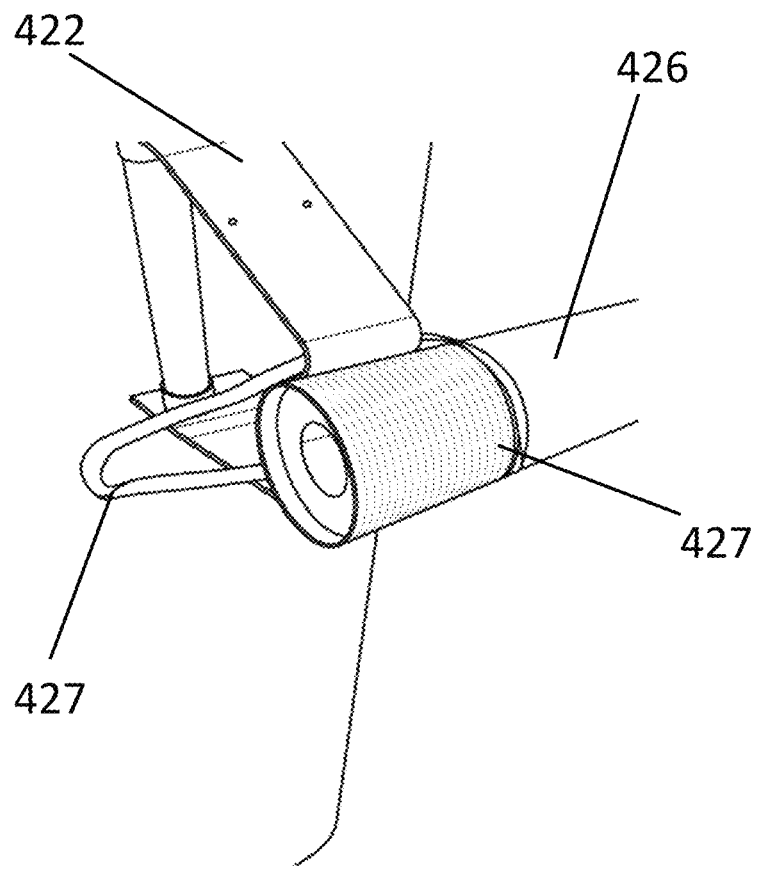
FIG. 19H illustrates a tape or fabric loop being passed through a portion of a bracket for connecting components of a glider according to one embodiment of the present invention.
Figure 19I:
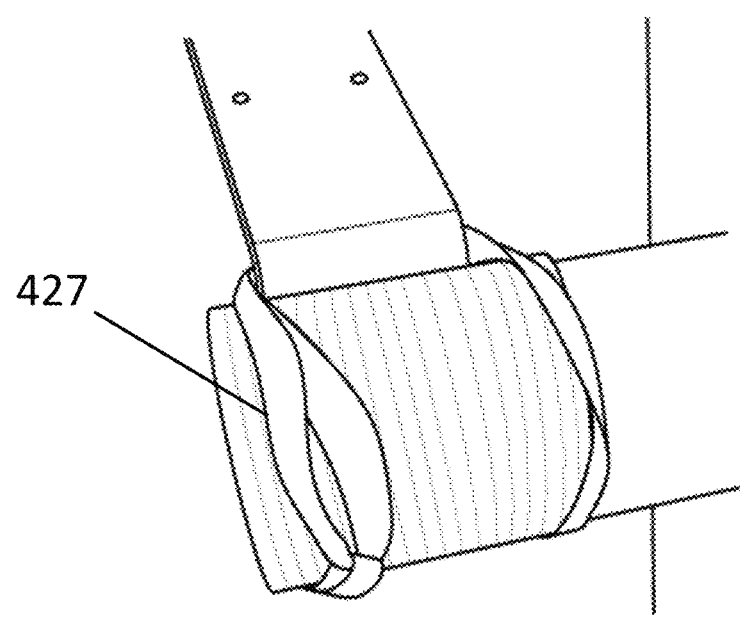
FIG. 19I illustrates a tape or fabric loop being used in conjunction with a bracket for connecting components of a glider according to one embodiment of the present invention.

FIGS. 19G-M provide a sequence for how to utilize the circular loop shown in FIG. 19F to connect the first and second sections of the glider. As shown in FIG. 19G, the loop 427 is first looped around the second section 426 (e.g., the fuselage). When the second section 426 is then fitted against the bracket 422, a second end of the loop 427 is then passed through the bracket 422 as shown in FIG. 19H. FIG. 19I then shows that the second end of the loop 427 is then wrapped around the fuselage, such that the second section and the bracket are loosely connected.

Figure 19J:
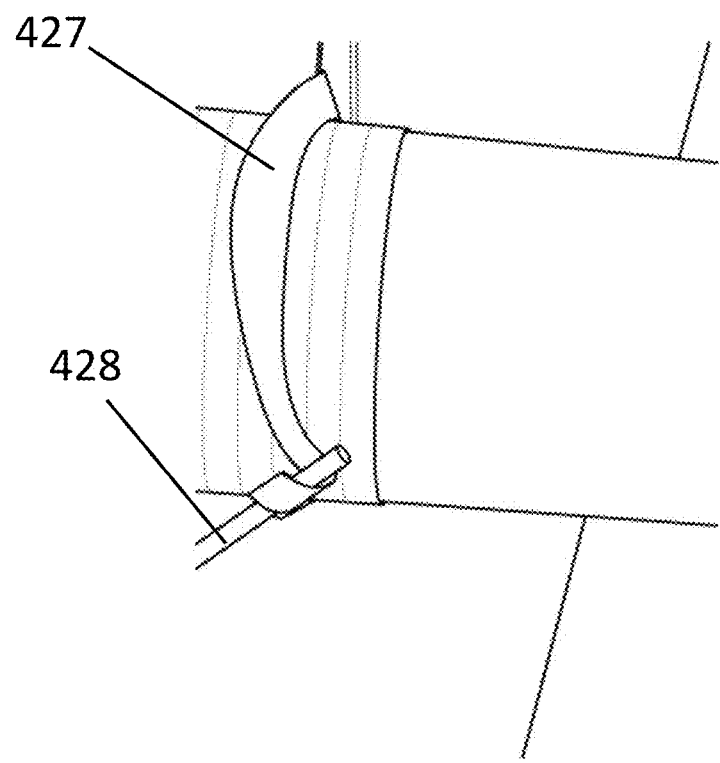
FIG. 19J illustrates a tourniquet pin being inserted behind a portion of the fabric loop shown in FIG. 19I according to one embodiment of the present invention.
Figure 19K:
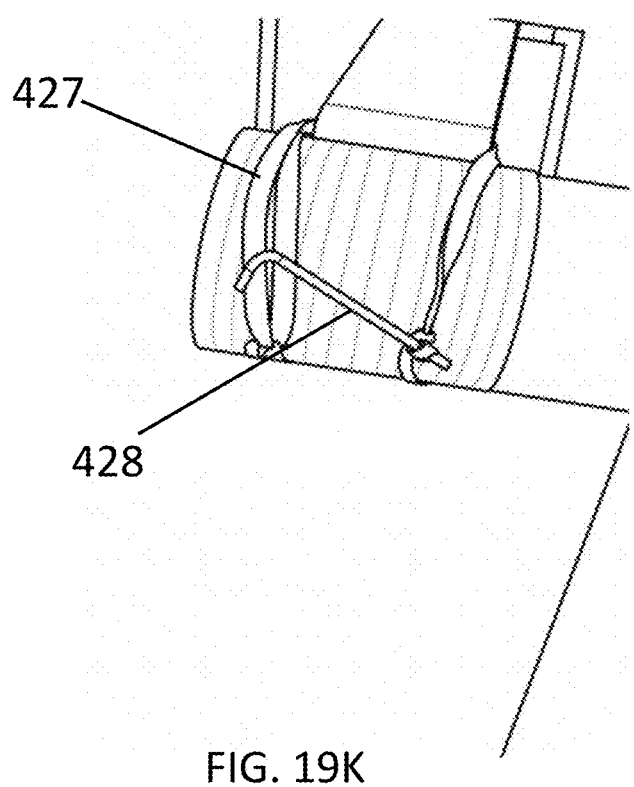
FIG. 19K illustrates a first end of the tourniquet pin shown in FIG. 19J being wrapped with a first portion of the fabric loop according to one embodiment of the present invention.
Figure 19L:
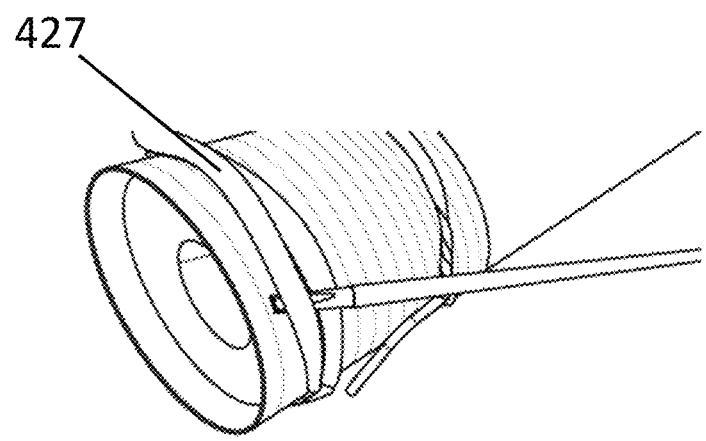
FIG. 19L illustrates a screwdriver being used to tease open a second portion of a fabric loop according to one embodiment of the present invention.
Figure 19M:
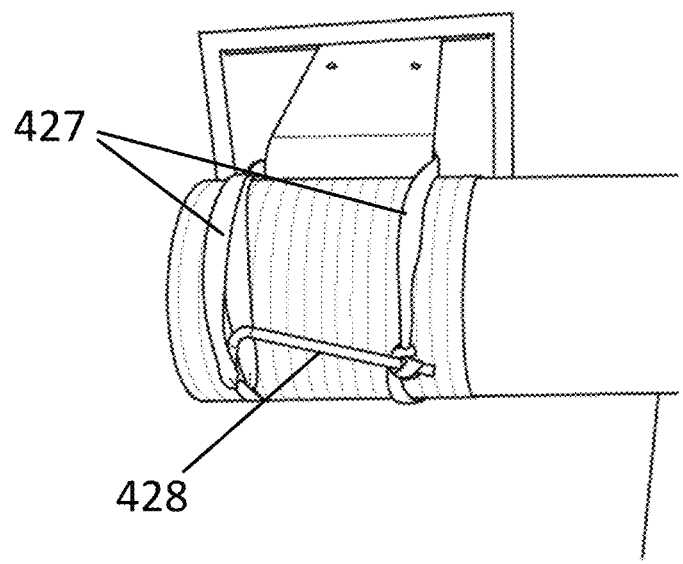
FIG. 19M illustrates a second end of the tourniquet pin shown in FIGS. 19J and 19K being inserted into the second portion of the fabric loop teased open according to FIG. 19L.

In order to tighten this connection, a tourniquet pin 428 is able to be used as shown in FIGS. 19J-M. First, as shown in FIGS. 19J and 19K, a first end of the pin 428 is twisted around the first end of the loop 427, tightening the loop or tape 427 and securely connecting the second section to the bracket. As shown in FIG. 19L, a screwdriver or other tool is then able to be used to pry or tease open a portion of the second end of the loop 427 and then a second end of the pin 428 is inserted into the teased-open section of the second end of the loop 427, securing the pin 428 in place.

Flexible Photovoltaic (PV) Film Surface

Figure 20:
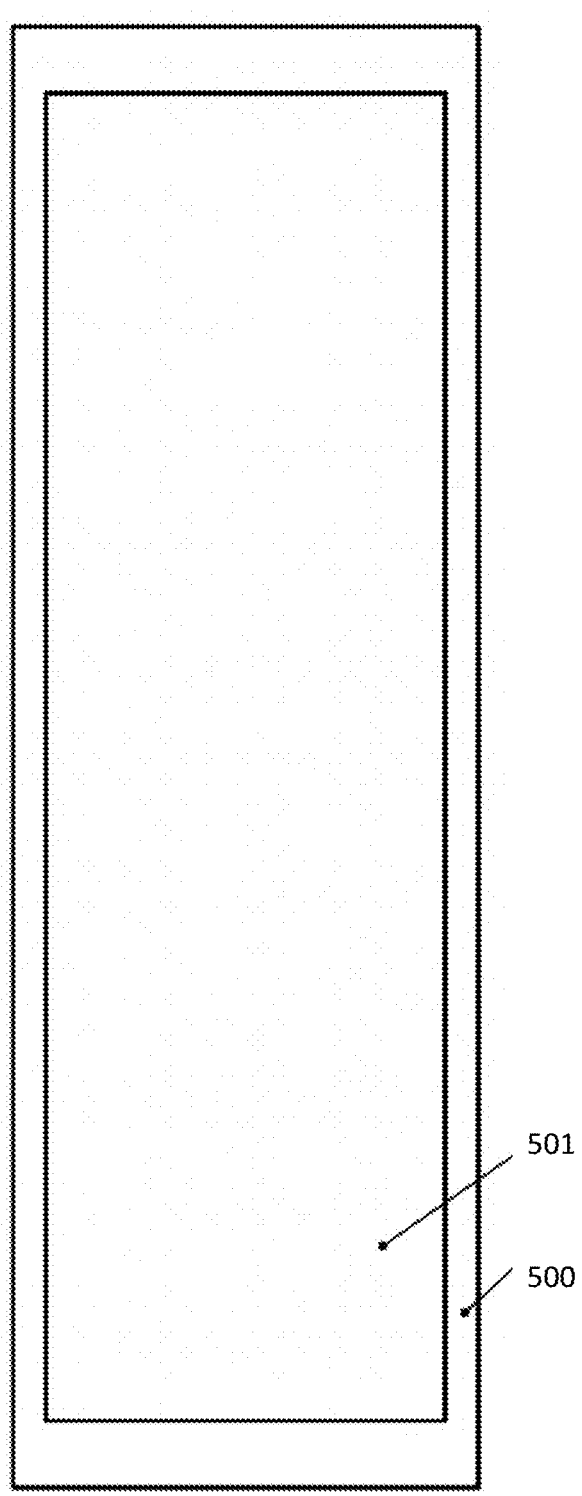
FIG. 20 illustrates a top view of a non-heat-shrinkable film substrate and a heat shrinkable border according to one embodiment of the present invention.

FIG. 20 illustrates a top view of a non-heat-shrinkable film substrate and a heat shrinkable border according to one embodiment of the present invention. The film substrate 501 includes a non-heat shrinkable border 500 or a heat-shrinkable border.

In one embodiment, the stretched polymer film used for the fuselage, wings, and other components of the glider includes biaxially-oriented polyethylene terephthalate (e.g., MYLAR) and/or polyethylene. In one embodiment, the upward facing surfaces of each fuselage are lined with the stretched polymer film skin. In one embodiment, one or more photovoltaic cells are integrally formed into the polymer film skin. In one embodiment, the polymer film skin includes or consists of polyethylene. In one embodiment, the stretched polymer film skin is placed not only over the fuselages of the glider system, but also over the wings and/or central section of the glider, providing for additional surface area for the inclusion of photovoltaic cells. In one embodiment, the photovoltaic cells include copper indium gallium selenide (CIGS) solar cells, but one of ordinary skill in the art will understand that other forms of photovoltaic cells are also able to be used with the present invention. In one embodiment, the photovoltaic cells have a weight less than 60 g/m$^2$ each. This system of utilizing photovoltaic cells integrally formed with the polymer skin provides a notable benefit in mass reduction over existing solar powered planes. Existing planes tend to form photovoltaic cells on a thin glass substrate 501 and then attach (usually by glue or other adhesive) this thin glass substrate to a stretched polymer layer. Existing systems therefore require the mass of both the glass and the polymer layer, which the present invention reduces into one single, less heavy component.

Flexible Photovoltaic (PV) Film with Lacquer Coating

In one embodiment, the photovoltaic cells integrated into the polymer skin are coated with a protective lacquer coating in order to provide a barrier from moisture and corrosion. In one embodiment, the lacquer coating has a weight of approximately 30 $g/m^2$. In one embodiment, the lacquer coating is applied to the photovoltaic cells via sputter deposition. This contrasts with conventional methods of encapsulating the photovoltaic cells with a film or envelope (typically comprising ethylene-vinyl acetate (EVA)), which typically have a weight of approximately 500 to approximately 800 $g/m^2$. Thus, the use of the lacquer coating significantly reduces the weight of the protected cells.

Combining Heat Shrinkable and Non-Heat Shrinkable Films

In one embodiment, some sections of the polymer film skin include heat shrinkable polymer film and other sections of the polymer film skin include non-heat shrinkable polymer films. For the purposes of this application, the term "heat shrinkable" refers to materials that reduce in a linear dimension by at least 5% under the influence of heat. Structures are operable to be formed on non-heat shrinkable films into sheets and joined to the edges of a heat shrinkable polyethylene film border to form a panel. Adjacent panels are configured to be joined together and are operable to form the skin of a wing, fuselage, or any other component of the glider. The panels are operable to be attached to the underlying structure. In one embodiment, the non-heat shrinkable polymer films define sections where the photovoltaic films are integrally incorporated, while heat shrinkable polymer film sections extend between one or more of the photovoltaic films. In one embodiment, elements other than just photovoltaic cells are integrally formed with the polymer film skin, including but not limited to antennas (e.g., phased array antennas) and/or mirrors. Incorporating heat shrinkable polymer films into the polymer skin allows the polymer skin to be tightened around the fuselages. Thus, a fuselage of the present invention is operable to comprise a stretched polyethylene film skin with integral photovoltaic cells. The non-shrinkable film substrate is operable to integrate with electronics.

Metallized Carbon Fiber Lens

FIGS. 21A-E show various views of a carbon fiber surface able to be used with an imaging system onboard the glider of the present invention.

Figure 21A:
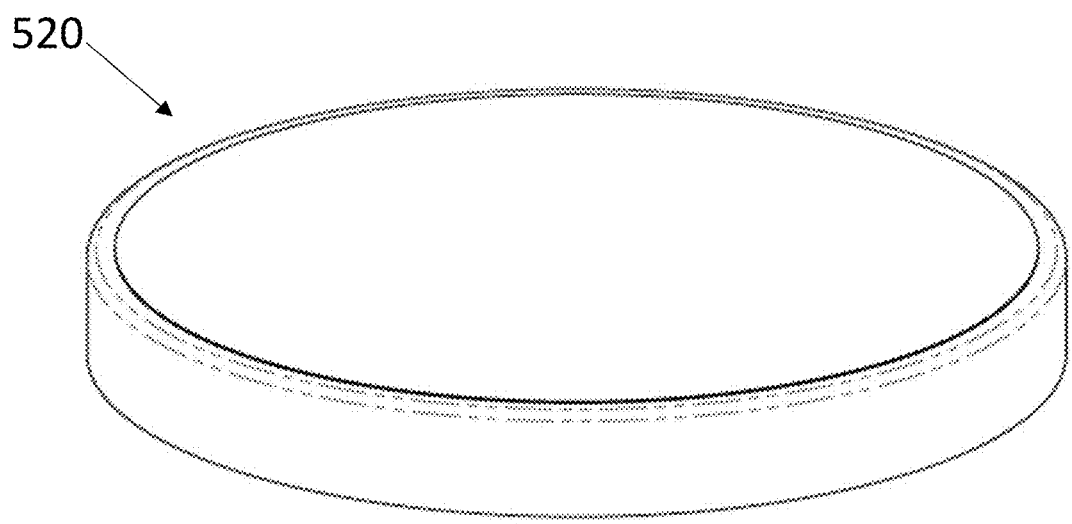
FIG. 21A illustrates a perspective view of a parabolic surface for an imaging system attached to a glider according to one embodiment of the present invention.
Figure 21B:
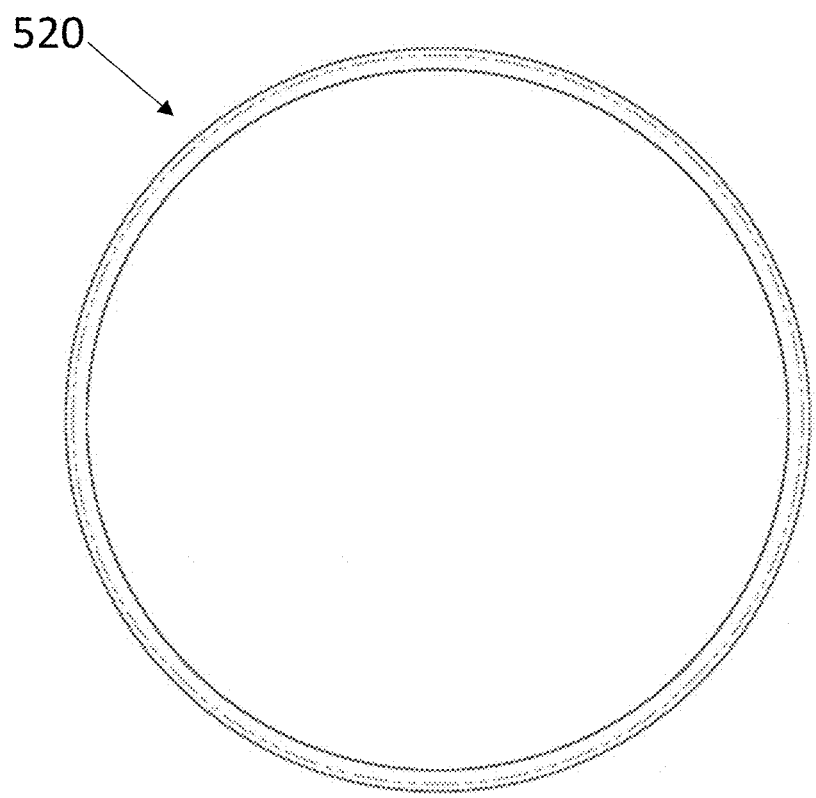
FIG. 21B illustrates a top view of a parabolic surface for an imaging system according to one embodiment of the present invention.
Figure 21C:
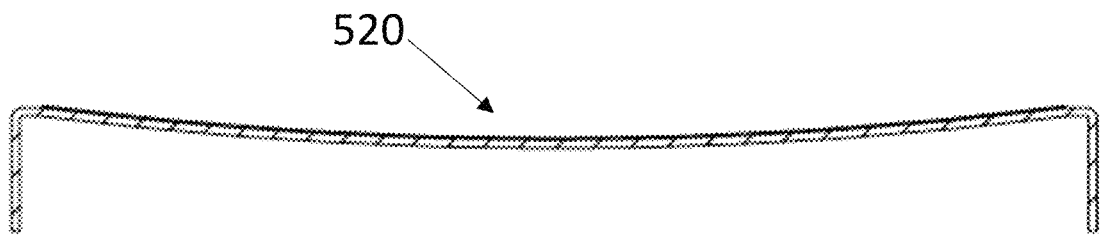
FIG. 21C illustrates a cross-sectional view of a parabolic surface for an imaging system attached to a glider according to one embodiment of the present invention.
Figure 21D:
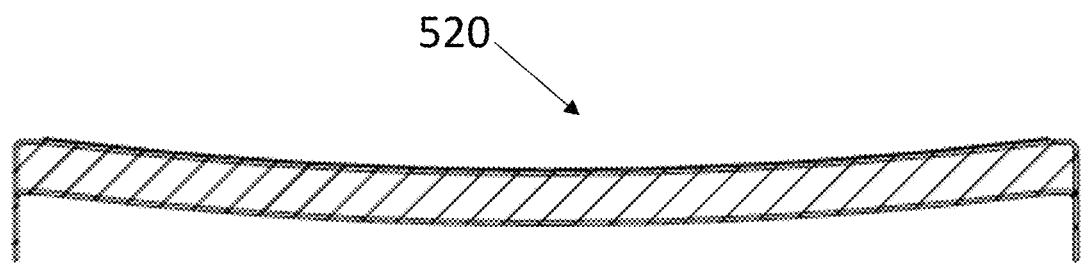
FIG. 21D illustrates a cross-sectional view of a parabolic surface for an imaging system attached to a glider according to one embodiment of the present invention.
Figure 21E:
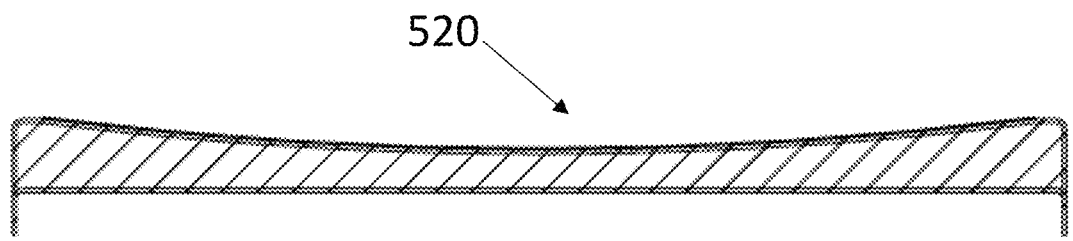
FIG. 21E illustrates a cross-sectional view of a parabolic surface for an imaging system attached to a glider according to one embodiment of the present invention.

In one embodiment, the glider carries an imaging system as a payload for surveillance or monitoring of a surface below. In one embodiment, the imaging system includes a sensor having a reflecting telescope design, wherein the parabolic primary mirror 520 and/or one or more optional secondary mirrors have a composite material (e.g., carbon fiber) parabolic surface sputter coated with a metallic, light-reflecting coating. Various cross-sectional designs are contemplated herein, several examples of which are shown in FIGS. 21C-E. At the prime focus of the sensor is a charge coupled device (CCD). In one embodiment, the cylindrical side walls of the sensor include or are formed from a composite material (e.g., carbon fiber). In one embodiment, the focal length of the sensor is optimized to image ground features when the glider is between approximately 65,000 to approximately 70,000 feet above ground level. However, one of ordinary skill in the art will understand that the sensor is able to be designed so as to optimally image at different elevations.

Advantageously, the imaging system used for the present invention is notably light compared to glass-based lens systems and it has a very low thermal mass, allowing it to reach thermal equilibrium quickly without thermal distortions. In one embodiment, the imaging system has a mass of approximately 50 g. Furthermore, the system is able to provide very high magnification, equivalent to much heavier and much more expensive glass lens systems than are otherwise able to be used in HPAS systems. In one embodiment, the magnification is such that a single pixel of the imaged surface is equivalent to approximately 8 cm of distance on the ground.

Training of Artificial Intelligence (AI)-Based Models

For many applications, such as weather monitoring, earth observation, earth imaging, border security, maritime patrols, anti-piracy operations, disaster response and agricultural observation, low earth orbit (LEO) satellites are currently used. But a typical LEO satellite with an orbital period of 120 minutes and a velocity of 27,000 Km/h is often only over the same area of the planet for a fraction of a second each day. Another approach is to use light aircraft, but these are both costly and cannot loiter over a target area for more than a few hours.

A plane according to the present invention is able to loiter directly over a target area for many weeks, providing continuous, real-time data throughout this time. In a 24 hr period, a sensor on the plane of the present invention, at say 9 Hz refresh rate, is gathering approximately 777,000 images/samples of the target scene. A satellite constellation at full capacity is able to gather 50-100, thus, a single plane of the present invention is able to deliver up to 15,000× more information, giving a significant boost in temporal resolution, at a far lower cost.

For AI and signal processing, this larger data set (sample set) enables larger integration times which enable an exponential gain in resolution (signal to noise) such that objects, movements and changes are able to be seen at far higher resolutions and with much higher certainty than from a few samples. Further, the fact that the planes hold stationary by circling over the spot adds a 360° dimension to the data sets, further boosting resolution and reliable object, movement or event detection. The combined effect is a significant gain in spatial-temporal resolutions for any sensor/instrument flown, which closes critical observation gaps across a wide range of Earth Observation missions.

The planes of the present invention are thus able to persistently monitor earth areas and generate continuous real-time data over many weeks; a key advantage over satellite based systems. Satellite systems are also limited to the imaging and earth monitoring systems available when the satellite is designed, which are sometimes obsolete after a few years, but cannot be replaced. The imaging and earth monitoring systems payload in a plane of the present invention are able to be updated prior to a mission and so the most up to date and lightweight systems are used.

In one embodiment, the planes leverage high-capacity satcom networks to live stream data to a satellite and the satellite then transmits that data to a ground station for immediate analysis and use. The planes of the present invention are also able to use a free-space optical link for transmitting directly to a ground station, another plane, or a satellite.

One or more sensors or imaging subsystems that are configured to operate in the stratosphere are able to be used in the plane and the outputs of each sensor or imaging subsystem combined (locally in a plane, or in data-connected planes, or on-the ground or remotely) to detect, predict or monitor a wide range of natural disasters or events.

Inference for AI-Based Models

Because suborbital platforms of the present invention provide continuous, real-time data feeds that last for hours, days or even weeks for a specific target area, raw and processed (as in the above examples), this data is then used to significantly improve AI based predictive models, such as those used in disaster or emergency response environments. For example, being able to predict winds, movement of fires, water flows, rain, and other environmental incidents is key to incident room decision-making. The problem is that most of these models are using relatively old data, perhaps satellite imagery from several hours ago, or field reports from a very small sample of events in the field. Thus, the decision-making is not based on continuous, real-time data (inputs and outputs then generated from their predictive systems), nor data for a specific target area that has been captured over days or even weeks of persistent, continuous data capture.

However, the present invention changes this dramatically by live feeding in new, dynamic, volumetric data of events and how they are varying in time, over continuous and extended time periods (e.g. hours, or days or even weeks) to greatly improve the accuracy and value of predictive models/systems. This new data that is fed to an AI system to enable the AI system to make inferences or predictions is called inference data.

With live feeding of the data to these predictive systems, the models are able to be accelerated up to near real-time (the time between data capture, streaming to the ground and ingesting and processing by the predictive system—i.e., a minute or two), which will naturally boost incident room accuracy and quality of decision making, closing a critical observation gap for predictive modelling.

Further, the output from the predictive systems is able to be fed back into data gathering systems, along with incident room instructions, in a feedback loop that is able to be used by a machine learning system to improve the accuracy and value of Solaris' operations and services for customers.

The planes are able to act as a co-ordination point by providing both live 'eyes-on' data for controllers and first-responders, but also providing navigation, mission and other data to people and vehicles (manned or autonomous) during the response stages. The planes are able to carry a range of equipment, communications and even their own navigation services (INSS/GNSS) to ensure highly precise operations below. This improves accuracy, reliability, safety and reduces costs.

One example is in fire-fighting where the planes are able to detect fires over wide areas and then guide in drones/UAVs or even ground vehicles to remote locations to deliver fire-suppressants. The planes are able to monitor the effect of suppressants or other tactics to ensure that they have worked, to either guide another craft to continue, or the original one to return. It is then operable to enable co-ordination of actions in real-time, and measure the effectiveness in real-time of these actions, guide craft and people to/from where needed, safely, and efficiently, and optimize the overall effectiveness and cost of fighting fires.

Characterizing 3D Spaces

There are many new impact/climate applications which the present system is ideally suited for, because the relative proximity of the planes to the earth surface (compared to satellites) yields high SNR and the persistence of the planes (compared to satellites) delivers deep data sets and integration times that allow for granular detection in 3D spaces. On typical application is GHG (greenhouse gas) monitoring and pollution monitoring and characterizing columns of the atmosphere for scientific interests (e.g. for benchmarking natural/background levels of key gases, particulates, aerosols against pollutants and monitoring man-made peaks). Another application is the use of LiDAR (and other technologies) to map wind speeds at varying layers-meteorological, climate change, renewable optimization (turbines), aviation efficiency. Yet another application is using LiDAR and/or GNSS-R techniques to measure atmospheric moisture levels (e.g., atmospheric rivers that determine large parts of the hydrological cycle in US, Asia, etc., flood vs. drought planning). Still another application is measuring the dynamics of ocean/sea characteristics, which is key to modelling the impact of climate change actions (e.g., when to spread alkaline chemicals or materials that accelerate the sea/ocean's ability to absorb $CO_2$ (marine Carbon Dioxide Removal) to match optimal absorption windows and avoid excess mixing between lower layers.) The present system is also able to be used for fisheries, marine plant stocks, and other natural resources one is aiming to enhance and/or protect, for commercial purposes (i.e., optimizing safety, energy efficiency etc., of all types of vessels (above and below marine)), measuring ocean/sea surface characteristics (e.g., waves/roughness, currents, and cycles for safe navigation, optimization), and heat wave/heat island monitoring (e.g., for climate change, agriculture, droughts, pest migration/swarm direction).

The system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short-term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 22:
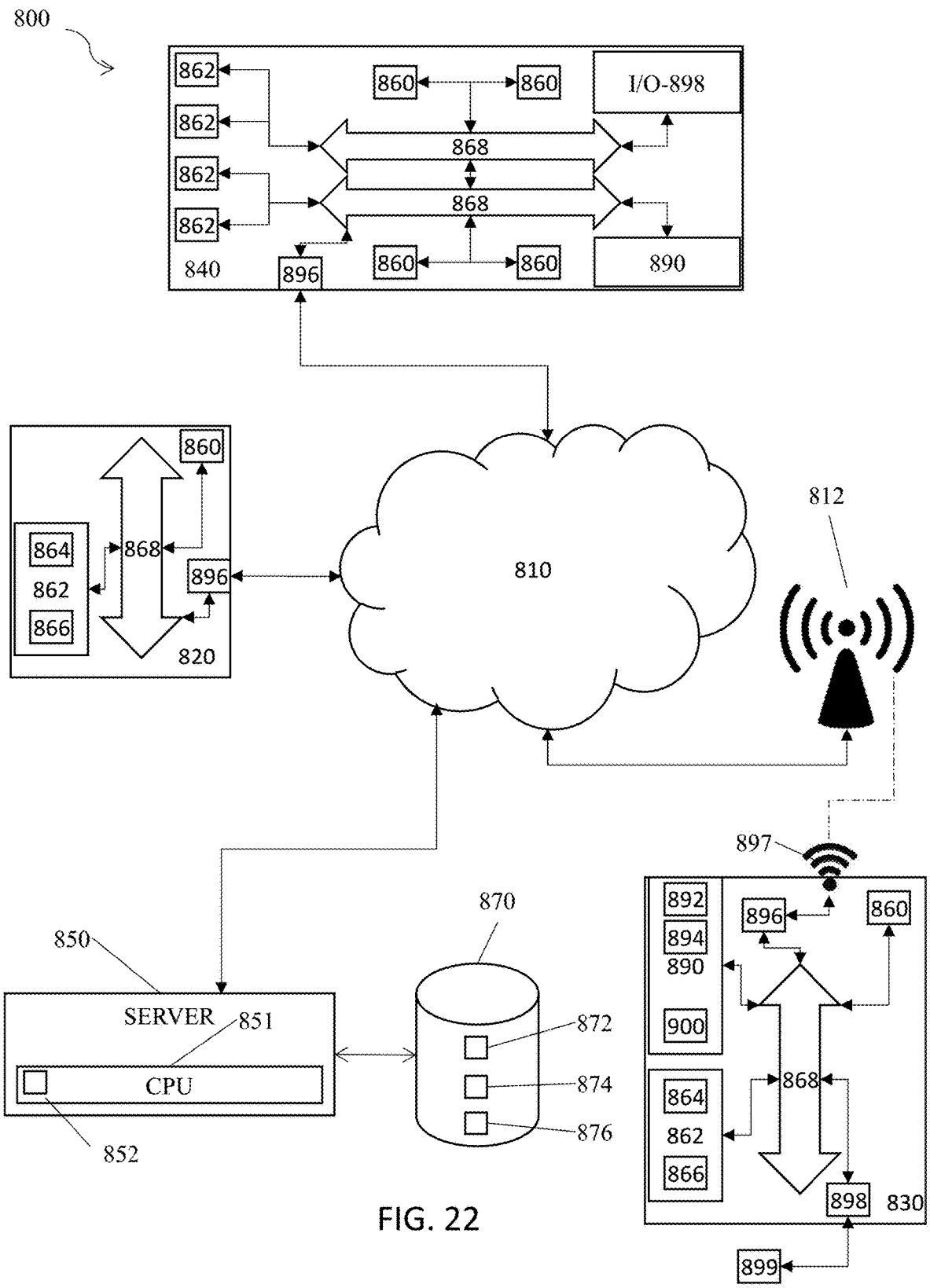
FIG. 22 is a schematic diagram of a system of the present invention.

FIG. 22 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 22, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 22, is operable to include other components that are not explicitly shown in FIG. 22, or is operable to utilize an architecture completely different than that shown in FIG. 22. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

Modular Construction

1. A solar powered plane, configured to operate in the stratosphere, that includes at least one or more replaceable structural sections, each configured to be attachable, detachable and replaceable during normal servicing or operations.
2. The solar powered plane of Claim 1 in which one of the replaceable structural sections is a central wing section positioned between two fuselages.
3. The solar powered plane of any preceding Claim in which one of the replaceable structural sections is an inboard wing section.
4. The solar powered plane of any preceding Claim in which one of the replaceable structural sections is an outboard wing section.
5. The solar powered plane of any preceding Claim in which one of the replaceable structural sections is a wing-tip section.
6. The solar powered plane of any preceding Claim in which one of the replaceable structural sections is a winglet section.
7. The solar powered plane of any preceding Claim in which one of the replaceable structural sections is a fuselage section.
8. The solar powered plane of any preceding Claim in which one of the replaceable structural sections is a boom section.
9. The solar powered plane of any preceding Claim in which one of the replaceable structural sections is a vertical stabilizer section.
10. The solar powered plane of any preceding Claim in which one of the replaceable structural sections is a tail plane section.
11. The solar powered plane of any preceding Claim in which one of the replaceable structural sections is a wing section, and different interchangeable wing sections have different surface areas.
12. The solar powered plane of any preceding Claim in which one of the replaceable structural sections is a fuselage or boom, and different interchangeable fuselages or booms have different lengths (dimension in the direction of the long axis of the fuselage or boom).
13. The solar powered plane of any preceding Claim in which one of the replaceable structural sections is a fuselage or boom, and different interchangeable fuselages or booms have different widths (dimension in the direction perpendicular to the long axis of the fuselage or boom).
14. The solar powered plane of any preceding Claim in which one or more of the replaceable structural sections are chosen to meet the specific payload requirements for a mission.
15. The solar powered plane of any preceding Claim in which one or more of the replaceable structural sections are chosen to meet the specific endurance requirements for a mission.
16. The solar powered plane of any preceding Claim in which one or more of the replaceable structural sections are chosen to meet the specific application or mission type, such as weather monitoring, earth observation and earth imaging, border security, maritime patrols, anti-piracy operations, disaster response and agricultural observation.
17. The solar powered plane of any preceding Claim in which one or more of the replaceable structural sections is a wing section, and a wing section with a larger surface area is chosen where more lift is required.
18. The solar powered plane of any preceding Claim in which one or more of the replaceable structural sections is a central wing section, and a larger central wing section is used for a heavier payload, compared with the central section used for a lighter payload.
19. The solar powered plane of any preceding Claim in which one or more of the replaceable structural sections is a wing section, and a wing section with a smaller surface area is chosen where more maneuverability, e.g., a tight turning radius, is required.
20. The solar powered plane of any preceding Claim in which one or more of the replaceable structural sections is a fuselage boom, and a longer fuselage boom is chosen where a payload is more forward mounted.
21. The solar powered plane of any preceding Claim in which one or more of the replaceable structural sections is attached to another section or part of the plane using a mechanical joint.
22. The solar powered plane of preceding Claim 21 in which one or more of the replaceable structural sections is attached to another section or part of the plane using a quick release mechanical joint.
23. The solar powered plane of any preceding Claim in which one or more of the replaceable structural sections is attached to another section or part of the plane using a joint that is one or more of the following types of joint: tongue and groove; mortise and tenon; half-lap; biscuit; pocket; dovetail; rabbet.
24. The solar powered plane of any preceding Claim in which joins between replaceable structural sections are designed as failure points.
25. The solar powered plane of any preceding Claim in which multiple replaceable structural sections are secured together using a tether so that they do not separate in the event of an airframe failure.
26. The solar powered plane of any preceding Claim in which the plane is a dual fuselage plane with an approximately 38 m wingspan.

Carbon Fiber Spar
1. A solar powered plane, configured to operate in the stratosphere, that includes a light-weight spar formed as a tube with a circular or elliptical cross section, with carbon fiber inner and outer surfaces, between which is a structural foam core.
2. The solar powered plane of any preceding Claim in which different regions of the tube have different cross-sectional geometries to create different properties.
3. The solar powered plane of any preceding Claim in which the structural foam core is a polymethacrylimide (PMI) based structural foam.
4. The solar powered plane of any preceding Claim in which different regions of the wing spar have different mechanical properties, optimized for the specific forces or possible failure modes at that region.
5. The solar powered plane of any preceding Claim in which, where additional strength is needed, then a denser foam core and/or extra carbon fiber is used locally.
6. The solar powered plane of any preceding Claim in which intentionally designed-in weak points are created by using a less dense core, and/or by varying the carbon fiber layering.
7. The solar powered plane of any preceding Claim in which the spar is a wing spar.
8. The solar powered plane of any preceding Claim 1-6 in which the spar is a fuselage spar.
9. The solar powered plane of any preceding Claim in which the plane is a dual fuselage plane with an approximately 38 m wingspan.

Downward Winglet that Acts as Landing Skid
1. A solar powered plane, configured to operate in the stratosphere, that includes downward facing winglets that are also configured to act as landing skids.
2. The solar powered plane of any preceding Claim in which the downward facing winglets are configured to protect the underside of the wings from ground damage when landing.
3. The solar powered plane of any preceding Claim in which the base of each winglet includes a sacrificial material that contacts the ground.
4. The solar powered plane of preceding Claim 3 in which the sacrificial material is a light XPS foam.
5. The solar powered plane of any preceding Claim 3 or 4 in which the sacrificial material is configured to be replaceable during servicing.
6. The solar powered plane of any preceding Claim in which the plane is a dual fuselage plane with an approximately 38 m wingspan Battery Re-Positioning for Optimal Balancing
1. A solar powered plane, configured to operate in the stratosphere, that includes batteries or one or more battery packs that are configured to be positioned pre-flight to give an optimal mass distribution to offset or compensate for the mass and position of different payloads.
2. The solar powered plane of preceding claim 1 in which the battery position adjustment system enables fore and aft adjustments.
3. The solar powered plane of any preceding Claim in which the battery position adjustment system enables port/starboard lateral adjustments.
4. The solar powered plane of any preceding Claim in which the battery position adjustment system enables vertical adjustments of the battery pack.
5. The solar powered plane of any preceding Claim in which any adjustment type (fore/aft; lateral; vertical) can be done independently of any other adjustment type.
6. The solar powered plane of any preceding Claim in which the battery position adjustment system includes a frame with multiple different positions that the batteries or one or more battery packs can be positioned on or against.
7. The solar powered plane of any preceding Claim in which the plane is a dual fuselage plane with an approximately 38 m wingspan.

Over-Sized Foam Core Used in the Carbon Fiber Propeller Blade
1. A carbon fiber structure for a system, the structure made using a vacuum/compression molding process, with carbon fiber pre-impregnated sheets formed in a mold around an over-sized structural foam core.
2. The carbon fiber structure of preceding Claim 1 in which the over-sized structural foam core is sized so that one or more surfaces of the core are compressed down by at least 0.2 mm during the molding process.
3. The carbon fiber structure of preceding Claim in which the over-sized structural foam core is sized so that one or more surfaces of the core are compressed down by approximately 0.5 mm during the molding process.
4. The carbon fiber structure of preceding Claim in which the over-sized structural foam core is sized and shaped so that, when a press is closed over the carbon fiber pre-impregnated sheets, then at least some of the surface of over-sized structural foam core is crushed or compressed, squeezing out some or all bubbles or wrinkles in the carbon fiber pre-impregnated sheets.
5. The carbon fiber structure of preceding Claim in which carbon fiber pre-impregnated sheets for one outside side skin of the structure are laid into a lower half of a mold, followed by a pre-machined over-sized foam core, which is then covered with the second carbon fiber outside skin and the press is then closed to compress two halves of the mold together.
6. The carbon fiber structure of any preceding Claim in which the system is any device over which smooth air or fluid flow is desirable.
7. The carbon fiber structure of any preceding Claim in the system is a solar powered plane configured to operate in the stratosphere and the structure is a propeller blade.

8. The carbon fiber structure of any preceding Claim in the system is a solar powered plane configured to operate in the stratosphere and the structure is a strut or spar.
9. The carbon fiber structure of any preceding Claim in the system is a solar powered plane configured to operate in the stratosphere and the plane is a dual fuselage plane with an approximately 38 m wingspan.

Carbon Fiber Propeller Blade with Inhomogeneous Internal Structural Foam Core

1. A carbon fiber structure for a solar powered plane configured to operate in the stratosphere, in which the structure comprises an outer carbon fiber shell enclosing an internal structural foam core together with a second material with a different mechanical property to the foam core or the carbon fiber shell.
2. The carbon fiber structure of preceding Claim 1 in which the structure is a propeller blade.
3. The carbon fiber structure of preceding Claim 1 in which the structure is a strut or spar.
4. The carbon fiber structure of any preceding Claim in which the second material is optimized for specific forces.
5. The carbon fiber structure of any preceding Claim in which the second material is optimized for specific failure modes.
6. The carbon fiber structure of any preceding Claim in which the second material is also a foam core, but of different density to the internal structural foam core.
7. The carbon fiber structure of any preceding Claim in which the second material is a non-foam material.
8. The carbon fiber structure of any preceding Claim in which the second material is a honeycomb core used to reduce mass in areas of the structure where less strength is needed.
9. The carbon fiber structure of any preceding Claim in which the second material is an insert that is inserted into a void or space in the internal structural foam core, and the insert is configured to provide specific mechanical properties.
10. The carbon fiber structure of any preceding Claim 9 in which the insert is configured to provide extra strength or rigidity.
11. The carbon fiber structure of any preceding Claim in which the insert is a carbon fiber tube.
12. The carbon fiber structure of any preceding Claim in which the insert is a laminate.
13. The carbon fiber structure of any preceding Claim in which the insert is a foam that is denser than the internal structural foam core.
14. The carbon fiber structure of any preceding Claim in which the plane is a dual fuselage plane with an approximately 38 m wingspan.

Triangular Cross-Section Fuselage

1. A solar powered plane, configured to operate in the stratosphere, and including at least one fuselage with a triangular cross-section with apex at the top, and in which an array of PV cells is formed on the two upward facing surfaces of the fuselage.
2. The solar powered plane of preceding Claim 1 in which the plane includes two fuselages, each formed with a triangular cross-section with its apex at the top, and an array of PV cells is formed on the two upward facing surfaces of each fuselage.
3. The solar powered plane of any preceding Claim in which the surface of each fuselage comprises a stretched polythene film skin with integral PV cells.
4. The solar powered plane of any preceding Claim in which the fuselage is isosceles in cross-section.
5. The solar powered plane of any preceding Claim in which the fuselage is equilateral in cross-section.
6. The solar powered plane of any preceding Claim in which the plane includes further PV cells on the upper surface of one or more wing sections.
7. The solar powered plane of any preceding Claim in which the plane is a dual fuselage plane with an approximately 38 m wingspan.

Hinged Tail with Landing Skid

1. A solar powered plane, configured to operate in the stratosphere, and including a hinged vertical stabilizer that pivots about a hinge, where the stabilizer extends both above a fuselage and also below the fuselage, and the base of the vertical stabilizer includes a skid.
2. The solar powered plane of preceding Claim 1 in which the hinged vertical stabilizer is configured such that when the skid contacts the ground on landing, the top of the vertical stabilizer pivots forwards around the hinge, minimizing damage to the aircraft on landing.
3. The solar powered plane of any preceding Claim in which the skid includes a lightweight, replaceable sacrificial layer.
4. The solar powered plane of any preceding Claim in which the vertical stabilizer is prevented from hinging during normal flight by means of either a frangible pin or lashing.
5. The solar powered plane of any preceding Claim in which the plane includes downward facing winglets and these also act as landing skids.
6. The solar powered plane of any preceding Claim in which the plane is a dual fuselage plane with an approximately 38 m wingspan Propeller Blades Align with the Wing Direction Prior to Landing 1. A solar powered plane configured to operate in the stratosphere, in which the plane includes, or receives data from, a sensor configured to detect the approach of the plane to an autonomous ground platform (AGP) on which the plane is designed to land; and in which the sensor is further configured to generate a signal that is used to control the propeller blades to be in-line with the wings of the plane when the height of the plane above the AGP and/or its rate of descent to the AGP or the time to landing on the AGP meet defined criteria.
2. The solar powered plane of preceding Claim 1 or 2 in which data from the sensor is used to enable accurate relative positioning of the plane and the AGP.
3. The solar powered plane of any preceding Claim in which the sensor is in the plane, or the AGP or is distributed between the plane and the AGP.
4. The solar powered plane of any preceding Claim in which the blades are also automatically turned to be in-line with the wings prior to landing on the ground, the sensor is configured to detect the approach of the plane to the ground.
5. The solar powered plane of any preceding Claim in which the motor or motors driving the or each blade are shorted to stop the propeller blades when they are be in-line with the wings.
6. The solar powered plane of preceding Claim 1 in which each propeller motor is fitted with (i) a position sensor that detects the position of the propeller and (ii) a motor controller configured to rotate or step the motor rotation until the propeller is aligned substantially horizontally.

7. The solar powered plane of any preceding Claim in which the plane is a dual fuselage plane with an approximately 38 m wingspan.

Very Fine Flight Control
1. A solar powered plane, configured to operate in the stratosphere, including movable control surfaces extending from a fuselage of the plane and positioned adjacent to, but behind and below, the main wings of the plane.
2. The solar powered plane of preceding claim 1 in which the main wings include no moving parts or control surfaces.
3. The solar powered plane of any preceding Claim in which at least some of the plane's payload is distributed in some portions of the main wings.
4. The solar powered plane of any preceding Claim in which the movable control surfaces are trim ailerons.
5. The solar powered plane of any preceding Claim in which the pane has twin fuselages, each with a motor driving a propeller, and is configured for differential power to be provided to each motor to enable a substantially flat turn to be achieved in conjunction with the control surfaces.
6. The solar powered plane of any preceding Claim in which the plane is a dual fuselage plane with an approximately 38 m wingspan.

Combining Heat Shrinkable and Non-Heat Shrinkable Films
1. A solar powered plane configured to operate in the stratosphere, the surface of the plane comprising panels that are each made up of (i) a sheet that includes a non-heat-shrinkable film substrate and (ii) a heat shrinkable border to the sheet, and in which these panels are joined or attached together to form part of a surface of the plane that is tensioned or tightened by heating the heat shrinkable border.
2. The solar powered plane of preceding Claim 1 in which the sheets include one or more PV films formed on a non-heat-shrinkable film substrate.
3. The solar powered plane of any preceding Claim in which the sheets include one or more antennas, such as phased array antennas, formed on a non-heat-shrinkable film substrate.
4. The solar powered plane of any preceding Claim in which the sheets include one or more mirrors.
5. The solar powered plane of any preceding Claim in which the surface that is tensioned or tightened forms a part of the wing and/or fuselage surface of the plane.
6. The solar powered plane of any preceding Claim in which the plane is a dual fuselage plane with an approximately 38 m wingspan.

Flexible Photovoltaic Film Wing Surface
1. A solar powered plane, configured to operate in the stratosphere, including PV cells that are manufactured on or integrated with a polythene film substrate and the polythene film substrate of multiple PV cells are joined together to form a part of the wing and/or fuselage surface.
2. The solar powered plane of preceding Claim 1 in which the joined polythene film substrates of the PV cells are formed into a stretched skin that forms at least part of the wing and/or fuselage surface.
3. The solar powered plane of any preceding Claim in which the polythene film substrates of the PV cells are non-heat-shrinkable.
4. The solar powered plane of any preceding Claim in which the polythene film substrates of the PV cells are attached at their edge to sections of a heat-shrinkable polythene film that is heated to form a tensioned surface.
5. The solar powered plane of any preceding Claim in which the plane is a dual fuselage plane with an approximately 38 m wingspan.

Flexible Photovoltaic Film with Lacquer Coating
1. A solar powered plane, configured to operate in the stratosphere, and including PV cells that are protected for high altitude flight operations with an application of a thin layer of lacquer.
2. The solar powered plane of preceding Claim 1 in which the PV cells are manufactured on or integrated with a polythene film substrate.
3. The solar powered plane of any preceding Claim in which the lacquer replaces an EVA film or envelope.
4. The solar powered plane of any preceding Claim in which the lacquer is applied to the PV cells using a sputter deposition process.
5. The solar powered plane of any preceding Claim in which the plane is a dual fuselage plane with an approximately 38 m wingspan.

Metallized Carbon Fiber Lens
1. A solar powered plane, configured to operate in the stratosphere, and configured with an imaging system including a carbon fiber parabolic surface that has been sputter coated with a metallic, light reflecting coating.
2. The solar powered plane of preceding Claim 1 in which, at the prime focus of the parabolic surface, is a conventional digital camera CCD.
3. The solar powered plane of any preceding Claim in which the cylindrical side walls of the reflector are carbon fiber.
4. The solar powered plane of any preceding Claim in which the imaging system delivers approximately 1 pixel=8 cm ground sample distance.
5. The solar powered plane of any preceding Claim in which the focal length of the imaging system is optimized to image ground features when the plane is at stratospheric altitudes, such as 65,000-70,000 feet.
6. The solar powered plane of any preceding Claim in which the plane is a dual fuselage plane with an approximately 38 m wingspan.

Phased Array Antenna Sputter Coated Directly onto the Mylar Film Forming the Underside of a Wing
1. A solar powered plane, configured to operate in the stratosphere, and including an antenna formed directly onto a stretched polythene film substrate to form part of the surface of the plane.
2. The solar powered plane of preceding Claim 1 in which the stretched polythene film substrate forms the lower surface of a wing section.
3. The solar powered plane of any preceding Claim in which the antenna is formed directly onto the stretched polythene film by a sputter deposition process.
4. The solar powered plane of any preceding Claim in which the antenna is a phased array antenna.
5. The solar powered plane of preceding Claim 4 in which the antenna is a phased array antenna configured for communications.
6. The solar powered plane of preceding Claim 4 in which the antenna is a phased array antenna configured for radar.
7. The solar powered plane of preceding Claim 4 in which the antenna is a phased array antenna that is linear, grid or conformal.

8. The solar powered plane of any preceding Claim in which the antenna is a passive antenna.
9. The solar powered plane of any preceding Claim in which the antenna is an active antenna.
10. The solar powered plane of any preceding Claim in which adjacent polythene film substrates of the antenna are joined together.
11. The solar powered plane of any preceding Claim in which the joined polythene film substrates of the antenna are formed into part of a stretched skin that forms at least part of the wing and/or fuselage surface.
12. The solar powered plane of any preceding Claim in which the polythene film substrates of the antennas are non-heat-shrinkable.
13. The solar powered plane of any preceding Claim in which the polythene film substrates of the antennas are attached at their edge to sections of a heat-shrinkable polythene film that is heated to form a tensioned surface.
14. The solar powered plane of any preceding Claim in which the plane is a dual fuselage plane with an approximately 38 m wingspan.

Parallel Processing of Wing Mounted Imaging Sensors
1. A solar powered plane, configured to operate in the stratosphere, and including multiple sensors capturing a swath or width that is greater than the width that a single sensor could capture, and the plane includes a local processor, such as a GPU, configured to process the data from the multiple sensors into a single dataset covering the entire swath.
2. The solar powered plane of preceding Claim 1 in which some or all of the multiple sensors are mounted at different positions along the wings.
3. The solar powered plane of any preceding Claim in which one or more of the multiple sensors are mounted in a fuselage and one or more are oriented in different directions.
4. The solar powered plane of any preceding Claim in which one or more of the multiple sensors are mounted at different positions along the wings and the processor is configured to compensate for wing flex.
5. The solar powered plane of any preceding Claim in which one or more of the sensors are image sensors and the single dataset is an image covering the entire swath.
6. The solar powered plane of any preceding Claim in which the plane is a dual fuselage plane with an approximately 38 m wingspan.

Ground Station Connectivity
1. A method of providing data connectivity for a solar powered plane, configured to operate in the stratosphere, including the step of moving a mobile ground station to a defined location, and configuring the plane to fly a path that enables the plane to transmit data back down to the mobile ground station.
2. The method of Claim 1 in which the path is optimized to increase the reliability and/or speed of the data transmission.
3. The method of any preceding Claim in which the plane uses a line-of-sight optical link to the ground receiving station/s for very fast (up to 100 Gbps) and high security data transfer.
4. The method of any preceding Claim in which the data is used for quantum key distribution.
5. The method of any preceding Claim in which data transmission is done at night if in the daytime the plane is surveying/analyzing in visible light.
6. The method of any preceding Claim in which the mobile ground receiving stations can complement, supplement or replace the use of conventional fixed ground receiving stations.
7. The method of any preceding Claim in which the plane is a dual fuselage plane with an approximately 38 m wingspan.

Data Payloads are Sent Plane-to-Plane
1. A method of providing data connectivity using a solar powered plane configured to operate in the stratosphere, including the step of configuring the plane to send data to, or receive data from, one or more different solar powered planes, and for one or more of those different planes to transmit data to, or receive data from, a ground station or other ground-based system, or a satellite.
2. The method of Claim 1 in which a plane-to-plane free-space optical link is used to send data to, or receive data from, one or more of the different solar powered planes.
3. The method of any preceding Claim in which a group of planes is formed over a large area, where not all can fly a path that enables them to transmit data down to a ground receiving station and then, one or more planes in the group share their data payloads from plane-to-plane, with any plane able to transmit to ground then doing so, transmitting the data payloads sent to it from other planes.
4. The method of any preceding Claim that enables a mobile phone or an IoT device to connect to a satellite via the solar powered plane.
5. The method of any preceding Claim that enables a mobile phone or an IoT device to connect to the solar powered plane.
6. The method of any preceding Claim that enables a ship or other vessel to connect to a satellite via the solar powered plane to send AIS/VDES data.
7. The method of any preceding Claim that enables a ship or other vessel to connect to the solar powered plane to send AIS/VDES data.
8. The method of any preceding Claim that enables a ship or other vessel to connect to the solar powered plane to receive traffic, navigation and safety information data services.
9. The method of any preceding Claim where the plane is a dual fuselage plane with an approximately 38 m wingspan.

Plane with Detachable Propulsion Pod
1. A launch system for a solar powered plane configured to operate in the stratosphere, the launch system including a secondary device, comprising a propulsion system with a propeller optimized for take-off and not for stratospheric flight and a secondary battery, in which the secondary device is configured to be attached to the plane and to provide some or all take-off thrust for the plane, and the secondary device draws its power from one or more batteries in the plane and not its secondary battery, but is configured to re-charge one or more batteries in the plane from its secondary battery.
2. The launch system of Claim 1 in which the self-powered device provides some or all thrust for the plane to reach at least 15,000 feet.
3. The launch system of any preceding Claim in which the self-powered device provides some or all thrust for the plane to reach at least 30,000 feet.

4. The launch system of any preceding Claim in which the self-powered device is a fuel (e.g., aviation fuel) powered device.
5. The launch system of any preceding Claim in which the self-powered device is a battery powered device.
6. The launch system of any preceding Claim in which the system is configured to enable the plane to save battery power on take-off.
7. The launch system of any preceding Claim in which the self-powered device is configured to be separated from the plane, for example once the plane has reached a set altitude, and to then return to land.
8. The launch system of any preceding Claim in which the self-powered device includes a parachute, such as a steerable parachute/paraglider or wing to enable it to return and land, e.g., in the launch area.
9. The launch system of any preceding Claim in which the self-powered device includes fuel and a propulsion system or a motor and batteries.
10. The launch system of any preceding Claim in which the plane is a dual fuselage plane with an approximately 38 m wingspan.

Tail-First Vertical Lift and then Nose-Down Release
1. A launch method for a solar powered plane, configured to operate in the stratosphere, comprising the step of (a) raising the plane tail first and then (b) releasing the plane so that it initially flies down substantially nose-first, and then attains approximately level flight.
2. The method of Claim 1 in which the plane is raised tail first by one or more balloons, tail first, with the fuselage or boom pointing approximately vertically downwards, and the nose facing the ground.
3. The method of Claim 1 or Claim 2, in which at the launch height, the balloons are released allowing the plane to dive downwards, substantially nose-first.
4. The method of any preceding Claim in which the plane drops approximately vertically downwards initially, with its control surfaces set to attain level flight.
5. The method of any preceding Claim in which the plane deploys small drogues to slow its initial descent.
6. The method of any preceding Claim in which the plane is released when it has reached its target stratospheric altitude.
7. The method of any preceding Claim in which the plane is released before it has reached its target stratospheric altitude and then ascends under its own power.
8. The method of any preceding Claim in which the plane is a dual fuselage plane with an approximately 38 m wingspan.

Plane Lands on an Autonomous Vehicle that Receives Data from an Imaging System on the Plane
1. A method of landing a solar powered plane configured to operate in the stratosphere on to an Autonomous Ground Platform (AGP); including the step of configuring the AGP to move along a runway at a speed and trajectory that matches the plane that is coming in to land, with either the plane and/or the AGP operating an imaging unit that enables, if in the plane, the plane to track the position and motion of the AGP and, if in the AGP, for the AGP to track the position and motion of the plane, to ensure that the plane lands safely on the AGP.
2. The method of Claim 1 in which the imaging unit is a LIDAR unit.
3. The method of any preceding Claim in which the AGP adapts its position and movements to ensure a safe landing of the plane on the AGP, using the information from the imaging unit in the AGP and/or the plane.
4. The method of any preceding Claim in which the AGP or sensors on the plane instruct the plane to descend the last few meters onto the AGP.
5. The method of any preceding Claim in which the AGP is commanded or driven by radio control to return to a hangar.
6. The method of any preceding Claim in which an airfield and safe routes are pre-programed into the AGP to avoid it colliding with any airport furniture or structures.
7. The method of any preceding Claim in which the AGP is also used to launch the plane.
8. The method of any preceding Claim in which the plane is a dual fuselage plane with an approximately 38 m wingspan.

Ground Handling Vehicle that can Move in any Direction
1. A method of landing and storing a solar powered plane, configured to operate in the stratosphere, including the steps of a ground handling vehicle (i) driving in one direction to enable the plane to land on the vehicle and, after the plane has landed on the ground handling vehicle (ii) changing its movement in any direction, including perpendicularly.
2. The method of Claim 1 in which the ground handling vehicle is, before the plane has landed, configured to change its movement in any direction, including perpendicularly, so that it can align itself with the path of the plane as it comes in to land.
3. The method of any preceding Claim in which the ground handling vehicle is configured, after the plane has landed on and is supported by the ground handling vehicle, to change its movement in any direction, including perpendicularly, so that it can move the plane wingtip first into the hangar.
4. The method of any preceding Claim in which the ground handling vehicle is configured to move off from stationary in any direction.
5. The method of any preceding Claim in which the plane is a dual fuselage plane with an approximately 38 m wingspan.
6. A ground handling vehicle for a solar powered plane, the vehicle being a configured to move in any direction.
7. The ground handling vehicle of Claim 6 that is configured (i) to drive in a direction that is continuously or rapidly adjusted to enable the vehicle to adjust its position to enable the plane to land on the vehicle and, after the plane has landed on the ground handling vehicle, (ii) to change its movement in any direction, including perpendicularly, to transport the plane to a hangar.
8. The ground handling vehicle of Claims 6-7 that is configured to change its trajectory in any direction, including perpendicularly, so that it can align itself with the path of the plane as the plane comes in to land.
9. The ground handling vehicle of Claims 6-8 that is configured, after the plane has landed on and is supported by the ground handling vehicle, to change its direction in any direction, including perpendicularly, so that it can move the plane wingtip first into the hangar.
10. The ground handling vehicle of Claims 6-9 that is configured to move off from stationary in any direction.
11. The ground handling vehicle of Claims 6-10 that includes battery powered wheels that can each swivel through any angle.

12. The ground handling vehicle of Claims 6-11 that is configured to support a plane that is a dual fuselage plane with an approximately 38 m wingspan.

Dark Vessel Monitoring

1. A solar powered plane, configured to operate in the stratosphere, and configured to enable the detection of dark sea-going vessels by including (i) an imaging system (e.g. synthetic aperture radar) for detecting and tracking sea vessels; and (ii) a receiver for automatic identification system (AIS, S-AIS or VDES) signals; and the plane is configured to process or send data from the imaging system and the receiver to enable vessels that are tracked by the plane but are not sending AIS, S-AIS or VDES signal to be identified as potential dark vessels.
2. The solar powered plane of Claim 1 which is configured to identify vessels that are being tracked by the plane but are not sending AIS, S-AIS or VDES signal as dark vessels.
3. The solar powered plane of Claim 1 or 2 which is configured to enable vessels that are tracked by the plane but are not sending AIS, S-AIS or VDES signal to be identified on the ground as dark vessels.
4. The solar powered plane of any preceding Claim which is further configured to act as a relay for the AIS, S-AIS or VDES signals and/or data that enables the identification of dark vessels.
5. The solar powered plane of any preceding Claim which is further configured to transmit to ground data that enables the identification of dark vessels.
6. The solar powered plane of any preceding Claim which is part of a constellation of planes that are each configured to provide persistent imaging of areas where dark vessels are likely to be present or have been identified.
7. The solar powered plane of any preceding Claim which is a dual fuselage plane with an approximately 38 m wingspan.

Spy Balloon Capture

1. A solar powered plane, configured to operate in the stratosphere, and including a system designed to be released from the plane to disable a balloon.
2. The solar powered plane of Claim 1 in which the system released from the plane is a net or tether configured to attach to the balloon or its payload cables to put the balloon out of equilibrium, thus causing the balloon and its payload to descend to ground.
3. The solar powered plane of any preceding Claim in which the system released from the plane is hot wire mesh and batteries configured to melt through the balloon fabric, causing it to deflate.
4. The solar powered plane of any preceding Claim which is a dual fuselage plane with an approximately 38 m wingspan.

Non-GPS Location System

1. A constellation of solar powered planes, each configured to operate in the stratosphere, and configured to detect their position with reference to a star map, and to transmit that position data with time signal data to enable a user to infer their location using these position and time signals, without the recourse to the GPS or other GNSS systems.
2. The constellation of solar powered planes defined in Claim 1, in which each plane includes a system that can receive and use time signals derived from an atomic clock.
3. The constellation of solar powered planes defined in Claim 1 or 2, in which each plane is a dual fuselage plane with an approximately 38 m wingspan.

Weather/Wind Data Capture Process

1. A weather data capture method including the steps of (i) using a drone or UAV to fly a device to altitude; (ii) releasing the device at altitude and (iii) monitoring the descent of the device to generate weather data.
2. The weather data capture method of Claim 1, in which the weather data includes wind data.
3. The weather data capture method of Claim 1 or 2, in which the device descends under a parachute.
4. The weather data capture method of any preceding Claim, in which the parachute is a paper parachute attached by cotton threads to the device.
5. The weather data capture method of any preceding Claim, in which the device includes a tracker sonde.
6. The weather data capture method of any preceding Claim, in which the device includes a weight, such as sand, and the wind direction is determined by visual sightings of the relative movement of the device and its parachute during descent.

Detection of Natural Disasters

1. A computer implemented method of detecting or monitoring of a natural disaster event, in which a solar powered plane is operating in the stratosphere and includes a 3D imaging subsystem and a 2D imaging unit that enables measuring real-time 3D data associated with a region of interest.
2. The method of Claim 1, in which the imaging subsystem includes a 3D imaging unit, such as SAR, inSar or LiDAR.
3. The method of any preceding Claim, in which the 3D imaging subsystem includes a 3D imaging unit, such as SAR, inSar or LiDAR.
4. The method of any preceding Claim, in which the 3D data includes 3D objects data of the region of interest, in which the object is one of the following: tree, bush, grass, building, vehicle people, animal etc.
5. The method of any preceding Claim, in which the 2D imaging unit includes thermal, hyperspectral or wideband sensors.
6. The method of any preceding Claim, in which a data fusion subsystem is configured to fuse or combine the data provided by the 3D imaging unit and the 2D imaging unit.
7. The method of any preceding Claim, in which the measured data takes into account environmental conditions.
8. The method of any preceding Claim, in which the 3D Imaging subsystem together with the 2D imaging unit determines movement of objects in an area of interest.
9. The method of any preceding Claim, in which the 3D Imaging subsystem together with the 2D imaging unit identifies risk or danger, such as fire, collapse risk, flooding event or any other potential danger.
10. The method of any preceding Claim, in which the 3D Imaging subsystem together with the 2D imaging unit is mounted on the solar powered plane.
11. The method of any preceding Claim, in which the 3D Imaging subsystems together with the 2D imaging units are mounted on a constellation of solar powered planes and operate as a distributed system.
12. The method of any preceding Claim, in which the 3D Imaging subsystem together with the 2D imaging unit is configured to have parameters that are tunable during flight, such as to vary the resolution capabilities.

13. The method of any preceding Claim, in which the output of the 3D imaging subsystem together with the 2D imaging unit is fed into a machine learning or AI based subsystem that is configured to classify objects based on a specific natural disaster event.
14. The method of any preceding Claim, in which the output of the 3D imaging subsystem together with the 2D imaging unit is fed into a machine learning or AI based subsystem that is configured to predict natural disaster event.
15. The method of any preceding Claim, in which the output of the 3D imaging subsystem together with the 2D imaging unit is fed into a workflow automation subsystem such as a triaging subsystem that is configured to automatically triage sequence of rescue actions based on the natural disaster detected.
16. The method of any preceding Claim, in which the rescue action includes guidance of drones, UAVs or other rescue vehicles to remote locations for specific task.
17. The method of any preceding Claim, in which the 3D imaging subsystem and/or 2D imaging unit subsystem is configured to monitor the effect of rescue actions or other tactics in real time.
18. The method of any preceding Claim, in which the 3D Imaging subsystem together with the 2D imaging unit detects moisture levels or hydrological properties and estimates change in moisture levels or hydrological properties.
19. The method of any preceding Claim, in which the plane is configured to transmit an alarm when a risk is identified, such as if the moisture levels or hydrological properties exceed pre-defined thresholds.
20. The method of any preceding Claim, in which the natural disaster event is a fire, and the 3D imaging subsystem and/or 2D imaging unit is configured to monitor ground conditions, flames, wind, rate of progress, location of important objects/people/assets/nature.
21. The method of any preceding Claim, in which the 3D Imaging subsystem together with the 2D imaging unit measures or estimates volume of fuel stock based on one or more of the following: type of fuel being burned or about to be burned, rate of change, such as rate at which fuel is being burned, or fuel consumption.
22. The method of any preceding Claim, in which the 3D Imaging subsystem together with the 2D imaging unit are configured to monitor effectiveness of fire retardant or suppressant in real time.
23. The method of any preceding Claim, in which the 3D Imaging subsystem together with the imaging unit estimates indicator of underground fire.
24. The method of any preceding Claim, in which the 3D Imaging subsystem together with the 2D imaging unit estimates indicator of subsidence, or collapse, such as sudden ground depression.
25. The method of any preceding Claim, in which the plane is a dual fuselage plane with an approximately 38 m wingspan.

The invention claimed is:
1. A glider, comprising:
at least one wing body connected to a plurality of fuselages;
a plurality of vertical stabilizers connected to ends of the plurality of fuselages;
wherein the plurality of vertical stabilizers are hingedly connected to the plurality of fuselages;
wherein the plurality of vertical stabilizers each extend vertically above and below the plurality of fuselages; and
wherein bases of the plurality of vertical stabilizers include skids.
2. The glider of claim 1, wherein the plurality of vertical stabilizers are configured such that when the skids of the plurality of vertical stabilizers make contact with a ground surface, tops of the vertical stabilizers pivot forwards about the hinged connection.
3. The glider of claim 1, wherein the skids each include a sacrificial layer.
4. The glider of claim 1, wherein the hinged connections of the plurality of vertical stabilizers include at least one frangible pin.
5. The glider of claim 1, wherein one or more winglets extend downwardly from at least one end of the at least one wing body.
6. The glider of claim 1, wherein one or more battery position adjustment systems, operable to hold one or more batteries, is attached to the at least one wing body and/or the plurality of fuselages.
7. The glider of claim 1, wherein the at least one wing body includes a central wing body and dihedral wing sections extending outwardly from the central wing body, and wherein the glider includes one or more batteries and/or one or more sensors attached to the dihedral wing sections.
8. The glider of claim 1, wherein the plurality of fuselages have substantially triangular cross-sections, and wherein one or more photovoltaic cells are attached to one or more surfaces of the plurality of fuselages.
9. A glider, comprising:
at least one wing body connected to a plurality of fuselages;
a plurality of vertical stabilizers connected to ends of the plurality of fuselages;
wherein the plurality of vertical stabilizers are hingedly connected to the plurality of fuselages;
wherein the plurality of vertical stabilizers each extend vertically above and below the plurality of fuselages; and
wherein the plurality of vertical stabilizers are configured such that when the skids of the plurality of vertical stabilizers make contact with a ground surface, tops of the vertical stabilizers pivot forwards about the hinged connection.
10. The glider of claim 9, wherein the at least one wing body and/or the plurality of fuselages are formed from a carbon fiber composite.
11. The glider of claim 9, wherein the plurality of fuselages have substantially triangular cross-sections, and wherein one or more photovoltaic cells are attached to one or more surfaces of the plurality of fuselages.
12. The glider of claim 9, wherein one or more movable control surfaces extend from the plurality of fuselages proximate to a rear of the at least one wing body.
13. The glider of claim 9, wherein the glider is coated with a plastic film substrate, and wherein at least one photovoltaic cell, at least one antenna, and/or at least one sensor is formed directly on and integrated with the plastic film substrate.
14. The glider of claim 9, wherein the glider includes at least one imaging system connected to the at least one wing body and/or the plurality of fuselages, and wherein the imaging system includes a carbon fiber parabolic surface.
15. The glider of claim 9, wherein one or more winglets extend downwardly from at least one end of the at least one wing body.

16. The glider of claim 9, wherein one or more battery position adjustment systems, operable to hold one or more batteries, is attached to the at least one wing body and/or the plurality of fuselages.

17. A glider, comprising:
at least one wing body connected to a plurality of fuselages;
a plurality of vertical stabilizers connected to ends of the plurality of fuselages;
one or more winglets extending downwardly from at least one end of the at least one wing body;
wherein the plurality of vertical stabilizers are hingedly connected to the plurality of fuselages;
wherein the plurality of vertical stabilizers each extend vertically above and below the plurality of fuselages;
wherein bases of the plurality of vertical stabilizers include skids; and
wherein the skids of the plurality of vertical stabilizers and the one or more winglets each include sacrificial layers.

18. The glider of claim 17, wherein the glider is coated with a plastic film substrate, and wherein at least one photovoltaic cell, at least one antenna, and/or at least one sensor is formed directly on and integrated with the plastic film substrate.

19. The glider of claim 17, wherein the at least one wing body and/or the plurality of fuselages are formed from a carbon fiber composite.

20. The glider of claim 17, wherein the at least one wing body includes a central wing body and dihedral wing sections extending outwardly from the central wing body, and wherein the glider includes one or more batteries and/or one or more sensors attached to the dihedral wing sections.

* * * * *